United States Patent [19]

Wells et al.

[11] Patent Number: 5,123,085

[45] Date of Patent: Jun. 16, 1992

[54] METHOD AND APPARATUS FOR RENDERING ANTI-ALIASED POLYGONS

[75] Inventors: Stuart C. Wells, Santa Clara; James V. Loo, Los Altos; Dawn M. Wallner, San Jose, all of Calif.

[73] Assignee: Sun Microsystems, Inc., Mountain View, Calif.

[21] Appl. No.: 495,338

[22] Filed: Mar. 19, 1990

[51] Int. Cl.$^5$ .................... G06F 15/72; G06F 15/62
[52] U.S. Cl. .................... 395/121; 395/122; 395/143; 395/135
[58] Field of Search ............ 340/728, 729, 747; 364/522, 521

[56] References Cited

U.S. PATENT DOCUMENTS

| | | | |
|---|---|---|---|
| 4,684,990 | 8/1987 | Oxley | 364/522 X |
| 4,704,605 | 11/1987 | Edelson | 340/728 |
| 4,780,711 | 10/1988 | Doumas | 340/728 |
| 4,825,391 | 4/1989 | Merz | 364/522 X |
| 4,873,515 | 10/1989 | Dickson et al. | 340/728 |
| 4,908,780 | 3/1990 | Priem et al. | 364/521 |
| 4,918,626 | 4/1990 | Watkins et al. | 364/522 |
| 4,992,780 | 2/1991 | Penna et al. | 340/729 |

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

A scan conversion process is performed on a polygon using a single pass technique. The pixels which comprise the edges and vertices of the polygon are first determined from the vertices which define the polygon. The alpha channel comprises either a sub-pixel mask associated with each pixel which indicates the amount and sub-pixel regions of coverage or a single value indicative of the percentage of coverage of a pixel. Furthermore, a z value indicative of the depth of each pixel is maintained. The pixels between the edge pixels of the polygon are then turned on, thereby filling the polygon. The pixels which comprise the polygon are then composited with the background pixels on a per pixel basis. The depth value of each pixel of the polygon (the z value) is used to determine the compositing equations to be used to composite each pixel of the polygon to the background. The compositing equations update the color of the pixel, the z buffer value of the background pixel and the sub-pixel mask to reflect the addition of information from the compositing of the pixel of the polygon into the background pixel. Through this method high quality anti-aliased polygons may be rendered without performing the time consuming process of sorting the polygons in depth order prior to compositing.

75 Claims, 37 Drawing Sheets

Fig. 3b

| Case | Depth Order | Color 1 | Alpha 1 | Color 2 | Alpha 2 | Color 3 | Alpha 3 |
|---|---|---|---|---|---|---|---|
| 1 | Za<Zb<Zc | 1/2c | 1/2 | 1/2b+1/4c | 3/4 | 1/2a+1/4b+1/8c | 7/8 |
| 2 | Za<Zc<Zb | 1/2c | 1/2 | 1/4b+1/2c | 3/4 | 1/2a+1/8b+1/4c | 7/8 |
| 3 | Zb<Za<Zc | 1/2c | 1/2 | 1/2b+1/4c | 3/4 | 1/8a+1/2b+1/4c | 7/8 |
| 4 | Zb<Zc<Za | 1/2c | 1/2 | 1/2b+1/4c | 3/4 | 1/8a+1/2b+1/4c | 7/8 |
| 5 | Zc<Za<Zb | 1/2c | 1/2 | 1/4b+1/2c | 3/4 | 1/8a+1/4b+1/2c | 7/8 |
| 6 | Zc<Zb<Za | 1/2c | 1/2 | 1/4b+1/2c | 3/4 | 1/8a+1/4b+1/2c | 7/8 |

Fig. 4

| Case | Depth Order | Color 1 | Alpha 1 | Color 2 | Alpha 2 | Color 3 | Alpha 3 |
|---|---|---|---|---|---|---|---|
| 1 | Za<Zb<Zc | c | 1 | 1/4b+3/4c | 1 | 1/2a+1/8b+3/8c | 1 |
| 2 | Zb<Za<Zc | c | 1 | 1/4b+3/4c | 1 | 1/4b+3/4c | 1 |

| Left Point \ Right Point | 0,0 | 1,0 | 2,0 | 3,0 | 4,0 | 4,1 | 4,2 | 4,3 | 4,4 | 3,4 | 2,4 | 1,4 | 0,4 | 0,3 | 0,2 | 0,1 |
|---|---|---|---|---|---|---|---|---|---|---|---|---|---|---|---|---|
| 0,0 | 16 | 16 | 16 | 16 | 16 | 14 | 12 | 10 | 10 | 6 | 4 | 2 | 0 | 0 | 0 | 0 |
| 1,0 | 0 | 16 | 16 | 16 | 16 | 15 | 13 | 13 | 10 | 8 | 6 | 4 | 2 | 2 | 1 | 1 |
| 2,0 | 0 | 0 | 16 | 16 | 16 | 15 | 15 | 14 | 12 | 10 | 8 | 6 | 4 | 3 | 3 | 1 |
| 3,0 | 0 | 0 | 0 | 16 | 16 | 16 | 15 | 15 | 14 | 12 | 10 | 8 | 6 | 6 | 3 | 2 |
| 4,0 | 0 | 1 | 0 | 0 | 16 | 16 | 16 | 16 | 16 | 14 | 12 | 10 | 10 | 6 | 4 | 2 |
| 4,1 | 2 | 2 | 1 | 1 | 0 | 0 | 16 | 16 | 16 | 15 | 13 | 13 | 10 | 8 | 6 | 4 |
| 4,2 | 4 | 3 | 3 | 1 | 0 | 0 | 0 | 16 | 16 | 15 | 15 | 13 | 13 | 10 | 8 | 6 |
| 4,3 | 6 | 6 | 3 | 2 | 0 | 0 | 0 | 0 | 16 | 16 | 15 | 15 | 14 | 12 | 10 | 8 |
| 4,4 | 10 | 6 | 4 | 2 | 0 | 0 | 0 | 1 | 0 | 16 | 16 | 16 | 16 | 14 | 13 | 10 |
| 3,4 | 10 | 8 | 6 | 4 | 2 | 3 | 1 | 1 | 0 | 0 | 16 | 16 | 16 | 15 | 13 | 13 |
| 2,4 | 12 | 10 | 8 | 6 | 4 | 6 | 3 | 2 | 0 | 0 | 0 | 16 | 16 | 15 | 15 | 15 |
| 1,4 | 14 | 12 | 10 | 8 | 6 | 6 | 4 | 2 | 0 | 0 | 0 | 0 | 16 | 16 | 16 | 16 |
| 0,4 | 16 | 14 | 12 | 10 | 10 | 8 | 6 | 4 | 2 | 2 | 1 | 1 | 0 | 16 | 16 | 16 |
| 0,3 | 16 | 15 | 13 | 13 | 10 | 10 | 8 | 6 | 4 | 3 | 3 | 1 | 0 | 0 | 16 | 16 |
| 0,2 | 16 | 15 | 13 | 13 | 12 | 12 | 10 | 8 | 6 | 6 | 3 | 2 | 0 | 0 | 0 | 16 |
| 0,1 | 16 | 16 | 15 | 15 | 14 | 12 | 10 | 8 | 6 | 6 | 3 | 2 | 0 | 0 | 0 | 16 |

Fig. 11j

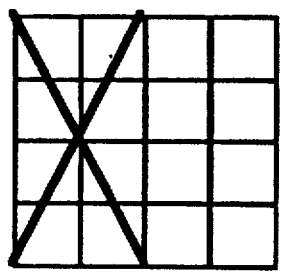
2.0, 0.0    2.2, 0.0
2.0, 1.0    2.2, 1.0
Fig. 13c
| Left | Right |
|------|-------|
| lr=0 | lr=1 |
| x1=2 | x1=0 |
| y1=0 | y1=0 |
| x2=0 | x1=2 |
| y2=4 | y2=4 |
Fig. 13d
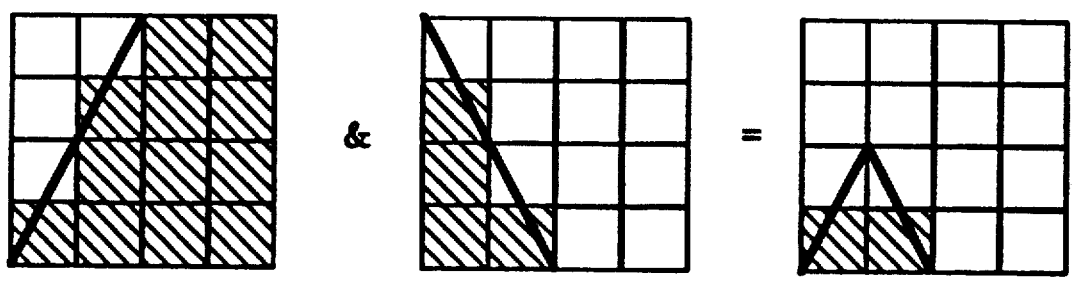
Fig. 13e

$Z_a < Z_b$ $\alpha a := \alpha a$    540
  $Ca := \alpha a * Ca$    545

$Cb := Ca + (1-\alpha a)*Cb$    550
  $\alpha b := \alpha a + (1-\alpha a)*\alpha b$    555
  $Zb := Za$    560

$Z_a > Z_b$ $\alpha a := \alpha a$    565
  $Ca := \alpha a * Ca$    570

$Cb := (1-\alpha b)*Ca + Cb$    575
  $\alpha b := (1-\alpha b)*\alpha a + \alpha b$    580
  $Zb := Zb$    585

$Z_a = Z_b$

If ($\alpha b = 1$)
  Rule 1:
   $\alpha a := 1$    590
   $Ca := \alpha a * Ca$  (equals Ca)    595

$Cb := Ca + (1-\alpha a)*Cb$  (equals Ca)    600
   $\alpha b := \alpha a + (1-\alpha a)*\alpha b$  (equals 1)    605
   $Zb := Za$    610
 else
  Rule 2:
   $\alpha a := \alpha a$    615
   $Ca := \alpha a * Ca$    620

$Cb := Ca + (1-\alpha a)*Cb$    625
   $\alpha b := \alpha a + (1-\alpha a)*\alpha b$    630
   $Zb := Za$    635 where
  Ca  color of polygon pixel
  Cb  color of background pixel
  Za  depth of polygon pixel
  Zb  depth of background pixel
  $\alpha a$  coverage value of polygon pixel
  $\alpha b$  coverage value of background pixel
  :=  replacement, i.e., the results of the expression to the right the := replaces the value to the left of the :=.

Fig. 15a $Z_a < Z_b$ $M_a := M_a$     650
    $\alpha_a := \text{count}(M_a)/\text{Mask\_Size}$     655
    $C_a := \alpha_a * C_a$     660

$C_b := C_a + (1-\alpha_a)*C_b$     665
    $M_b := M_a | M_b$     670
    $Z_b := Z_a$     675

$Z_a > Z_b$ $M_a := M_a \& \sim M_b$     680
    $\alpha_a := \text{count}(M_a)/\text{Mask\_Size}$     685
    $C_a := \alpha_a * C_a$     690

$\alpha_b := \text{count}(M_b)/\text{Mask\_Size}$     695
    $C_b := (1-\alpha_b)*C_a + C_b$     700
    $M_b := M_a | M_b$     705
    $Z_b := Z_b$     710

$Z_a = Z_b$ if ($M_b$=Full_Mask)
        $M_a := \text{Full\_Mask}$     715
        $\alpha_a := \text{count}(M_a)/\text{Mask\_Size}$ (equals 1)     720
        $C_a := \alpha_a * C_a$ (equals $C_a$)     725

$C_b := C_a + (1-\alpha_a)*C_b$ (equals $C_a$)     730
        $M_b := M_a | M_b$ (equals Full_Mask)     735
        $Z_b := Z_a$     740
    else
        $M_a := M_a$     745
        $\alpha_a := \text{count}(M_a)/\text{Mask\_Size}$     750
        $C_a := \alpha_a * C_a$     755

$C_b := C_a + (1-\alpha_a)*C_b$     760
        $M_b := M_a | M_b$     765
        $Z_b := Z_a$     770 where
| | |
|---|---|
| $C_a$ | color of polygon pixel |
| $C_b$ | color of background pixel |
| $Z_a$ | depth of polygon pixel |
| $Z_b$ | depth of background pixel |
| $\alpha_a$ | coverage value of polygon pixel |
| $\alpha_b$ | coverage value of backround pixel |
| $M_a$ | binary mask of polygon pixel |
| $M_b$ | binary mask of background pixel |
| Full_Mask | binary mask with all samples set to one |
| Mask_Size | total number of samples in binary mask, that is 8, 16 etc |
| := | replacement, i.e., the results of the expression to the right of the := replaces the value to the left of the :=. |
| \| | logical "OR" operation |
| & | logical "AND" operation |
| ~ | logical negation operation |
| Count | count of samples in sub-pixel mask set to one |

Fig. 15b zA<zB<zC; tC<tB<tA

 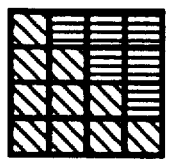 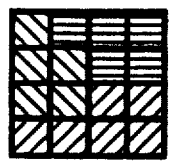

c(t1)=(6/16)*cC
c(t2)=(10/16)*cB+(6/16)*cC
c(t3)=(6/16)*cA+(10/16)*((10/16)*cB+
(6/16)*cC)

zC(t1) < ∞    zB(t2)<zC(t1)    zA(t3)<zB(t1)

zA<zC<zB; tA<tB<tC

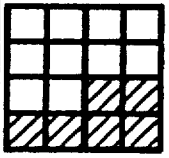 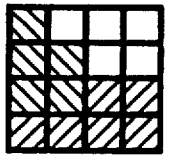 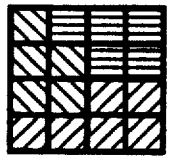

c(t1)=(6/16)*cA
c(t2)=(6/16)*cA+(5/16)*cB
c(t3)=(6/16)*cA+(5/16)*cB)+(5/16)*Cc zA(t1) < ∞    zB(t2)>zA(t1)    zC(t3)>zA(t1)

zA<zC<zB; tA<tC<tB

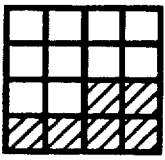 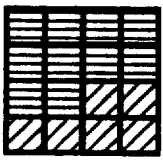 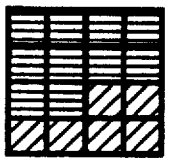

c(t1)=(6/16)*cA
c(t2)=(6/16)*cA+(10/16)*cC
c(t3)=(6/16)*cA+(0/16)*cB+(10/16)*cC zA(t1) < ∞    zC(t2)<zA(t1)    zB(t3)>zA(t1)

zA<zC<zB; tB<tA<tC

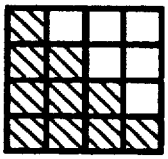 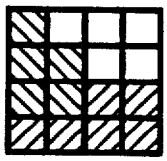 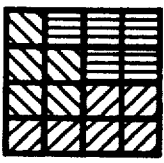

c(t1)=(10/16)*cB
c(t2)=(6/16)*cA+(5/16)*cB
c(t3)=(6/16)*cA+(5/16)*cB+(5/16)*cC zB(t1) < ∞    zA(t2)<zB(t1)    zC(t3)>zA(t2)

zA<zC<zB; tB<tC<tA

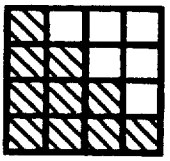 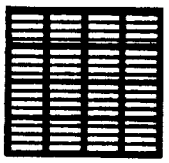 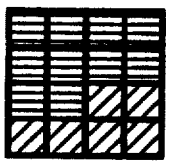

| | tA⊲B⊲C | tA⊲C⊲B | tB⊲A⊲C | tB⊲C⊲A | tC⊲A⊲B | tC⊲B⊲A |
|---|---|---|---|---|---|---|
| zA⊲B⊲C | 6/16:5/16:5/16 | 6/16:5/16:5/16 | 6/16:5/16:5/16 | 6/16:5/16:5/16 | 6/16:5/16:5/16 | 6/16:5/16:5/16 |
| zA⊲C⊲B | 6/16:0:10/16 | 6/16:0:10/16 | 6/16:5/16:5/16 | 6/16:0:10/16 | 6/16:0:10/16 | 6/16:0:10/16 |
| zB⊲A⊲C | 1/16:10/16:5/16 | 1/16:10/16:5/16 | 1/16:10/16:5/16 | 1/16:10/16:5/16 | 1/16:10/16:5/16 | 1/16:10/16:5/16 |
| zB⊲C⊲A | 0:10/16:6/16 | 0:10/16:6/16 | 0:10/16:6/16 | 0:10/16:6/16 | 0:10/16:6/16 | 0:10/16:6/16 |
| zC⊲A⊲B | 0:0:1 | 0:0:1 | 0:0:1 | 0:0:1 | 0:0:1 | 0:0:1 |
| zC⊲B⊲A | 0:0:1 | 0:0:1 | 0:0:1 | 0:0:1 | 0:0:1 | 0:0:1 |

| | tA⊲B⊲C | tA⊲C⊲B | tB⊲A⊲C | tB⊲C⊲A | tC⊲A⊲B | tC⊲B⊲A |
|---|---|---|---|---|---|---|
| zA⊲B⊲C | 6/16:5/16:5/16 | 6/16:0:10/16 | 6/16:5/16:5/16 | 6/16:6.25/16:3.75/16 | 6/16:0:10/16 | 6/16:6.25/16:3.75/16 |
| zA⊲C⊲B | 6/16:5/16:5/16 | 6/16:0:10/16 | 6/16:5/16:5/16 | 6/16:0:10/16 | 6/16:0:10/16 | 6/16:0:10/16 |
| zB⊲A⊲C | 1/16:10/16:5/16 | 2.25/16:10/16:3.75/16 | 1/16:10/16:5/16 | 0:10/16:6/16 | 2.25/16:10/16:3.75/16 | 0:10/16:6/16 |
| zB⊲C⊲A | 1/16:10/16:5/16 | 0:10/16:6/16 | 1/16:10/16:6/16 | 0:10/16:6/16 | 0:10/16:6/16 | 0:10/16:6/16 |
| zC⊲A⊲B | 0:0:1 | 0:0:1 | 0:0:1 | 0:0:1 | 0:0:1 | 0:0:1 |
| zC⊲B⊲A | 0:0:1 | 0:0:1 | 0:0:1 | 0:0:1 | 0:0:1 | 0:0:1 |

Figure 17b

|  | tA<B<C | tA<C<B | tB<A<C | tB<C<A | tC<A<B | tC<B<A |
|---|---|---|---|---|---|---|
| zA<B<C | 0:0:0 | 0:5/16:5/16 | 0:0:0 | 0:1.25/16:1.25/16 | 0:5/16:5/16 | 0:1.25/16:1.25/16 |
| zA<C<B | 0:5/16:5/16 | 0:0:0 | 0:5/16:5/16 | 0:0:0 | 0:0:0 | 0:0:0 |
| zB<A<C | 0:0:0 | 2.25/16:0:1.25/16 | 0:0:0 | 1.62/16:0:2.25/16 | 1.25/16:0:1.25/16 | 2.25/16:0:2.25/16 |
| zB<C<A | 1/16:0:1/16 | 0:0:0 | 1/16:0:1/16 | 0:0:0 | 0:0:0 | 0:0:0 |
| zC<A<B | 0:0:0 | 0:0:0 | 0:0:0 | 0:0:0 | 0:0:0 | 0:0:0 |
| zC<B<A | 0:0:0 | 0:0:0 | 0:0:0 | 0:0:0 | 0:0:0 | 0:0:0 |

Figure 17c

METHOD AND APPARATUS FOR RENDERING ANTI-ALIASED POLYGONS

BACKGROUND OF THE INVENTION

1. Field of the Invention

This invention relates to the rendering of graphic images on computer displays. More specifically, this invention relates to the rendering of anti-aliased polygons on computer graphic displays.

2. Art Background

In the scan conversion process of a polygon, the polygon, which is defined by the coordinates of its vertices, is converted to a raster image. The outline or edges of the polygon are first determined and the pixels between the polygon edges are then filled. The vertices of the polygon are translated into the display coordinate space and a line scan conversion algorithm is used to determine the lines between vertices which form the edges of the polygon. The line scan conversion algorithm computes the coordinates of the pixels which lie closest to the line between vertices on a two-dimensional raster grid. An example is Bresenham's line algorithm (for information on Bresenham's line algorithm see: Foley and Van Dam, *Fundamentals of Interactive Computer Graphics*, (Addison-Wesley Publishing, 1984) pages 433-436). However, the lines do not always coincide or "line up" with pixel locations. Although the closest pixel is chosen, the resulting line contains the undesirable alias effect. This undesirable effect also is carried into the polygon rendering process.

In an attempt to smooth out the edges of a polygon during the polygon rendering process, Pitteway and Watkinson modified Bresenham's algorithm to determine a partial coverage value for pixels which form the edge of a polygon. The modification involved adding to Bresenham's error term the quantity (1−m), where m is the slope. The result is that the error term is a measure of the area of the pixel inside the polygon (for further information on the Pitteway/Watkinson algorithm see Foley and Van Dam, *Fundamentals of Interactive Computer Graphics*, (Addison-Wesley Publishing, 1984), pages 460-463). Using the Pitteway/Watkinson algorithm, a pixel intensity is generated which is equal to the pixel area covered multiplied by the color or intensity of the polygon at that pixel (since a shaded polygon may result in a different intensity or color).

The coverage value computed using the Pitteway/Watkinson algorithm is the area between the line of the polygon and the major axis. If the polygon lies toward the major axis, i.e., between the line being drawn and the major axis, the coverage value can be used directly. If the polygon lies toward the minor axis, the desired coverage value equals the difference between the value of one and the Pitteway/Watkins coverage value determined. Because the Pitteway and Watkinson algorithm can only address a single line, the algorithm cannot handle thin polygons whose thickness may be less than one pixel and which may reside within the area of a single pixel, or vertices which meet within the area of a single pixel. In addition, since the algorithm touches one pixel per major axis increment, some pixels are partially covered by a polygon are treated as though they are uncovered. Furthermore, the Pitteway/Watkinson algorithm only performs a simple averaging process and does not extend direclty to different convolution or weighted averaging functions.

Another approach to rendering a polygon employs a sub-pixel mask which indicates the locations of coverage within the pixels. For example, a sub-pixel mask may provide a 16-bit pattern on a 4×4 grid of coverage for a polygon on a pixel. The mask represents coverage of combination of 16 sub-pixel areas plus full coverage and no coverage which provides for 256 different combinations of sub-pixel masks. To accommodate horizontal and vertical edges lying on integer pixel boundaries, the look-up table indices access a 5×5 array. This is illustrated by FIGS. 1a, 1b and 1c. The mask obtained from the table is a 4×4 array and is composed of bits where a value of zero indicates that the polygon does not cover the sub-pixel and a value of 1 indicates that it does. To use the sub-pixel mask, the polygon vertices are quantized to sub-pixel values after passing through any geometric manipulations. To calculate the indices for mask look-up the sign of the edge of the slope must be provided. This determines the integer x coordinate of the pixel which is adjacent to the current pixel in the direction of the slope. By convention, horizontal edges are rendered left to right so the adjacent pixel is always to the right. Vertical edges require the additional knowledge of whether they are left or right polygon edges to determine adjacent pixels. Referring to FIG. 1a, when the adjacent pixel's x value is subtracted from the current x value of the edge of the current pixel and the result is multiplied by the number of sub-pixels in x (4 for the present example) the following results are determined:

$0 = 0 * 4;$
$1 = 0.25 * 4;$
$2 = 0.50 * 4;$
$3 = 0.75 * 4;$
$4 = 1 * 4$

These values become the x index into a sub-pixel identifying matrix.

FIG. 1b illustrates the xy index and FIG. 1c depicts the sub-pixel identifying index. The same calculation performed for x is performed for the y values of the edge. The calculations to determine the y indices are simplified by the fact that the polygon is rendered a scan line at a time in the increasing y direction. The x and y indices give us sub-pixel number. (e.g. 0 through 24) of the entry index of the pixel. Sub-pixel masks are designed to allow the entry index to be within the pixel as well as on a pixel boundary. Identical procedures are performed for the exit sub-pixel. The exit sub-pixel is calculated as soon as an adjacent pixel or scan line has been intercepted or when the edges ends (if it ends within the current pixel).

Once the two sub-pixel indices for the entry and exit sub-pixels are determined, the mask is obtained from the look-up table and is either used as is or complemented depending upon the edge code which indicates which side of the edge is an inside edge and which is an outside edge. The mask for multiple edges of a single polygon within a pixel are combined depending upon a vertex code; the masks are logically ORed together if the vertex represents two edges whose inside angle is greater than 180° (concave) and logically ANDed together if the inside angle is less than or equal to 180° (convex) The sub pixel masks themselves may be determined empirically or according to a predetermined algorithm so long as consistent algorithms are used to generate all the masks. Memory may be saved by providing only half of the possible combinations of edge crossings in as much as the other half may be obtained by complementing the bit pattern based upon the knowledge of the relationship of the edges in a mask to the inside/outside of the polygon.

Once the desired partial coverage pixels on the edge of a polygon have been computed, the internal pixels between the polygon edge pixels on a span on a scan line must be filled. Filling a span on a scan line requires determination of the right most edge pixel on the left edge of a polygon and left most edge pixel on the next right edge of the polygon. Once determined, the pixels between these edge pixels are filled. FIG. 2a illustrates why it is necessary to determine the first and last fill pixels in a span since simply using the extreme edge pixels of the polygon on a span would result in adjacent edge pixels being entirely painted as opposed to partially painted i.e. "color* coverage" for edge pixels which are partially covered and simply "color" for fill pixels which are fully painted. FIG. 2b shows an example where only two pixels in the span should be entirely filled since there are five left edge pixels (including one vertex) and two right edge pixels.

For a single polygon there may be several spans on an individual scan line which must be filled (See Foley and Van Dam, *Fundamentals of Interactive Computer Graphics*, p. 456, for a description of rendering a polygon). Determining the individual spans on a particular scan line involves rendering all edges of the polygon on that scan line and determining the first and last pixels in a span to be completely filled. Upon determination of these first and last fill pixels, an X order sort is performed on their position in the scan line and individual spans are then filled in a left to right order.

Once the energy or coverage for each pixel of a polygon is determined, the polygon image may then be composited into the background. Compositing is a technique wherein the pixels of the polygon are blended into the background in order to have as smooth a transition as possible between the polygon and the background. In one method for compositing, a separate component or channel, referred to as the alpha "α" channel, is used to identify the extent of coverage of an element at a pixel. See Porter & Duff, "Compositing Digital Images", *Computer Graphics*, Vol. 18, No. 3, (July 1984), In order to place the element over an arbitrary background, a mixing factor is required at each pixel to control the linear interpolation of the foreground and background colors. This information is encoded into the α channel, which at a value of zero indicates no coverage and at a value of 1 means full coverage with fractions corresponding to partial coverage. The elements of an image (pixel) are then composited into the background according to the following compositing equation:

$$c_t = a_a \cdot c_a + (1 - a_a) \cdot a_b \cdot c_b$$

$$a_t = a_a + (1 - a_a) \cdot a_b$$

where $c_a$ is the color of the pixel of the polygon, $c_b$ is the color of the background object, $c_t$ is the color of the pixel upon compositing, $a_a$ is the value of the partial coverage of the pixel of the polygon, $a_b$ is a partial coverage of the background pixel and $a_t$ is the composited α value.

In one implementation of the α channel the α channel retains only a single α value per pixel which is proportional to the partial coverage at a pixel by the polygon. No information associated with the orientation or shape of the partial coverage is retained. In addition, if the number of polygon edges intersecting a pixel is greater than 1, the α value becomes a composite α value, and the actual number of intersecting polygons is unknown. These compositing equations are equally applied to all pixels of the polygon. Therefore, if the polygon ranges in depth, the pixels of the polygon will be rendered the same regardles of depth. Furthermore, the pixel color computed via the compositing equation is heavily dependent upon the rendering sequence of the polygons which overlap at a particular pixel. The closer the rendering sequence is to the actual depth order of the polygons, the more accurate is the computed color value to the desired color value. U.S Pat. No. 4,748,572 describes a mechanism in which the polygons to be rendered are sorted in depth order prior to compositing. However, the sorting process is quite time consuming, requires several processing passes and slows down the polygon rendering process considerably.

The error which arises when rendering intersecting polygons and which varies according to the depth order of the polygons is illustrated by the example of FIGS. 3a and 3b. FIG. 3a shows a pixel within which three polygons a, b, and c intersect. Each pixel within a polygon has a depth value associated with it identified as the z value and an α value indicative of the extent of coverage at the pixel. FIG. 3b shows the resulting color and α values which have been computed for each polygon for all possible depth orders for $\alpha a$ equal to one-half, $\alpha b$ equal to one-half and $\alpha c$ equal to one-half. FIG. 3b shows that in 4 out of 6 cases considered, cases 1, 2, 4 and 6, the contributions to the final pixel color from the three intersecting polygons are dependent upon the depth order. The error that arises as a result of this is referred to as the depth order dependence error.

FIG. 4 illustrates two cases of polygons a, b and c, having, $\alpha a$ equal to one-half, $\alpha b$ equal to one-quarter and $\alpha c$ equal to one. The sequence of rendering is c, b, a. It should be noted that when α obtains the value of one, it always remains at the value of one regardless of subsequent compositing with other polygons. FIG. 4 verifies this to be true irrespective of depth order. In addition, in the second case, there is no contribution to the final color from polygon "a" despite polygon a being in front of polygon c and having an α value equal to one-half. However, because the z value is updated after the computation of the color to a value of $z = zb$ (at the second step), and the α values is equal to one, there is insufficient information to conclude anything other that polygon a is hidden by a polygon completely covering the pixel (even though the other polygon is actually in front of the polygon having an α value of 1).

SUMMARY OF THE INVENTION

It is therefore an object of the present invention to generate high quality polygons which are rendered in a random order independent of the polygon depth.

It is an object of the present invention to render high quality polygons utilizing a single series or single pass of calculations which renders the polygon in the minimum amount of time.

It is an object of the present invention to render antialiased polygons wherein, on a per pixel basis, the z value of each pixel is determinative of the compositing equations used to composite each polygon pixel with the corresponding background pixel.

It is further an object of the present invention to provide a polygon rendering process wherein a sub-pixel mask for each pixel is used in conjunction with a depth value to generate anti-aliased polygons.

A scan conversion process is performed on a polygon using a single pass technique. The pixels which comprise the edges and vertices of the polygon are first determined from the vertices which defines the polygon. The alpha channel comprises either a sub-pixel mask associated with each pixel which indicates the amount and sub-pixel regions of coverage or a single value indicative of the percentage of coverage of a pixel. Furthermore, a z value indicative of the depth of each pixel is maintained. The pixels between the edge pixels of the polygon are then turned on, thereby filling the polygon. The pixels which comprise the polygon are then composited with the background pixels on a per pixel basis. The depth value of each pixel of the polygon (the z value) is used to determine the compositing equations to be used to composite each pixel of the polygon to the background. The compositing equations update the color of the pixel, the z buffer value of the background pixel and the sub-pixel mask to reflect the addition of information from the compositing of the pixel of the polygon into the background pixel. Through this method high quality anti-aliased polygons may be rendered without performing the time consuming process of sorting the polygons in depth order prior to compositing.

In one embodiment, a sub-pixel mask registration, which describes the coverage for each pixel of the polygon and the background, is maintained. A polygon is rendered by first determining the edges of the polygon using a scan line conversion algorithm and determining the sub-pixel mask registration for the edge pixels of the polygon. The polygon is then filled by filling in the pixels between edge pixels. Once the polygon is filled, the polygon is composited pixel by pixel with the background using a set of equations which are dependent upon the polygon's z value with respect to the background pixel's z buffer value. Sub-pixel masks are maintained for the background pixels and are updated according to the compositing equations. The z buffer value is also determinative of whether the color is modified for a particular pixel, whether the z buffer value is modified for a particular pixel and whether the sub-pixel mask (determinative of the coverage of the pixel) is modified. Thus, a highly accurate rendering of an anti-aliased polygon is achieved without the cost or speed required to sort the polygons to be rendered into z buffer order.

In another embodiment, to minimize the amount of memory required, a single value, the alpha value, is used to indicate the amount of coverage of the background pixels. Prior to compositing, the sub-pixel masks of the polygon are converted to a single value. A single value indicative of coverage is also maintained for each of the background pixels. The z value of each pixel of the polygon to be composited is compared with the corresponding z buffer value of the background pixel. The polygon pixel is then composited into the background pixels using compositing equations dependent upon the comparison of the z value and z buffer value.

BRIEF DESCRIPTION OF THE DRAWINGS

The objects, features and advantages of the present invention will be apparent from the following detailed description in which:

FIGS. 3a and 3b illustrate the result of compositing random depth order polygons.

FIG. 4 is a table showing the results of compositing in a random depth order.

FIGS. 11a, 11b, 11c, 11d, 11e, 11f, 11g, 11h, 11i, and 11j, illustrate the formulation of alpha values and sub-pixel masks.

FIGS. 15a and 15b illustrate the compositing equations employed.

FIGS. 16a, 16b, 16c, 16d, 16e, 16f, 16g, 16h and 16i illustrate the depth order dependence error and improvements to the same through the system of the present invention.

FIGS. 17a, 17b and 17c further illustrate the depth order dependence error and improvements to the same through the system of the present invention.

DETAILED DESCRIPTION OF THE INVENTION

Notation And Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Configuration

Figure 5:
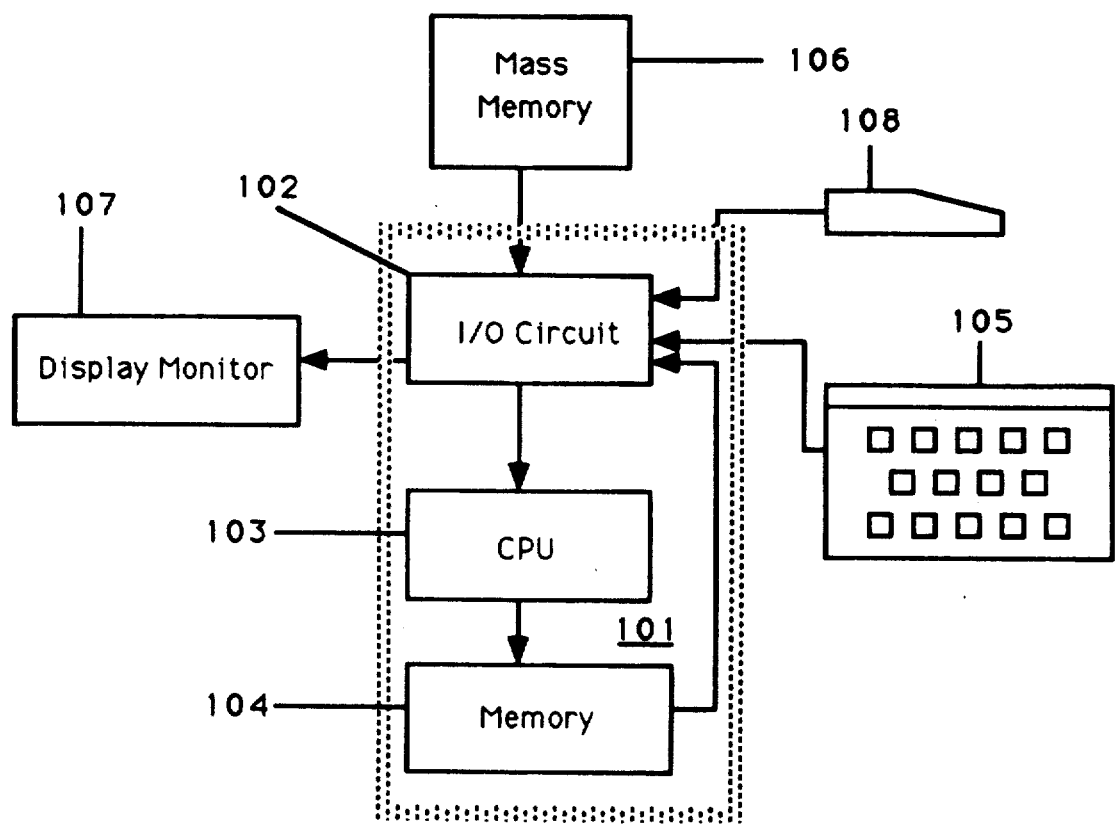
FIG. 5 is a block diagram illustration of a computer which employs the present invention.

FIG. 5 shows a typical computer-based system for rendering anti-aliased polygons according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 5 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. Preferably, the display monitor 107 may also display the graphic images, i.e., the anti-aliased polygons rendered according to the process of the present invention. A cursor control 108 is used to select command modes and edit the input data, and in general provides a more convenient means to input information into the system.

Process Description

Through the present invention, high quality anti-aliased polygons may be rendered in a single pass without performing the time consuming process of sorting the polygons in depth order. Each polygon to be rendered is identified by its vertices, its color or intensity and its depth value, also referred to as the z buffer value.

Figure 6:
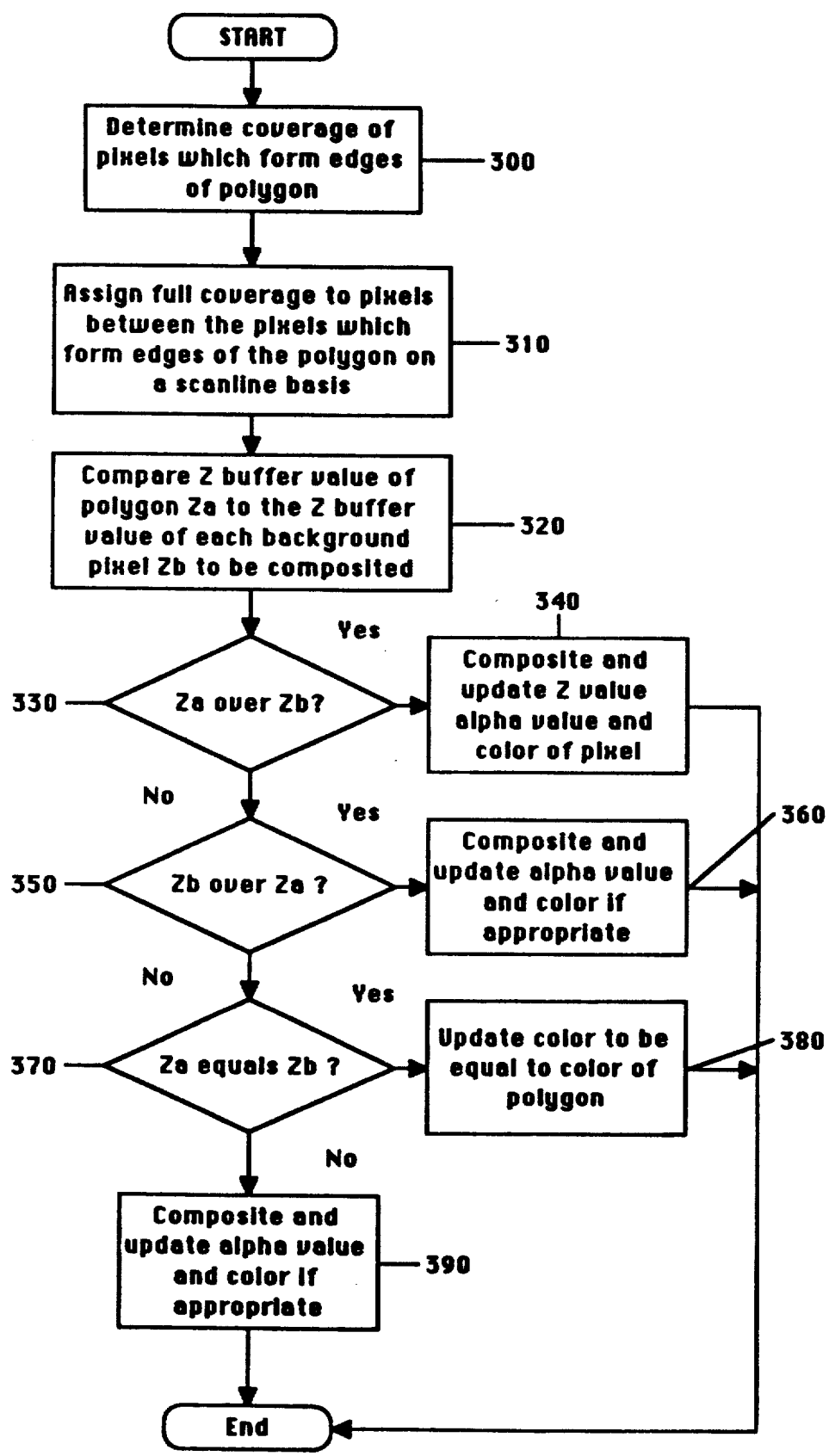
FIG. 6 is a flow chart which generally depicts the preferred embodiment of the present invention.
Figure 7:
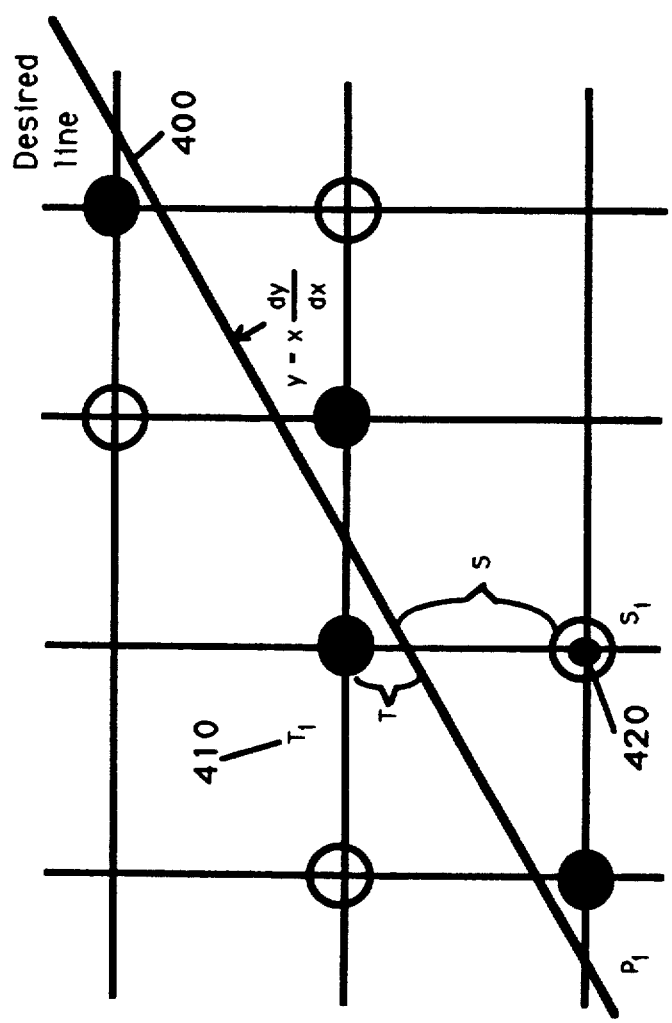
FIG. 7 is a diagram which illustrates the Pitteway/Watkinson scan conversion algorithm.

Referring to FIG. 6, at block 300 the coverage of the pixels which form the edges of the polygon to be rendered are determined. The amount of coverage is reflected in the intensity of the pixel, the greater the coverage, the greater the contribution of the polygon pixel to the pixel's final intensity. The coverage value is referred to as the $\alpha$ (alpha) value. Preferably, the $\alpha$ value is determined according to the Pitteway/Watkinson algorithm. The coverage value computed according to the Pitteway/Watkinson algorithm is the area between the line representing the edge of the polygon and the major axis. This is further explained by reference to FIG. 7. The desired line to be rendered is identified by numeral 400. Bresenham's line algorithm determines which pixel, for example the pixel $t_i$ 410 or the pixel $s_i$ 420, to render to best estimate that portion of the line. The algorithm uses a decision variable $d_i$ which is proportional to the difference between s and t. $P_{i-1}$ has been determined to be the closest pixel to the actual line being drawn and now $d_i$ is computed to determine whether the next pixel to be set should be $t_i$ or $s_i$. If s is less than t, then $s_i$ is closer to the desired line and should be set, else $t_i$ is closer and should be set. This may be looked at from different perspective by noting that $s_i$ is chosen if $s-t$ is less than zero. The d value is computed to be $2*(dy-dx)$ where dx equals the absolute value of $(x2-x1)$ and dry equals the absolute value of $(y2-y1)$.

Using the Pitteway/Watkinson algorithm, the d value is computed to be equal to $(mx-y)+(1-m)$, where m is the slope of the line. The test to determine which pixel is to represent that portion of the line does not compare the value to zero as in the original algorithm but rather to the value $(1-m)$. The variable d then serves to estimate the pixel coverage at each step. The closer d is to 1, the more of the pixel is covered and the greater the contribution to the pixel intensity. However, the Pitteway/Watkinson algorithm does not adapt well for thin polygons or vertices.

In order to minimize the error which occurs when attempting to render thin polygons a technique is employed where the edges of the polygon are individually rendered into an intermediate scan line buffer. This technique is preferred because an edge is generally rendered fully for a particular scan line and partial coverage values for a single edge must be stored for subsequent computations. For example, it is necessary to store the partial coverage mask for a single edge because the coverage is the combination of the masks obtained from traversing two edges (for example, the two edges illustrated in FIG. 8). The edge pixels of the polygon are first sorted according to y coordinate values such that edge pixels located on the same scan line may be rendered sequentially and therefore together into the intermediate scan line buffer. Thus, the coverage for a thin polygon or vertex may be individually determined prior to compositing into the background.

Figure 8:
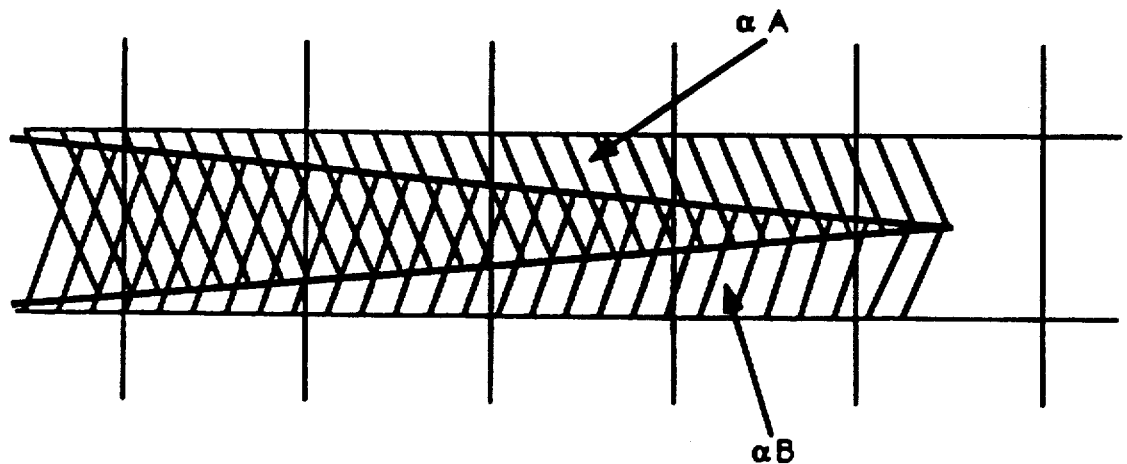
FIG. 8 illustrates the determination of coverage of thin polygons within a pixel.

Referring to FIG. 8 the final coverage of the thin polygon or vertex may be derived using the following compositing equation:

$$\alpha = 1 - (1 - \alpha a) - (1 - \alpha b)$$
$$= \alpha a + \alpha b - 1$$

where αa is the partial coverage between the lower polygon edge and the upper scan line and αb is the partial coverage between the upper polygon edge and the scan line. Similarly, if sub-pixel masks are used, the scan line buffer would consist of a scan line to the resolution of sub-pixel values. Thus, the final coverage of the thin polygon or vertex may be derived using the following compositing equation:

$$M_F = M_A \text{ AND } M_B$$

where "AND" represents the logical AND operation, $M_F$ represents a full sub-pixel mask, $M_A$ represents the sub-pixel mask for the lower polygon edge and $M_B$ represents the mask for the upper polygon edge.

Figure 9:
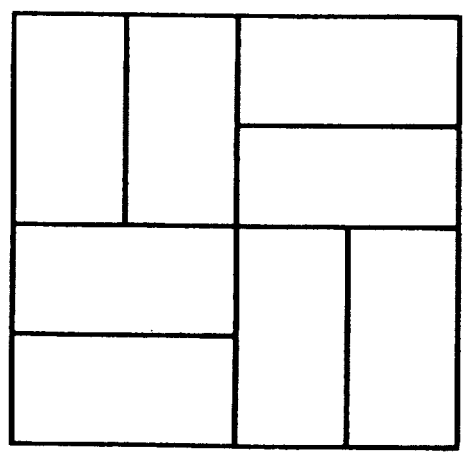
FIG. 9 illustrates an eight bit sub-mask.

The coverage of each of the edge pixels of a polygon may be represented by the α value or sub-pixel masks. The sub-pixel masks divide the area of a pixel into sub-pixel areas. The sub-pixel areas may be of any size or shape, although it is preferred that the sub-pixel areas be equal in area. In the present embodiment, the sub-pixel masks are designed to be equal in area by dividing the pixel area according to a 4×4 grid to provide a 16bit pattern of coverage for a polygon on a pixel. The mask represents coverage of a combination of 16 sub-pixel areas plus full coverage and no coverage. Each sub-pixel element represents a geographic location of a sub-pixel. Thus, the mask provide a more accurate representation of the coverage of the pixel because not only the amount of coverage but the actual location of coverage within a pixel is determined. Alternatively, to minimize the number of masks in the look-up table stored in memory, an eight bit mask may be used in which the pixel area is divided into eight sub-pixel areas according to a predetermined or randomly generated pattern such as the mask illustrated in FIG. 9.

The set of masks in the look-up table stored in memory should provide a sub-pixel mask for all possible combinations that may occur. To save space in memory, it is preferred that the number of masks stored be reduced by one-half by not storing those masks which are the complement of or are a mirror image of a mask already stored. During the rendering process, those masks not stored may be easily determined by complementing the mirror image mask stored in memory.

Figure 10:
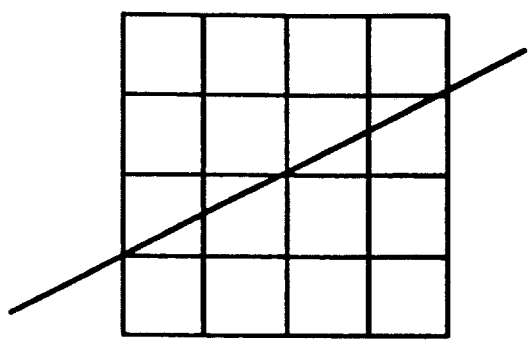
FIGS. 10a, 10b and 10c illustrate an exemplary polygon edge and corresponding inclusive and exclusive sub-pixel masks.
Figure 10:
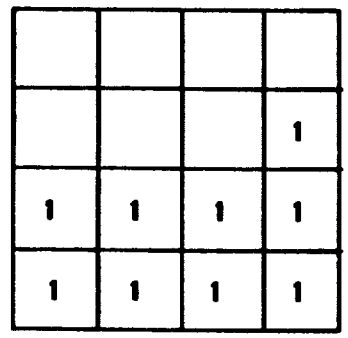

The masks may be generated empirically or through a predetermined process which addresses all possible combinations of masks. The procedure to generate the masks should insure that actual amount of coverage area is approximately equal to the amount of coverage area determined for the corresponding mask. This is illustrated by FIGS. 10a and 10b. FIG. 10a shows an edge through a pixel wherein the inclusive side of the edge covers approximately ⅝ of the area of the pixel. The corresponding mask, shown in FIG. 10b has sub-pixels set that cover 9/16 of the area of the pixel. This mask accurately represents the edge because the areas of coverage are approximately equal.

Figure 10C:
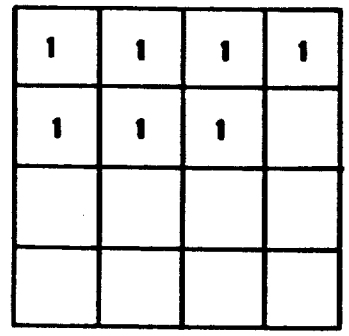
Figure 11A:
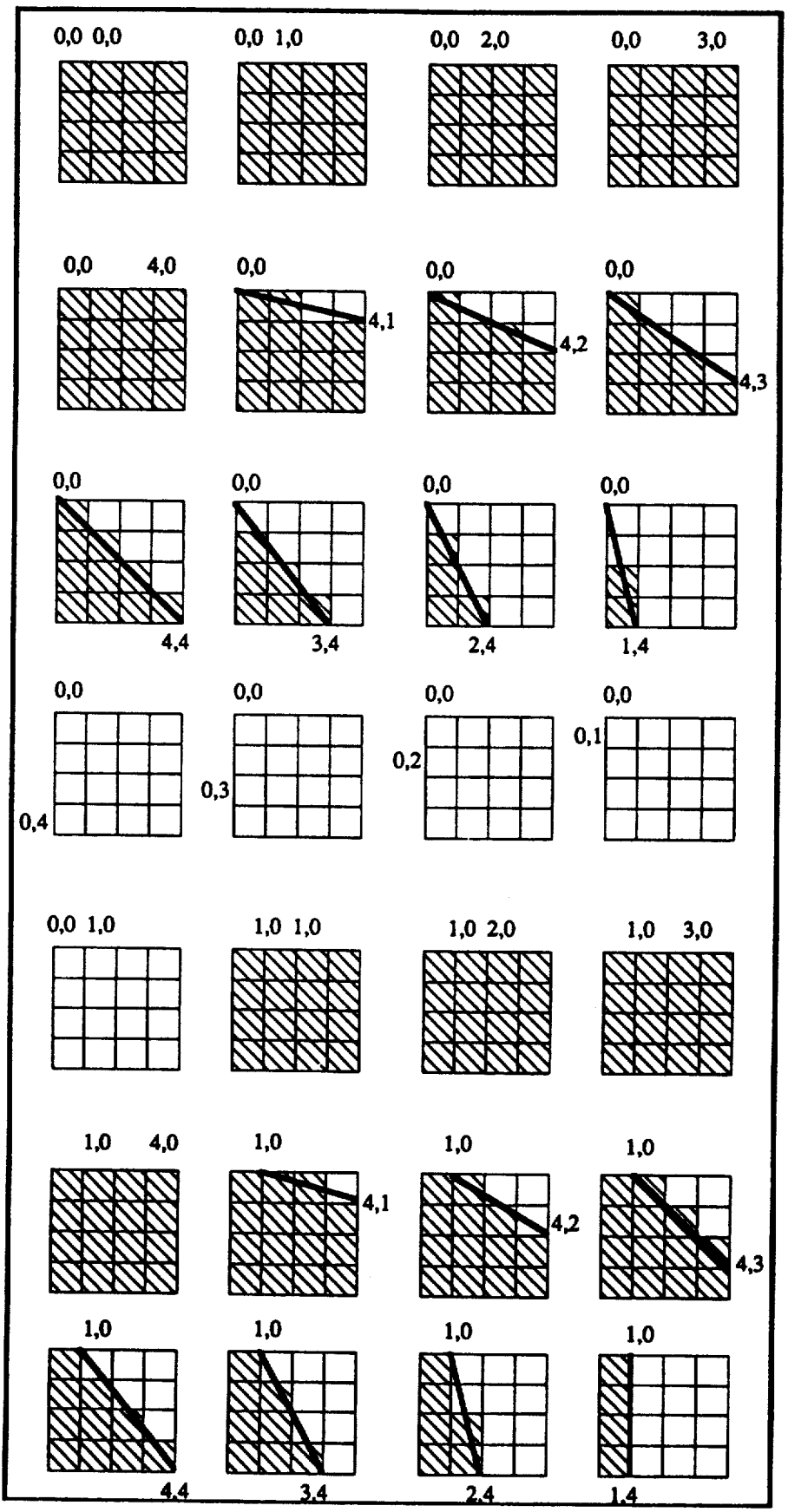
Figure 11B:
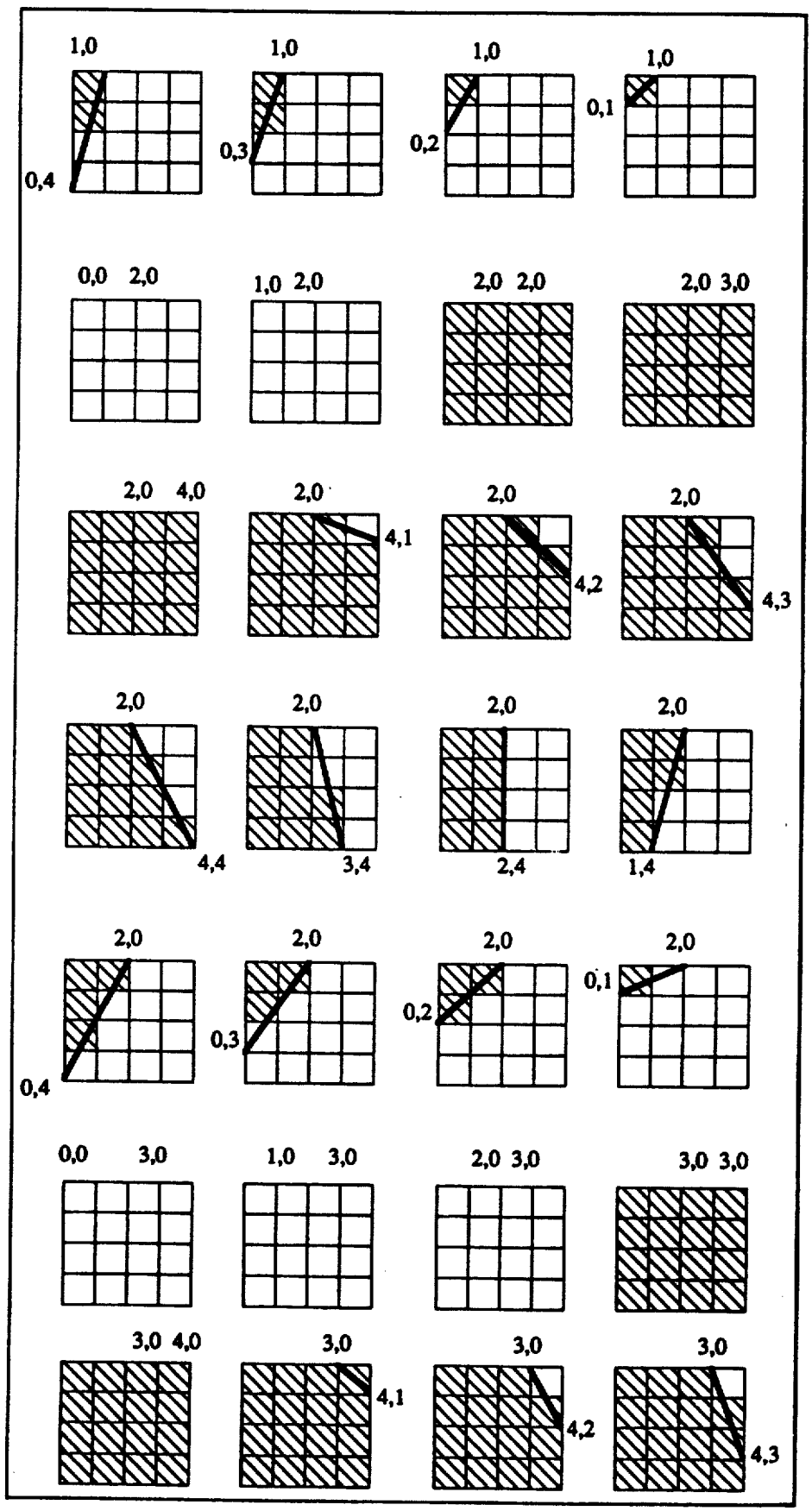
Figure 11C:
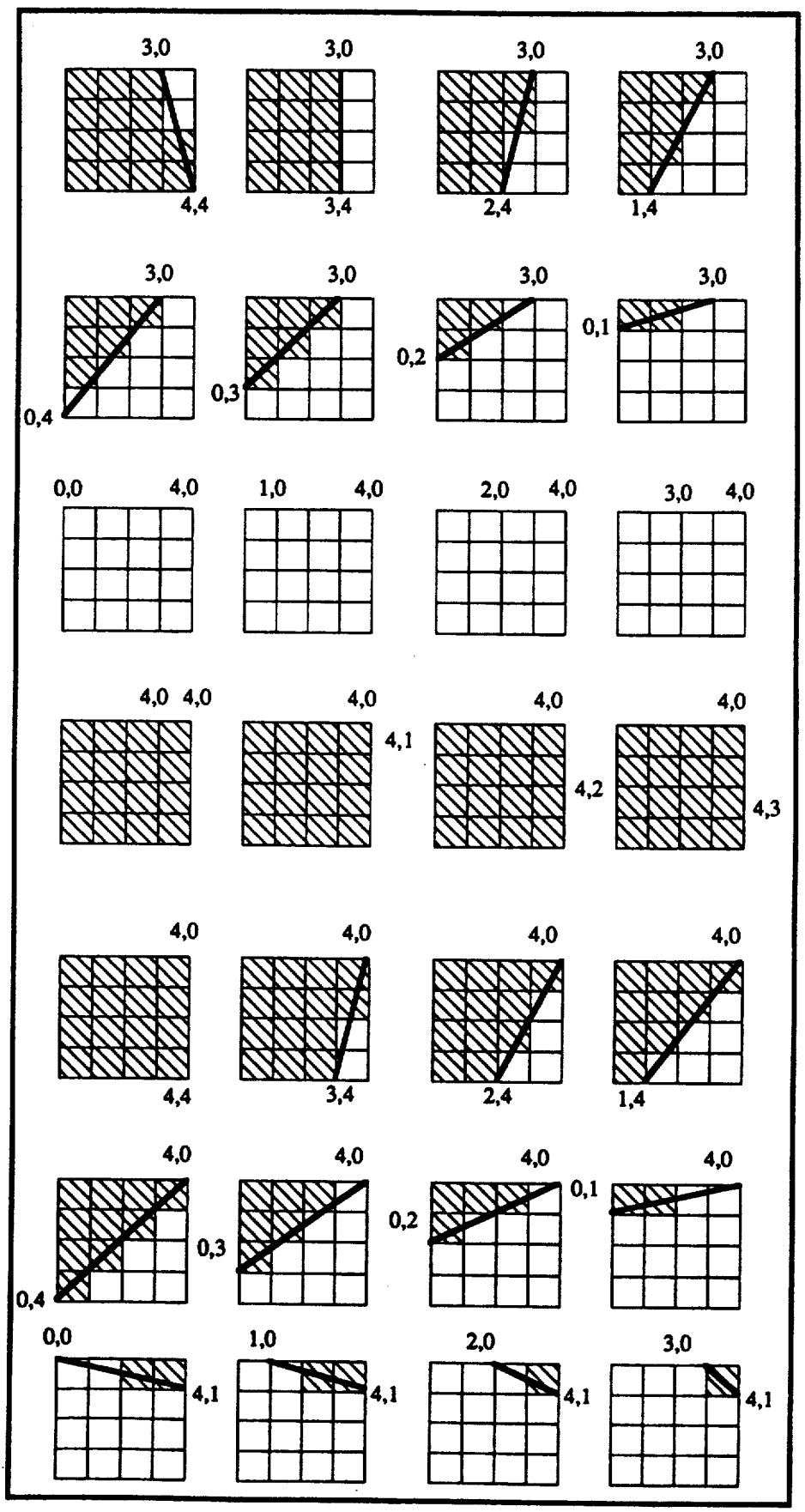
Figure 11D:
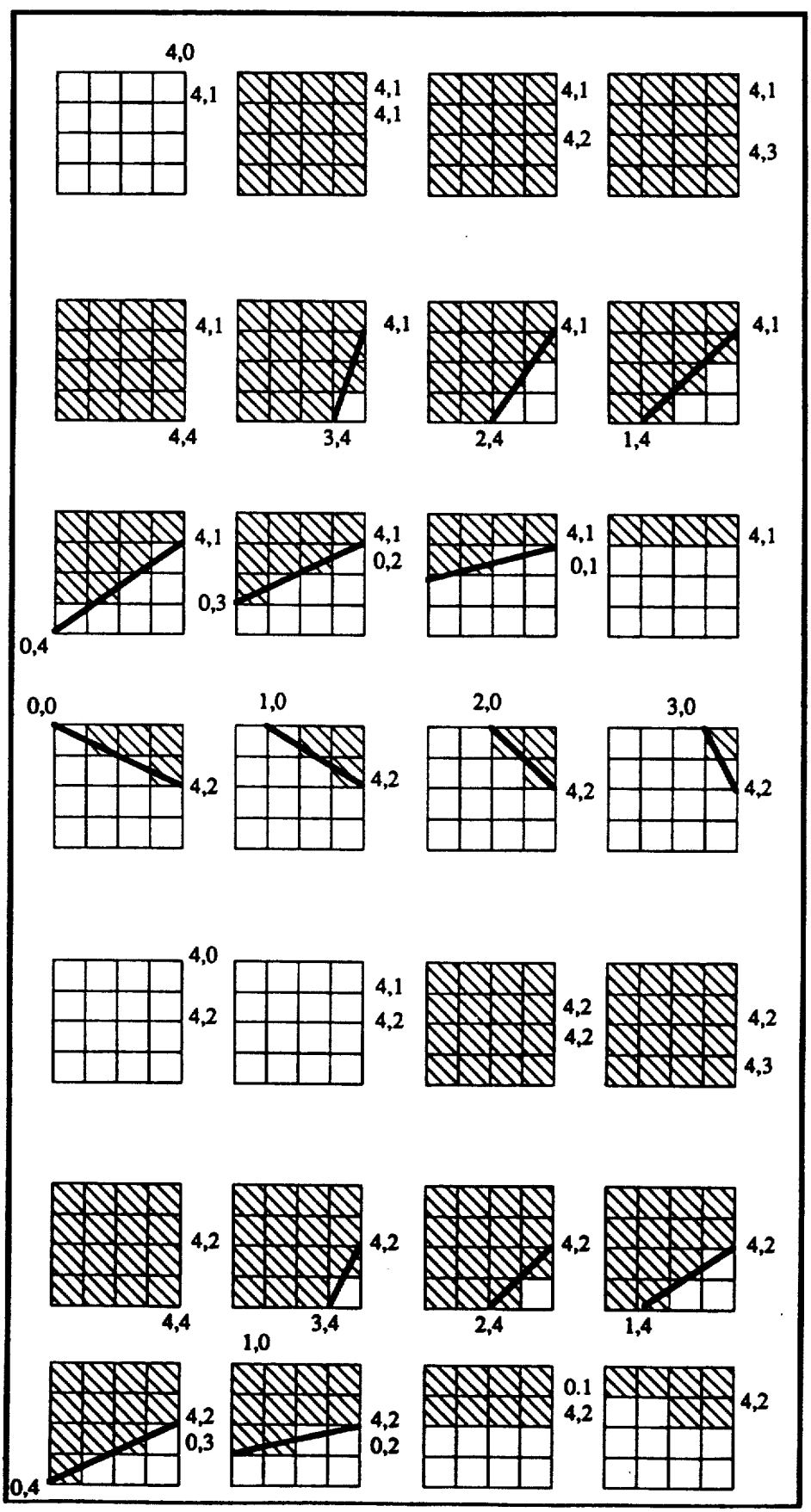
Figure 11E:
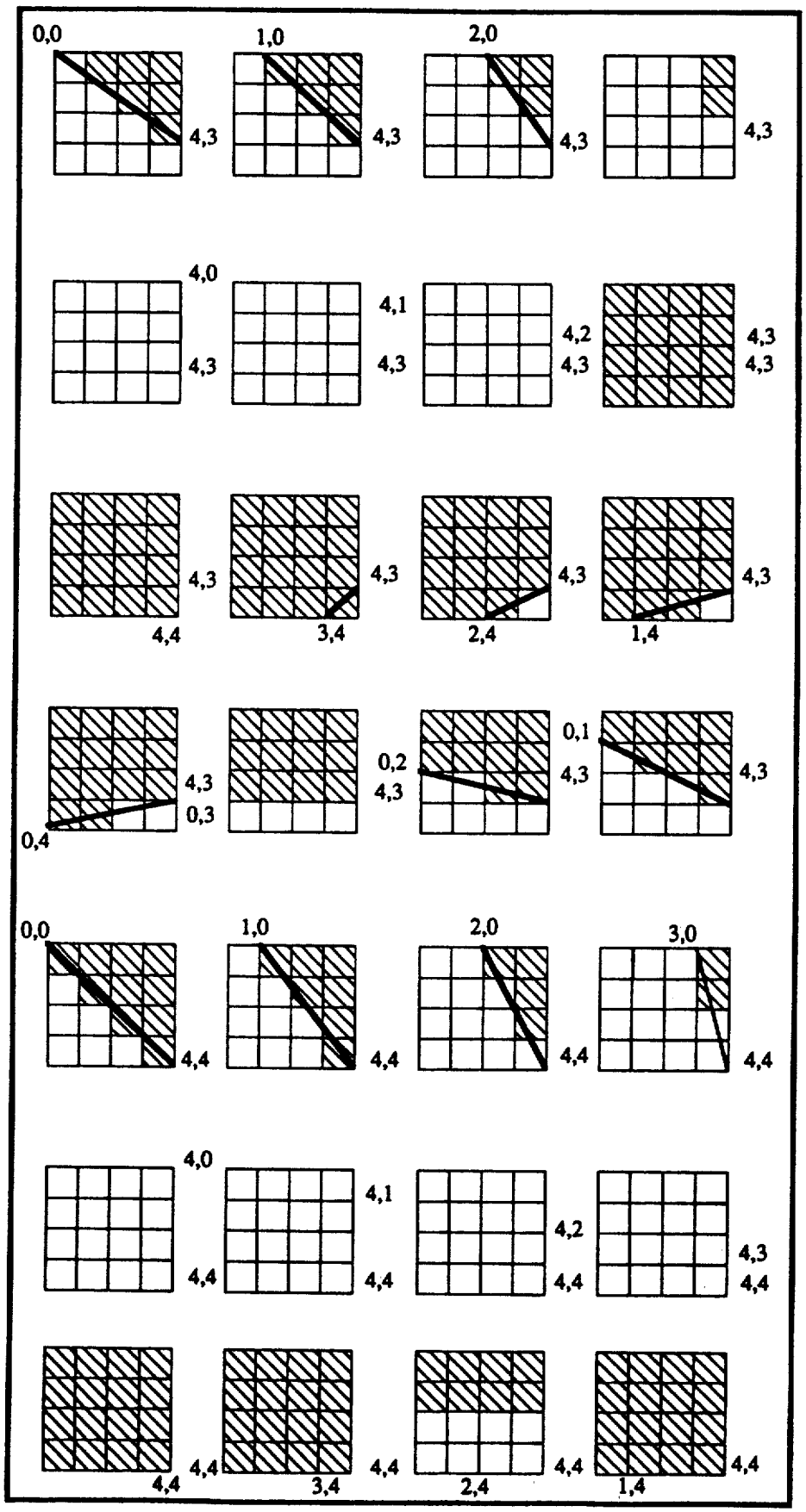
Figure 11F:
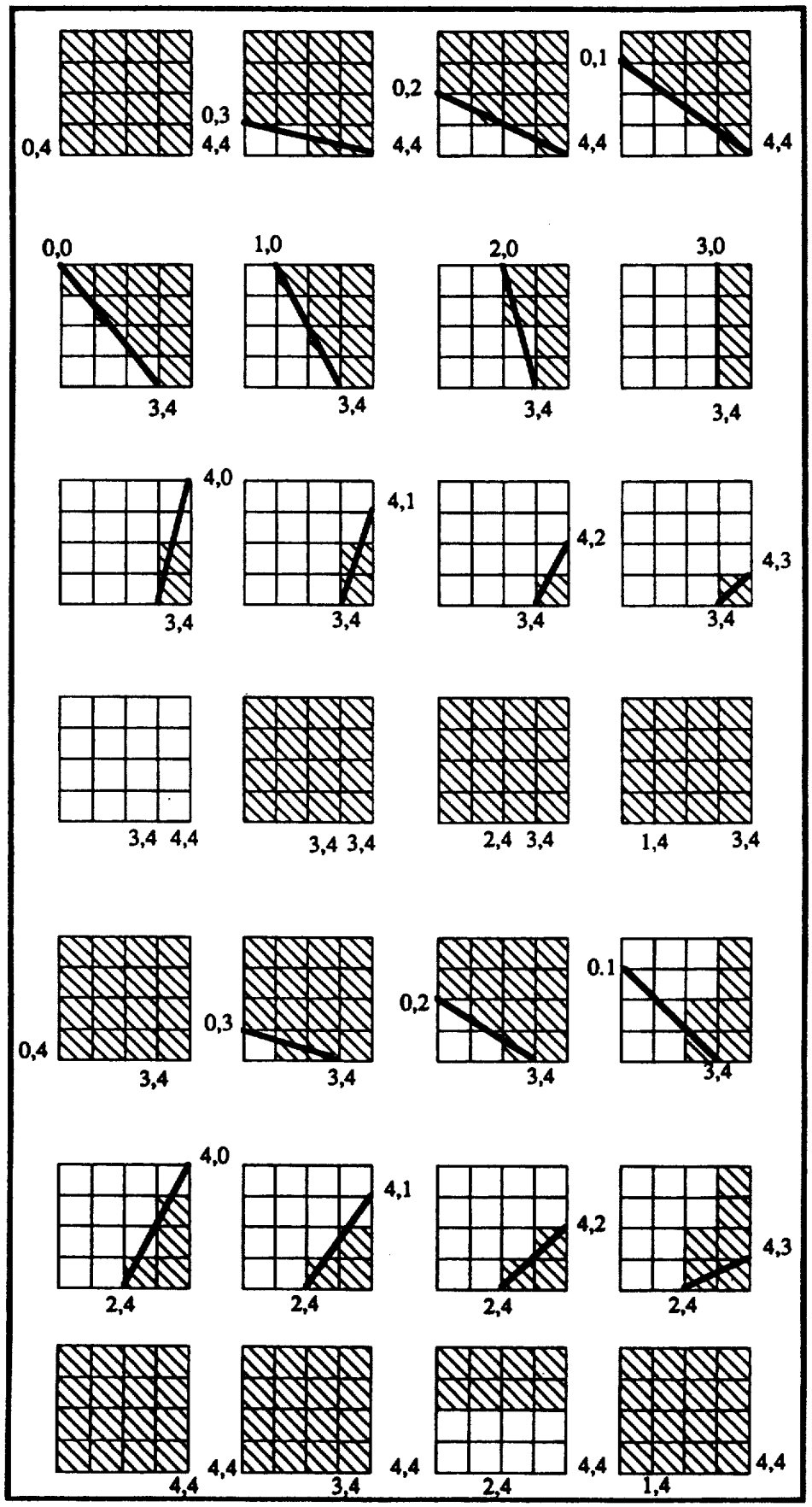
Figure 11G:
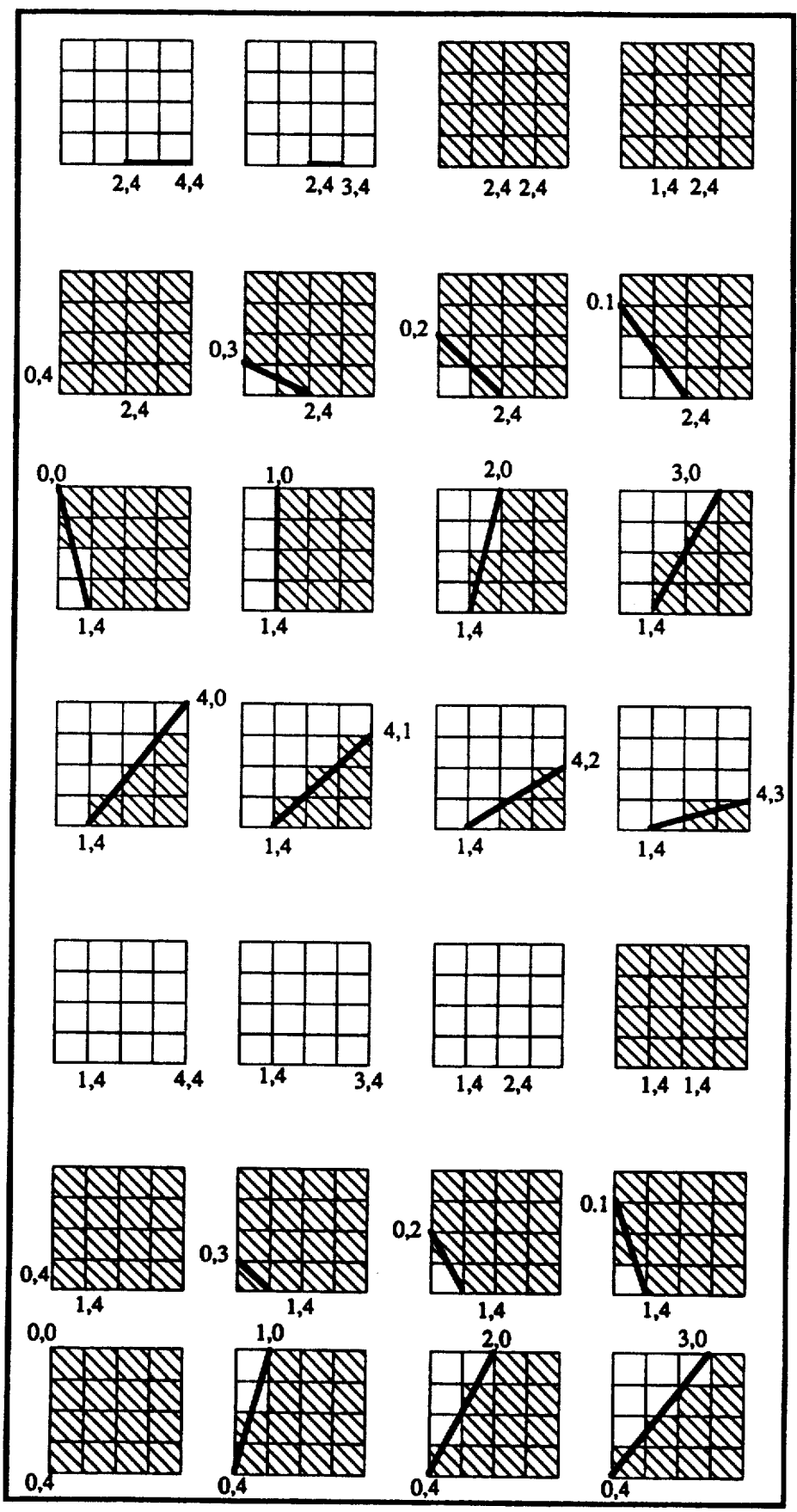
Figure 11H:
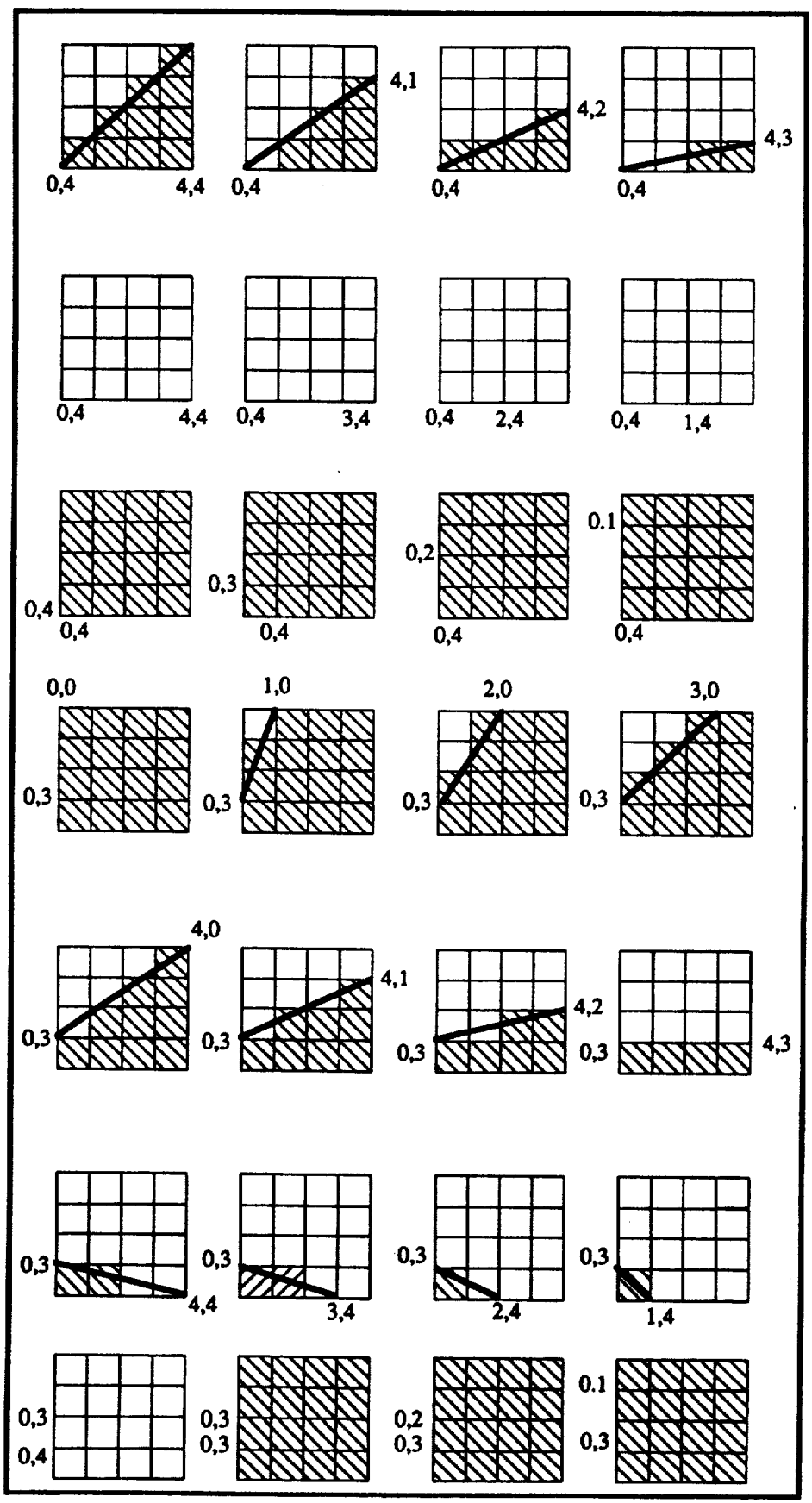
Figure 11I:
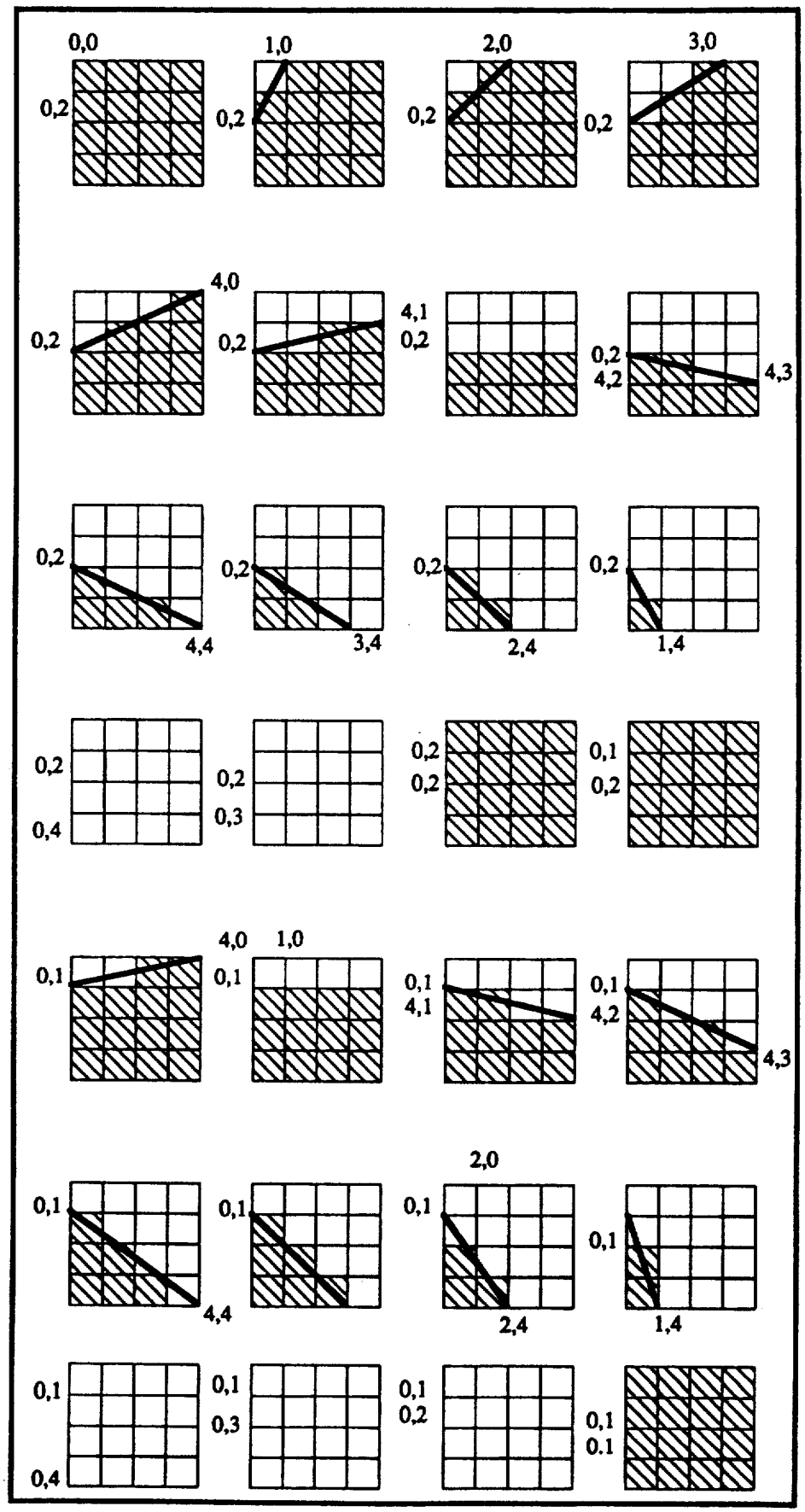

The mask generation procedure should also be able to generate the mask for the area on one side of the edge and the mask for the other side of the edge whereby if the two masks are added together, the resultant mask equals full coverage. This is illustrated by FIGS. 10b and 10c. FIG. 10b, as stated earlier, represents the corresponding mask generated for the inclusive side of the edge illustrated in FIG. 10a. FIG. 10c is the mask generated for the exclusive side of the edge illustrated in FIG. 10a. The sum of the masks in FIGS. 10b and 10c result in a full mask which indicates that the process for the generation of the masks is accurate.

One way to generate the masks is by determining a set of masks for each sub-pixel which correspond to the areas drawn by a plurality of vectors through the center of the sub-pixel which span the range of angles. The vector may be rotated by a predetermined increment and the mask computed according to a scan conversion process which determines the edge sub-pixels (such as Bresenham's) and filling in all sub-pixels within the area delineated by the edge sub-pixels. This process is performed with respect to each sub-pixel.

Another method to generate the masks is by using the Pitteway/Watkinson algorithm to determine the masks according to a predetermined area size and entry point. The area size and entry point is then varied to generate the different masks.

An illustration of the formulation of alpha values and corresponding sub-pixel masks are provided by FIGS. 11a, 11b, 11c, 11d, 11e, 11f, 11g, 11h, 11i, and 11j. In this example, 16 cell tables are addressed by two intersection points. It is assumed that the intersection point for the left edge is (0.0, 0.0) and that the facet to be represented resides to the right of this left edge. To calculate the sub-pixel masks and coverage values, the Bresenham line algorithm is employed to transverse the display element. However, the step size is 0.25 rather than 1.0.

FIGS. 11a, 11b, 11c, 11d, 11e, 11f, 11g, 11h, 11i present the masks for the different combinations of intersection points for facets to the left of the edge. The facets to the right of the edge can be determined simply by complementing the corresponding mask for the facet to the left of the edge.

FIG. 11j presents a table of alpha or coverage values for facets to the left of the edge. These may be determined simply by summing the number of sub-pixels set in the mask. A value of 16 represents full coverage. The coverage values for facets to the right of the edge may be determined by subtracting one coverage value for the facet to the left of the edge from the value of sixteen.

The masks are incorporated into an array or set of tables which are stored in memory. During the rendering of anti-aliased polygons, the masks are accessed according to an index determined from the edge which resides within the pixel. The index may be the entry sub-pixel and exit sub-pixel, that is the sub-pixels at which the edge enters the pixel and exits the pixel. Alternatively, the index may consist of the entry sub-pixel and the slope of the edge through the pixel. The index may also be the slope of the edge through the pixel and the perpendicular distance from the center of the pixel to the edge. In addition, for the case of determining the mask for the vertex which occurs within a pixel, the index may be the entry sub-pixel and the sub-pixel location of the vertex.

Figure 1A:
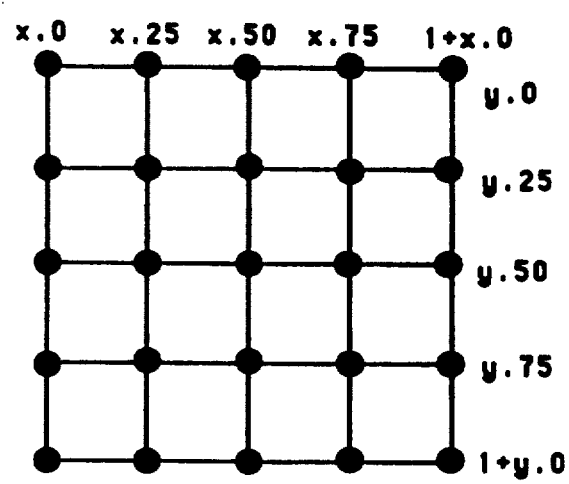
FIGS. 1a, 1b and 1c illustrate the concept of a sub-pixel mask for each pixel.
Figure 1B:
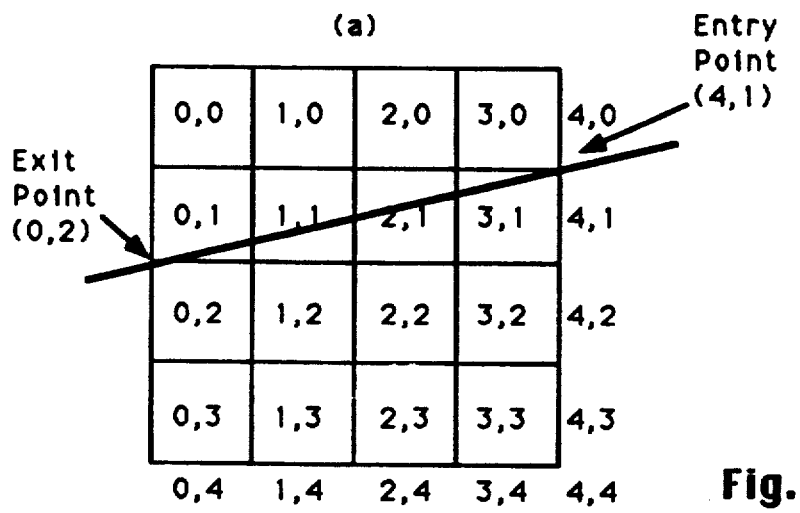
Figure 1C:
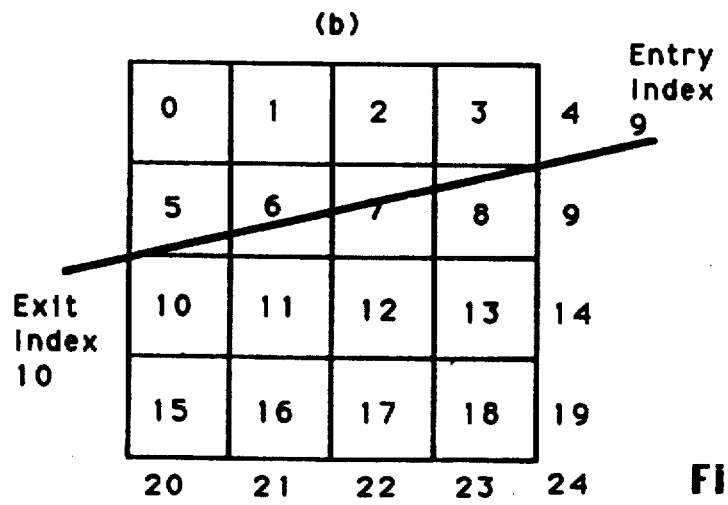
Figure 2A:
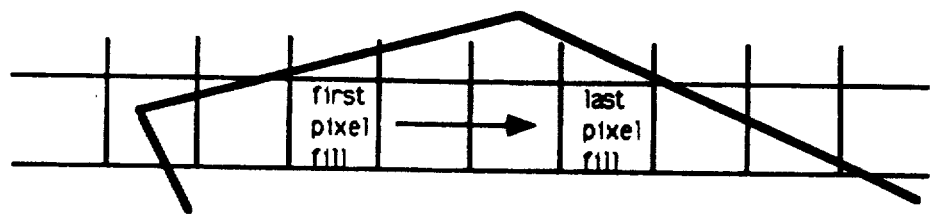
FIGS. 2a and 2b illustrate the definition of the first and last pixels filled between edges of a polygon.
Figure 2B:
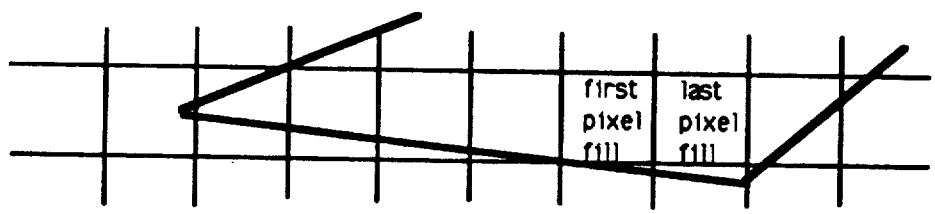
Figure 3A:
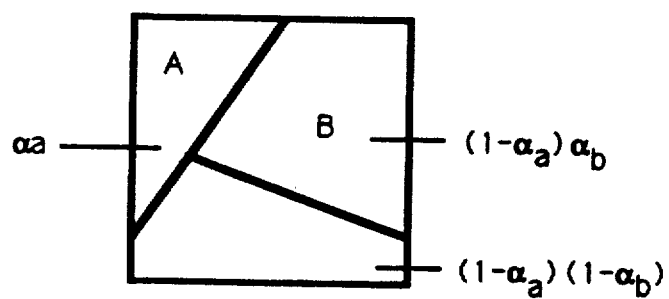

Referring again to FIG. 1, it is preferred that a 5×5 table is used to represent a 4×4 sub-pixel mask. The table is accessed via a sub-pixel entry index and exit index. The polygon entry and exit indices are the sub-pixel locations where the polygon edge respectively enters and exits the pixel. Polygon vertices are quantized to sub-pixel values after passing through any geometric manipulations. To calculate the entry index for the table, the sign of the slope of the edge must be determined. This is used to compute the integer x coordinate of the pixel which is adjacent to the current pixel in the direction of the slope. By convention, it is preferred that horizontal edges are rendered left to right so that the adjacent pixel is always to the right. To determine adjacent pixels of vertical edges, the additional information of whether the edge is a right or left edge is needed. The adjacent pixel x value is then substracted from the current edge pixel x value and is multiplied by the number of sub-pixels in x (4 for the present example):

$0 = 0 \times 4;$
$1 = 0.25 \times 4;$
$2 = 0.5 \times 4;$
$3 = 0.75 \times 4;$
$4 = 1 \times 4$ The values, 0.25, 0.5, 0.75 and 1, are the quantization levels for the present mask used. These fractional values are produced because of the rounding to the nearest sub-pixel position at vertices prior to traversing the edge and subtracting the integer pixel value from the sub-pixel precision value. The value is multiplied by a value of 4 to identify the index into the sub-pixel matrix (See FIG. 1b). The same calculation is performed for the y values of the edge. These x and y indices give the sub-pixel number, in the present example 0 thorough 24, of the entry into the pixel. Masks are designed to allow the entry index to be within the pixel as well as on pixel boundaries. Identical procedures are performed for the exit sub-pixel (that is, the sub-pixel location at which the polygon edges crosses pixel boundaries). The exit sub-pixel is calculated at the location an adjacent pixel or scan line has been intercepted or where the edge ends (if it ends within the current pixel).

Figure 12:
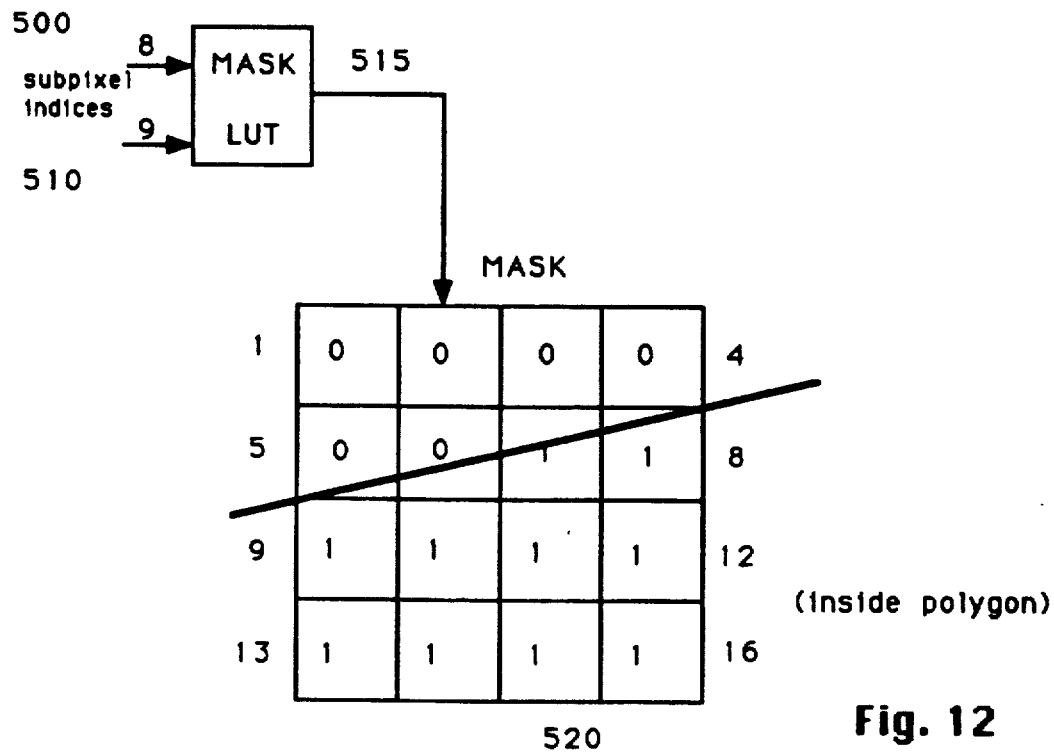
FIG. 12 illustrates the use of a look-up table to determine the sub-pixel mask for a pixel.

Once the entry and exit sub-pixel indices are determined, the mask is obtained from the look-up table. This is illustrated by FIG. 12 which shows the sub-pixel indices 509 and 510 being input to the mask look-up table 515 to derive the mask 520.

The masks generated for the situation of multiple edges occurring within a single pixel are first individually determined (that is, the mask for each edge is individually determined) and combined. In one embodiment, the masks are combined according to an edge code. The edge indicates whether the edge is a right or left edge, that is, whether the edge is convex or concave, which determines which regions are inside the edge and thus the polygon.

A pixel is inside a polygon if, at a particular scan line, the pixel is to the left of the right edge and to the right of the left edge. The identification of left and right edges may be performed a multiplicity of ways. In one method, the vertices of the polygon are sorted in descending order according to y coordinate values. The x coordinate values corresponding to adjacent y coordinate values are compared. If the x coordinate value corresponding to the greater y coordinate value is less than the x coordinate value corresponding to the lesser y coordinate value, the edge designated by the coordinates is a right edge. Conversely if the x coordinate value corresponding to the greater y coordinate value is greater than the x coordinate value corresponding to the lesser y coordinate value, the edge is designated as a left edge.

In another method, the polygon direction is determined. For example, the polygon may be described in a clockwise or a counter clockwise direction. If the polygon is described in a counter clock-wise direction and the change in x of the edges ($\delta x = x^2 - x^1$) is greater than zero, the edge is a left edge and the mask corresponding to the edge will be complemented. A vertical edge ($\delta x1 = 0$) will be coded as a left edge and be complemented if the change in y ($\delta y1 = y2 - y1$) is less than zero. In general edges the $\delta y1$ of which is greater than zero, are coded as left edges and those less than or equal to zero are coded as right edges. Horizontal edges proceeding from left to right ($\delta x1 > 0$) are coded as right edges and those proceeding from right to left are coded as left edges. Similarly, the vertex coding is accomplished using a cross product of the two participating edges' $\delta x$'s and $\delta y$'s calculated below:

$$\text{cross product (CP)} = (\delta x1 \times \delta y2) - (\delta x2 \times \delta y1)$$

where $\delta x1$, $\delta y1$ are from edge 1 and $\delta x2$ and $\delta y2$ are from edge 2. If the cross product is less than or equal to zero ($0 \geq CP$) the vertex is coded as convex which dictates that the two sub-pixel masks generated from the two edges are logically ANDed together. Otherwise, the vertex is concave which dictates that the two masks are logically ORed together. The vertices as well as the edges must be coded because one end of an edge at a first vertex may form a concave angle while the other end of the same edge at a second vertex may form a convex angle with another adjoining edge.

Figure 13A:
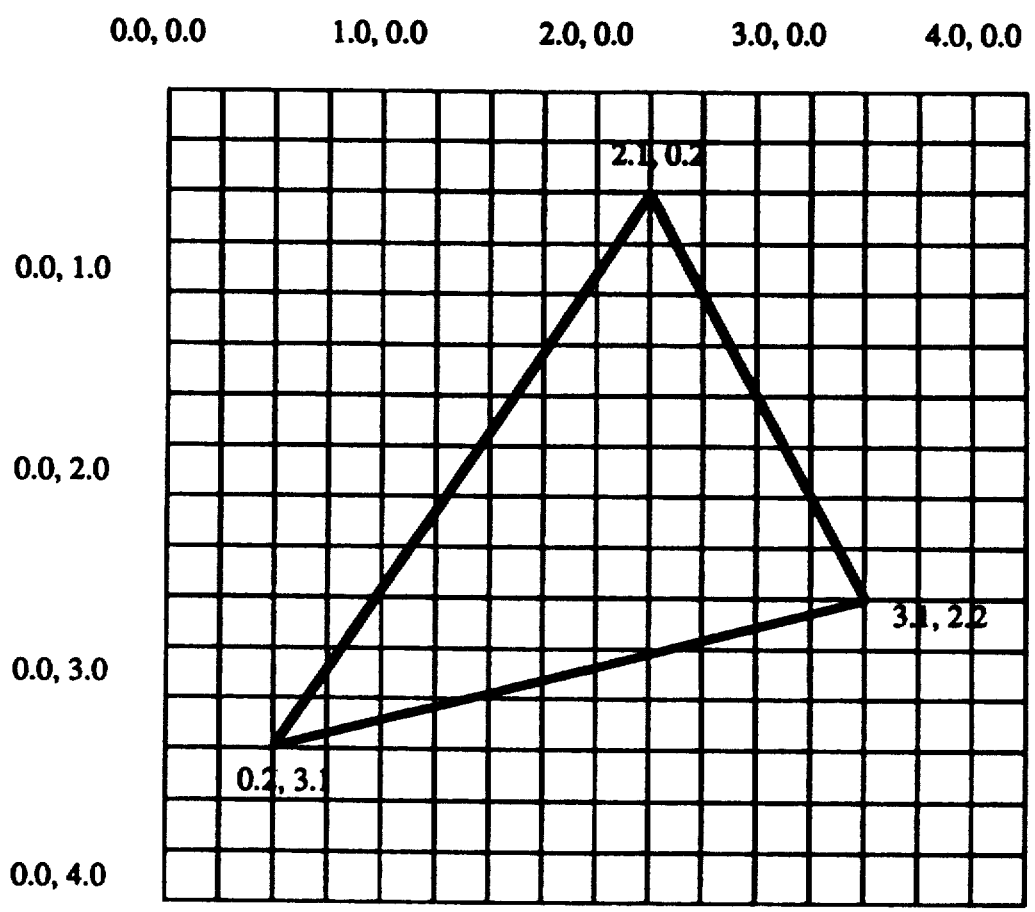
FIGS. 13a-13n illustrate an example of the generation of sub-pixel masks for a polygon.
Figure 13B:
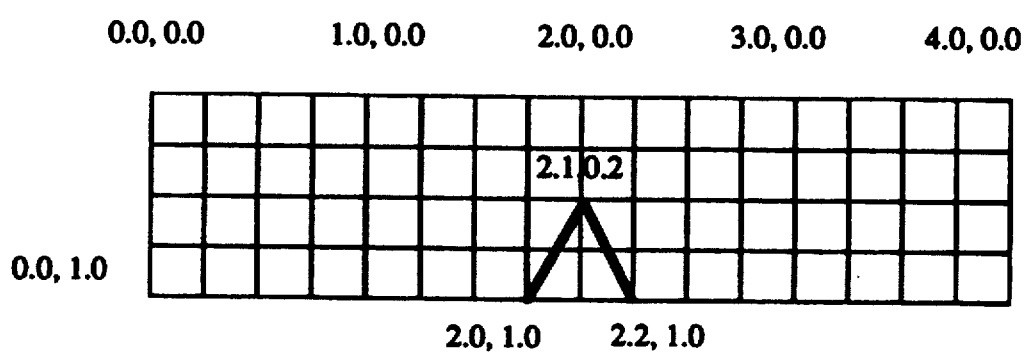

An example of the generation of pixel masks for a polygon is discussed below with reference to FIGS. 13a–13n. FIG. 13a shows a triangular shaped polygon having three vertices at (2.1, 0.2), (3.1,2.2) and (0.2, 3.1). The number to the left of the decimal point represents the pixel value and the number to the right of the decimal point represents the fractional or sub-pixel value. To generate the vertex positions, the vertex values are first translated into the display coordinate space. The vertex coordinates are then quantized to sub-pixel elements (preferably to at least two fraction bits within the pixel). The vertex positions are then sorted by Y coordinate values and by X coordinate values to establish the active edge list and the scan line order.

The scan line conversion algorithm determines that the first scan line to include a portion of the polygon is at y=0 because the first vertex is at y coordinate value 0.2. The next step is to extrapolate the sub-pixel locations of the edges (i.e., edge crossings) of the pixel because the sub-pixel locations of the edges are used to index to the proper sub-pixel mask. In the present example, the Bresenham algorithm is used to determine the intersection of the polygon edge with the edge of the pixel.

The first pixel evaluated is the pixel at (2.0, 0.0) because the first vertex is at (2.1, 0.2). This is illustrated in FIG. 13b. Because the vertex lies within a single pixel, each edge of the vertex is individually determined and combined to generate the sub-pixel mask for the vertex. Thus, as illustrated by FIG. 13c, the left edge of the vertex (the edge between (2.0, 1.0) and (2.1, 0.2)) is extrapolated to intersect the edge of the pixel using the Bresenham algorithm at sub-pixel location (2.2, 0.0). Similarly, the right edge of the vertex (the edge between (2.2, 1.0) and (2.1, 0.2)) is extrapolated to intersect the edge of the pixel at sub-pixel location (2.0, 0.0).

These entry and exit points to the pixel are used to index the coverage table containing the sub-pixel masks.

The fraction bits (the value to the right of the decimal point) of the entry and exit points are extracted to create the address which forms the index into the coverage table. It should be noted that an intersection point may cross one of five sub-pixel areas: the four sub-pixels of the current pixel and the 0 sub-pixel of the next adjacent sub-pixel. Thus when an intersection point occurs on the right or bottom edge of the pixel, the more significant bit, in the present example this is the number to the left of the decimal point, is referred to. If the value of the fraction bits is zero, the more significant bit is compared to the value of the more significant bit of the current pixel. If the two values are equal, the portion of the address for that particular coordinate of the intersection point is zero. If the value of the more significant bit of the coordinate value of the intersection point is greater than the corresponding bit of the current pixel, the address for that particular coordinate of the intersection point is given a value of 4. In the present example, this process would result in the values shown in FIG. 13d. The table of FIG. 13d includes a bit, referred to as the "lr" bit, which designates whether the edge is a left or right edge. The values for each edge are utilized to address the coverage table to retrieve the corresponding sub-pixel mask for each edge.

The coverage table returns the sub-pixel mask for the infinite edge which intersects the pixel at the address determined. FIG. 13e illustrates the sub-pixel masks which would be retrieved from the coverage table. Using vertex logic, as described above, it is determined that the vertex is convex; therefore the two sub-pixel masks are combined by logically ANDing the two masks. The resultant sub-pixel mask is written into an intermediate scan line buffer which stores the pixel values for the current scan line until the scan line is completely processed for the current polygon and the data is transferred to the frame buffer.

At this point, there are no other pixels on the current scan line which contain a portion of the polygon. This is detected by the scan line logic which indicates that the data contained in the intermediate scan line buffer is composited into the frame buffer and processing is to continue at the next scan line.

Figure 13F:
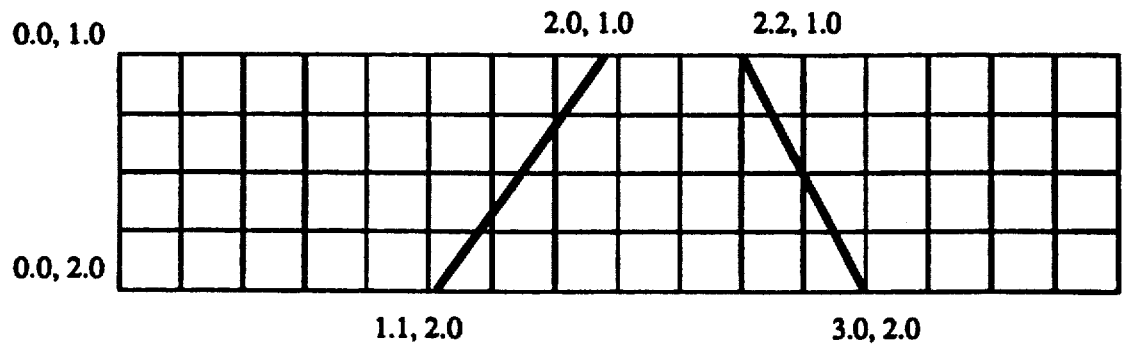
Figure 13G:
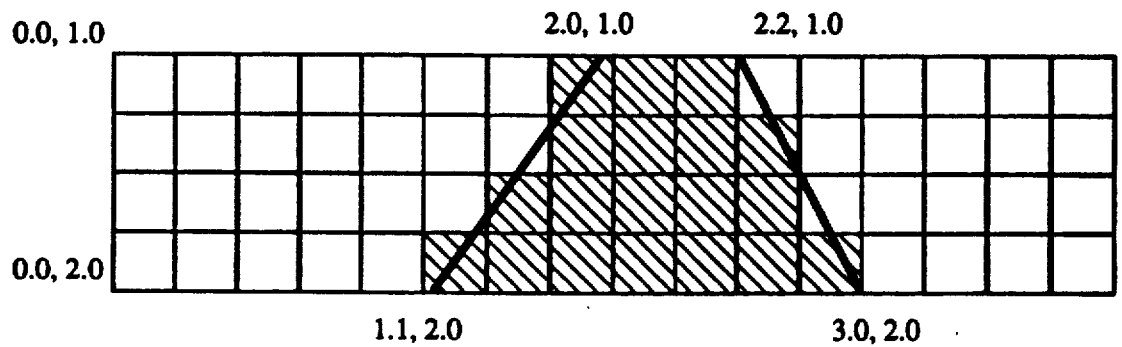

The next scan line, illustrated by FIG. 13f, consists of two edges, each intersecting a separate pixel. Each edge is processed individually to retrieve the corresponding sub-pixel masks (illustrated by FIG. 13g) which are stored in the intermediate scan line buffer and subsequently composited into the frame buffer.

Figure 13H:
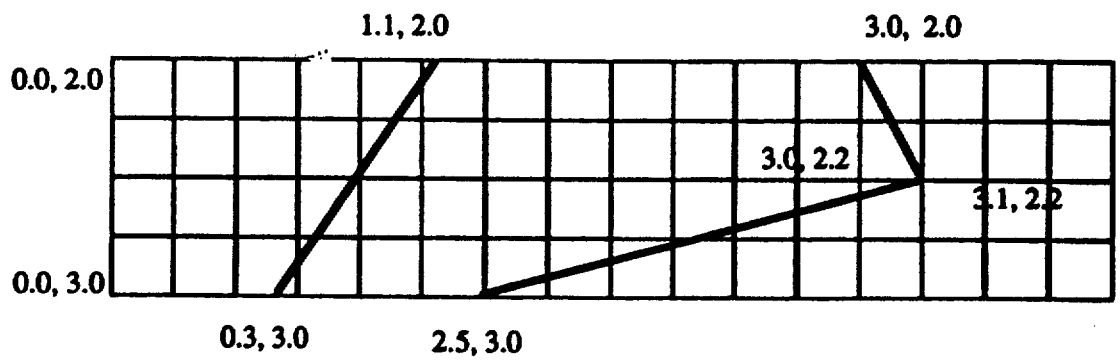
Figure 13I:
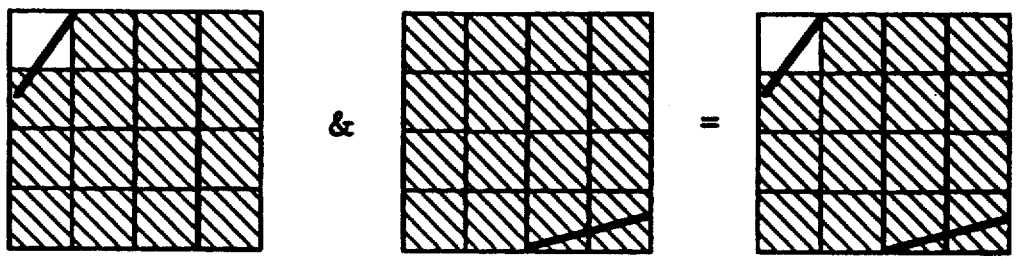

The third scan line to be processed is illustrated by FIG. 13h. The sub-pixel masks for the three pixels are determined according to the process described with respect to the first two scan lines. However, it should be noted that the pixel at location (1.0, 2.0) involves two separate edges. Provisions are made in the scan line logic to provide for this case. When the first edge intersects this pixel, the scan line logic detects that the pixel location in the intermediate scan line buffer has not been written into (with respect to the current scan line). Thus, the sub-pixel mask is written into the intermediate scan line buffer. When the second edge which intersects the pixel is processed, the logic detects that the particular pixel in intermediate scan line buffer has been written into and combines the sub-pixel mask with the sub-pixel mask in the intermediate scan line buffer by logically ANDing the two sub-pixel masks together (this is illustrated by FIG. 13i).

Figure 13J:
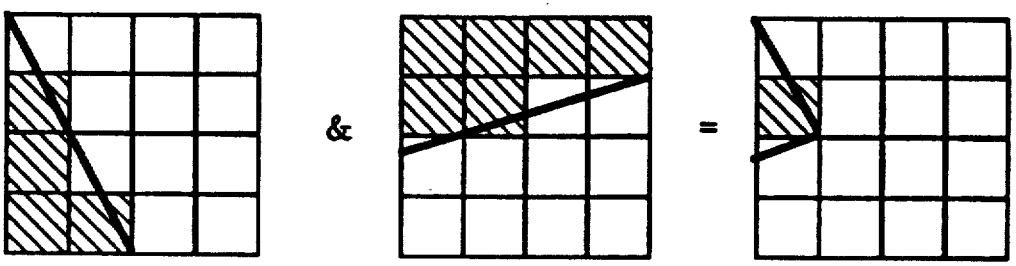
Figure 13K:
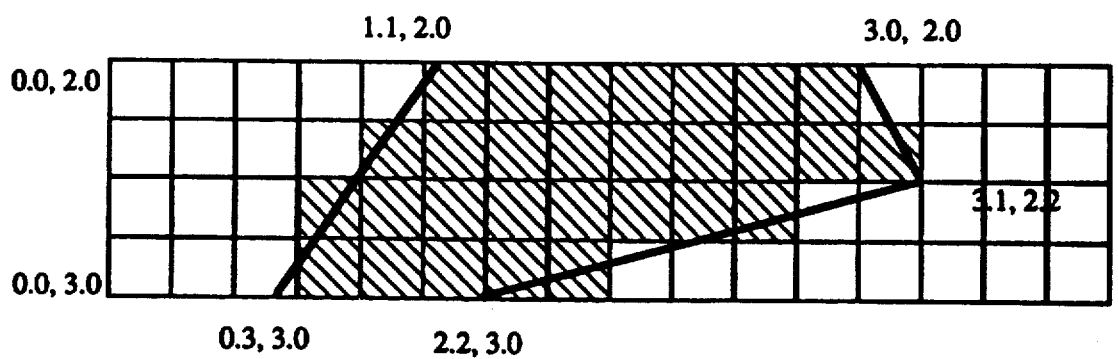

During the processing of the rightmost pixel, the edge logic determines that the extrapolated right edge of the pixel extends beyond the second vertex. This indicates that the right edge is complete and the right edge is deleted from the active edge list. The sub-pixel masks for the edges which form the second vertex are individually determined and combined (as illustrated by FIG. 13j) by logically ANDing the two sub-pixel masks together. The resultant coverage for the scan line is illustrated by FIG. 13k.

Figure 13L:
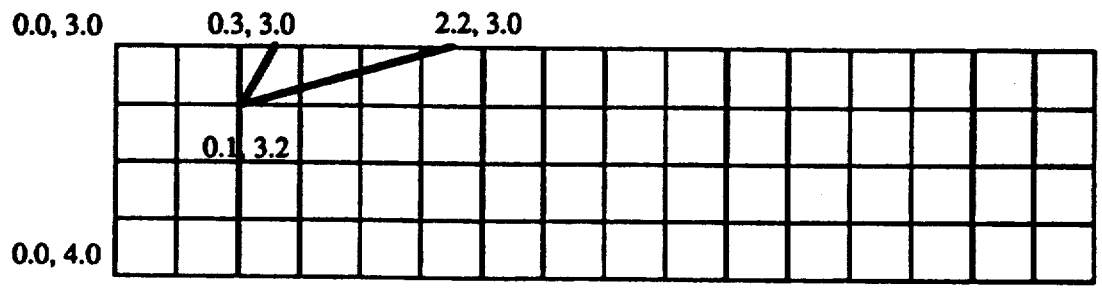
Figure 13M:
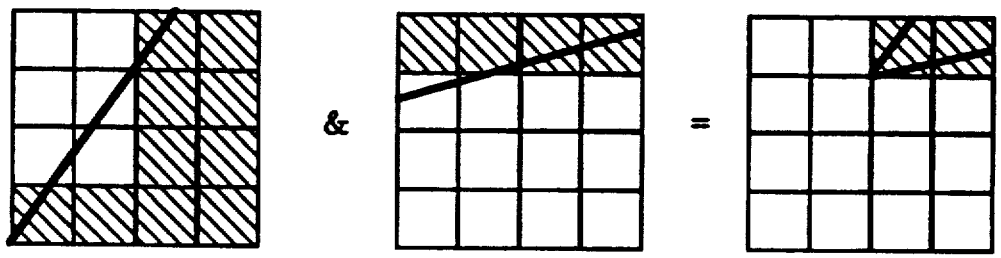
Figure 13N:
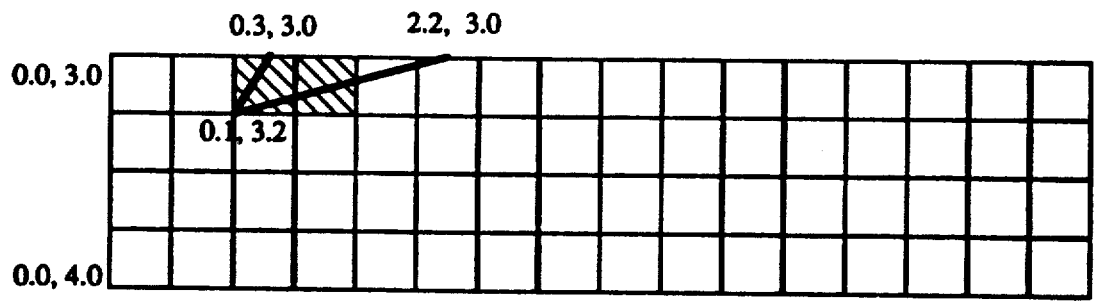

The next scan line, illustrated by FIG. 13l, consists of the third vertex of the polygon. The edges which form the vertex are extrapolated to determine the intersection points (i.e., the edge entry and exit points of the pixel). By comparison of the locations of the intersection points with the location of the vertex, it is determined that the right edge of the pixel, determined by extrapolating the right edge of the vertex, extends beyond the left edge of the vertex and the left edge of the pixel, determined by extrapolating the left edge of the vertex, extends beyond the right edge of the vertex. Thus, the left and right edges are removed from the active edge list (the active edge list is now empty) and, as illustrated by FIG. 13m, the sub-pixel masks for each edge which forms the vertex are retrieved from the coverage table, logically ANDed together and stored in the intermediate scan line buffer (illustrated by FIG. 13n). The sub-pixel masks stored in the intermediate scan line buffer are subsequently composited with the corresponding pixels in the frame buffer to complete processing of the polygon.

Referring again to FIG. 6, once the correct partial coverage of boundary pixels or edges of the polygon are determined, at block 310, the pixels between edge pixels are filled. Preferably as each edge pixel is computed, an x value is identified with it which represents the first non-edge pixel interior of the polygon. This pixel is the first pixel to be filled inside the polygon. These x values are then sorted by y values and increasing x values and an odd/even rule is used to begin a fill span and end a fill span for any number of spans on a current scan line.

The first x value in the sorted list will be a left edge at which point the fill will begin by turning on each successive pixel. The fill process continues until a corresponding right edge is found. The list is further reviewed to see if another set of left and right edges are found in the current scan line to repeat the fill process.

Figure 14:
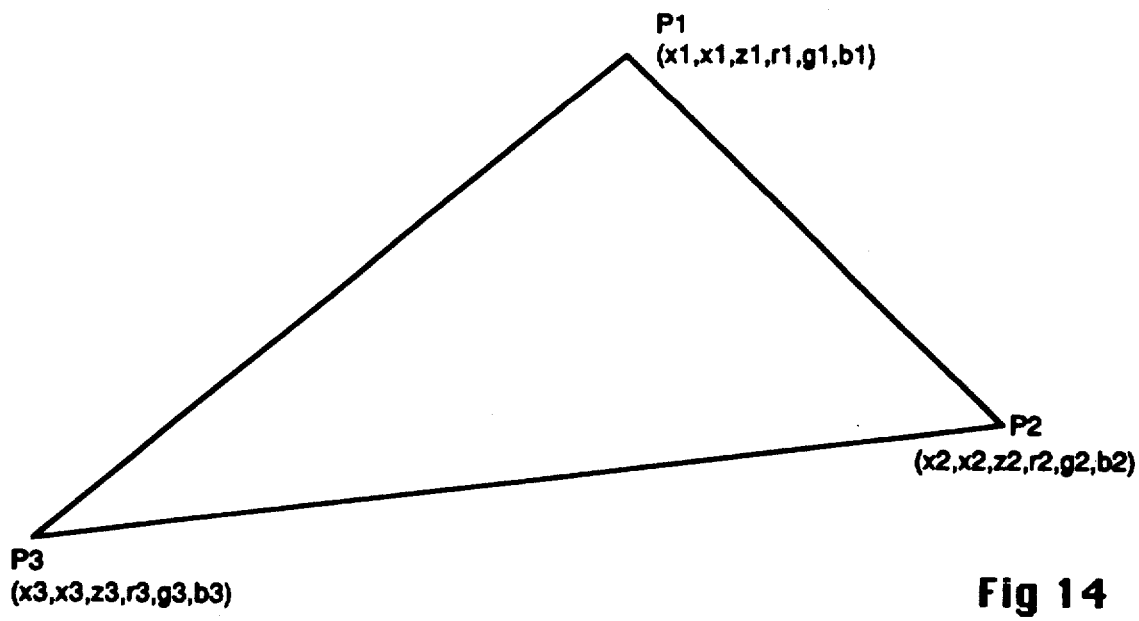
FIGS. 14 illustrates a polygon used to describe a scan line conversion algorithm.

Preferably, the scan line processing between edge pixels is accomplished using a simple linear interpolation loop; for example for a planar polygon:

while (x < right__x)
process__pixel (x, y, z, r, g, b)
x+ = scale__x
z+ = dzDx
r+ = drDx
g+ = dgDx
b+ = dbDx where x, y, z denote the display coordinate value, with z denoting depth, and r, g, b denote the color coordinate values red, green, blue, the x, y, z, r, g, b are the x, y, z, r, g, b values to be computed, "right__x" is the right edge pixel of the span being processed, "scale__x" is the pixel increment across the scan line, " + = " represents the operation of incrementing the variable to the left of the operator by the variable to the right of the operator and dz Dx, dr Dx, dg Dx and db Dx respectively are the slopes of z, r, g, b with respect to x and are computed according to the following equations (assuming the edge pixels are identified by the end points of left edge P1-P3 and the end points of right edge P1-P2 as shown in FIG. 14):

$$dzDx = \frac{(dz1 - dy1 * (dz3/dy3))}{(dx1 - dy1 * (dx3/dy3))}$$

$$drDx = \frac{(dr1 - dy1 * (dr3/dy3))}{(dx1 - dy1 * (dx3/dy3))}$$

$$dgDx = \frac{(dg1 - dy1 * (dg3/dy3))}{(dx1 - dy1 * (dx3/dy3))}$$

$$dbDx = \frac{(db1 - dy1 * (db3/dy3))}{(dx1 - dy1 * (dx3/dy3))}$$

where dx1, dy1, dz1, dr1, dg1 and db1 are the difference values for the x, y, z, r, g, b values between the end points P1, P2 which form the right edge of the span and dx3, dy3, dz3, dr3, dg3 and db3 are the difference values for the x, y, z, r, g, b values between the end points P1, P3 which form the left edge of the span on a scan line.

Once a scan line of polygon has been converted to pixel values, at block 320, FIG. 6, the z or depth value of each pixel of the polygon (hereinafter referred to as $z_a$) is compared to the z buffer value of each background pixel (zb) to be composited with the polygon to determine the set of compositing equations to use. By employing the z value of each pixel as a control for determining the compositing equations to use, an accurate rendering of the polygon composited with the background can be achieved.

At block 330, if $z_a$ is less than $z_b$, then the polygon is in front of the background pixel and at block 340 the pixel of the polygon is composited with the background pixel.

FIG. 15a sets forth the compositing equations employed when a single alpha value is used to describe the extent of coverage of a pixel and FIG. 15b sets forth the equations employed to composite a pixel to the background pixel when sub-pixel masks are used to represent the coverage at a pixel.

Thus, if $z_a$ is less than $z_b$, and the alpha value is used to describe coverage, the color of the background pixel upon compositing is computed according to the equations 540, 545, 550, FIG. 15a, the alpha value for the background pixel is updated according to equation 555 and the z buffer value is set, according to FIG. 560, to equal the z value of the pixel of the polygon ($z_a$).

If sub-pixel masks are used to describe coverage, referring to FIG. 15b, the coverage value αa is determined from equations 650 and 655 and is simply determined according to the number of sub-pixel elements in the mask that are set to 1 divided by the total number of sub-pixels in the mask. Equations 660 and 665 determines the color composite of the polygon pixel and the background pixel which is the updated color of the background pixel. Equation 670 derives the resultant sub-pixel mask to be stored in the α channel of the background pixel. The sub-pixel mask is the logical OR of the previously stored sub-pixel mask of the background pixel and the mask of the pixel of the polygon. In as much as the new polygon is closer to the viewer, the z buffer value is updated to be the z value of the polygon pixel (equation 675).

If the background pixel is in front of the polygon pixel, block 350, FIG. 6, and if a single alpha value is used to describe the extent of coverage of a pixel, at block 360, FIG. 6, the background pixel and polygon pixel are composited and the alpha value is updated. Equations 565, 570, 575, FIG. 15a, are used to determine the color of the background pixel upon compositing and equation 580 is used to determine the updated value of alpha. The z buffer value remains the same because the polygon pixel composited with the background is behind the background pixel (equation 585).

At block 350, FIG. 6, if masks are used to describe coverage, if $z_b$ is less than $z_a$, the background pixel is in front of the polygon pixel and at block 360 the polygon pixel is composited with the background pixel using the equations 680, 685, 690, 695, 700, 705 and 710 in FIG. 15b. These equations are employed when the z value of the polygon pixel is greater than that of the background pixel and the mask is not already full, that is, the pixel has not been already occluded by a polygon. The sub-mask used to derive the proportional color contribution to a pixel is first logically ANDed with the logical complement of the stored background sub-pixel mask as shown in equation 680. This operation filters out pixel areas which could not possibly be visible as indicated by the mask of the background pixel. The result of the composite mask operation are those sub-pixels which could be visible, thus contributing to the coverage value (equation 685). The pixel color is determined by equation 690 and the resultant sub-pixel mask and color of the background pixel are determined by equations 695, 700 and 705. The value of the z buffer is not changed because the background pixel is in front of the polygon pixel (equation 710).

At block 370, FIG. 6, if $z_a$ equals $z_b$, two methods may be employed to perform the composition operation of block 380. The first method is to simply over write the background pixel color with the color of the polygon pixel. This method is used when, with respect to the case where the alpha value represents coverage, the sum of the alpha values is greater than or equal to the value of one. Similarly, this method is employed when the logical OR of the stored mask and the polygon sub-pixel mask result in a full mask (that is, all bits in the mask are set to 1). When the alpha value is greater than or equal to a value of one or when the mask is full it is unclear, given the stored information, what compositing had previously occurred. Because statistics have shown that the incoming information is typically of greater importance than the background information, the incoming information is used to determine the color of the pixel.

Equations 590, 595, 600, 605 and 610 are used to determine the color and alpha value z buffer value upon compositing and equations 715, 720, 725, 730, 735, and 740, FIG. 15b, are utilized when sub-pixel masks are used.

If the summed alpha value is less than 1 or the mask is not full when the background pixel mask and the polygon mask are logically ORed together, that is, (Ma|Mb)≠ to full mask, there is a strong likelihood that the pixel contains a vertex pixel and a simple over write will result in an undesirable ripple along the composited edge. Therefore, at block 390, FIG. 6, it is preferred that the compositing equations, as indicated by equations 615, 620, 625, 630 and 365, FIG. 15a, for the alpha value approach, and equations 745, 750, 755, 760, 765 and 770, FIG. 15b, for the mask approach, are used in order that the smoothness of the anti-aliased edge is preserved.

FIGS. 16a, 16b, 16c, 16d, 16e, 16f, 16g, 16h, and 16i and FIGS. 17a, 17b and 17c illustrate in detail the depth ordered dependence error and the improvement the system of the present invention achieves by minimizing the depth order dependence error while maintaining the system to be a single pass system.

Figure 16A:
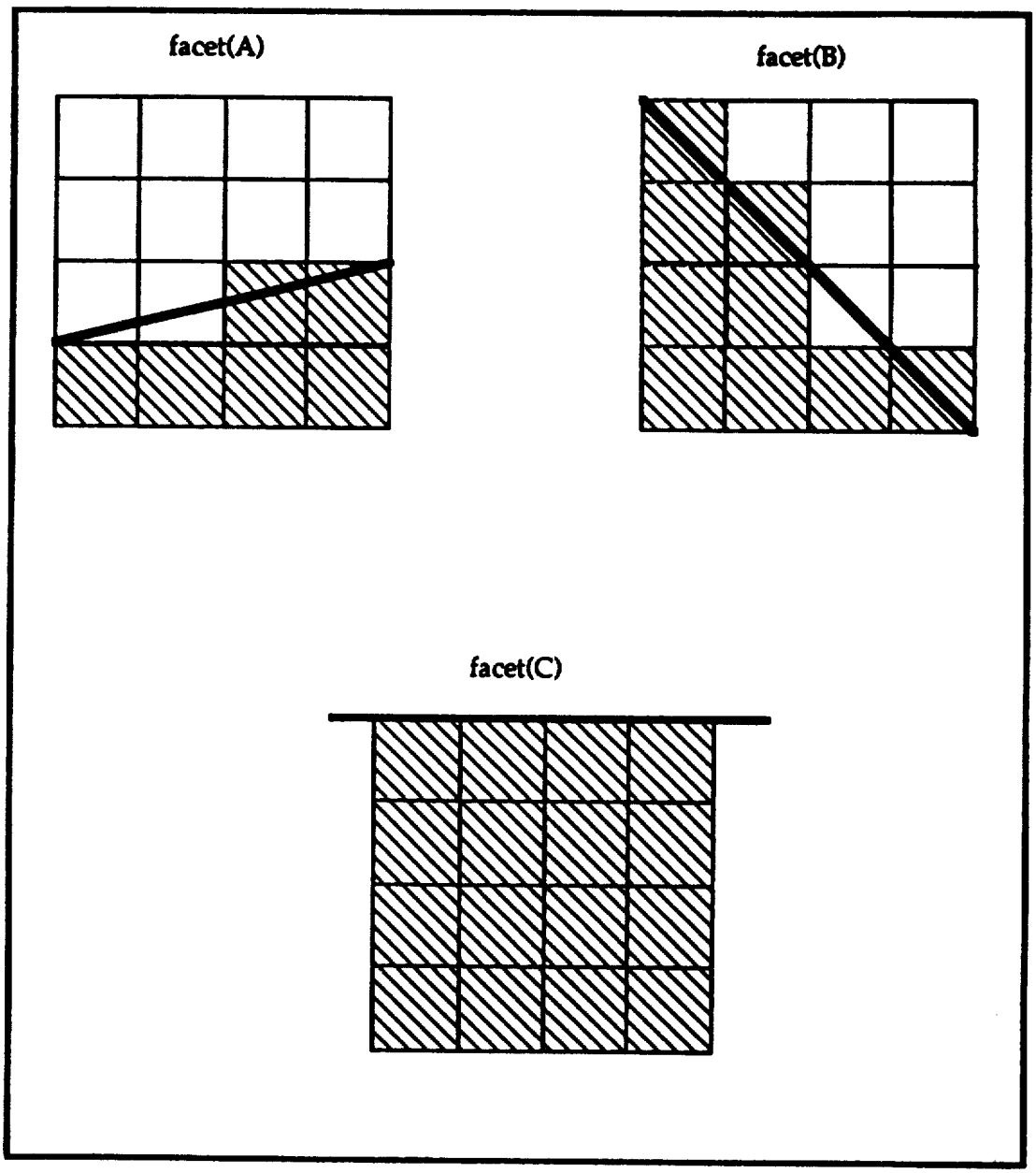
Figure 16B:
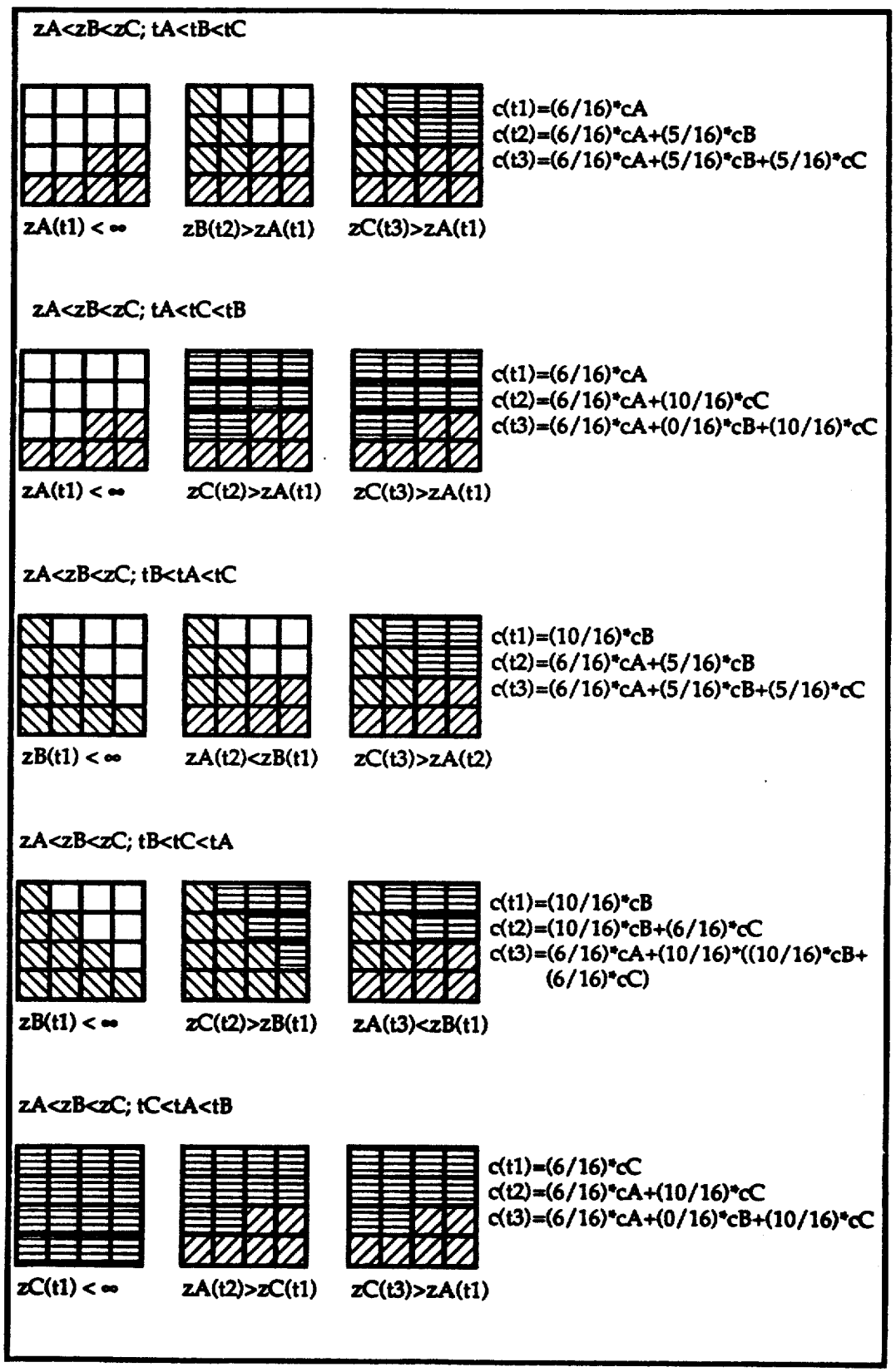
Figure 16D:
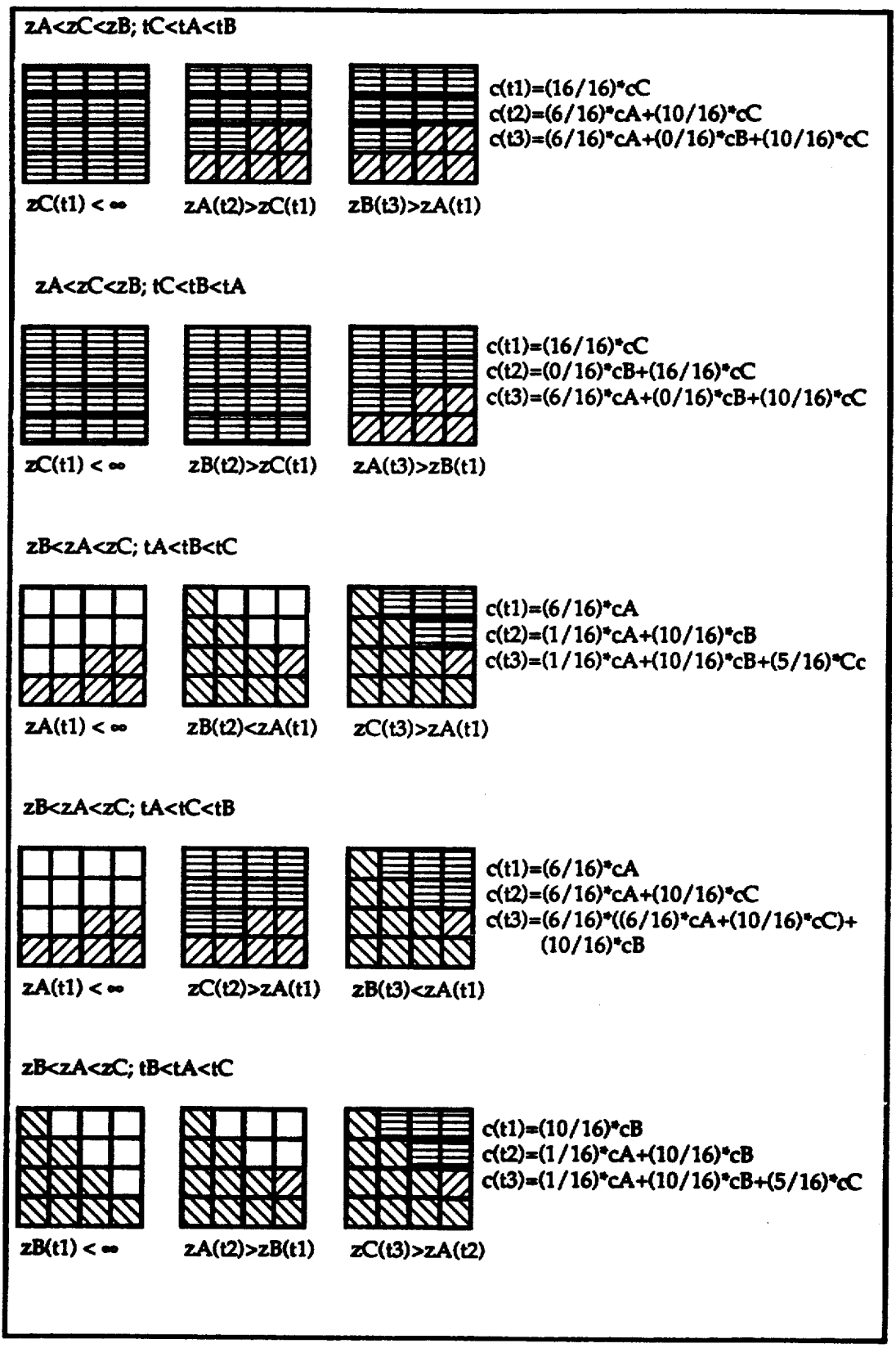
Figure 16E:
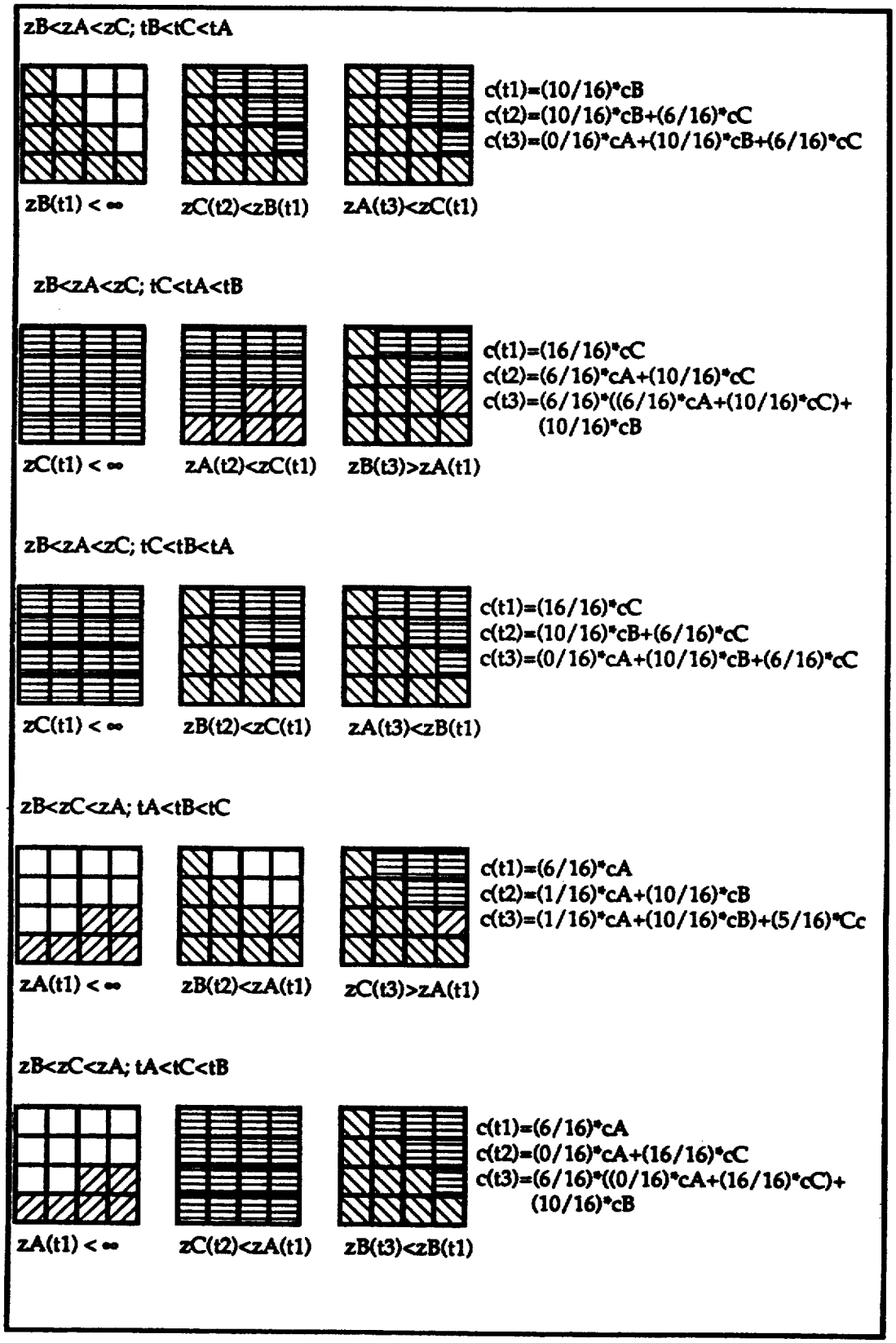
Figure 16F:
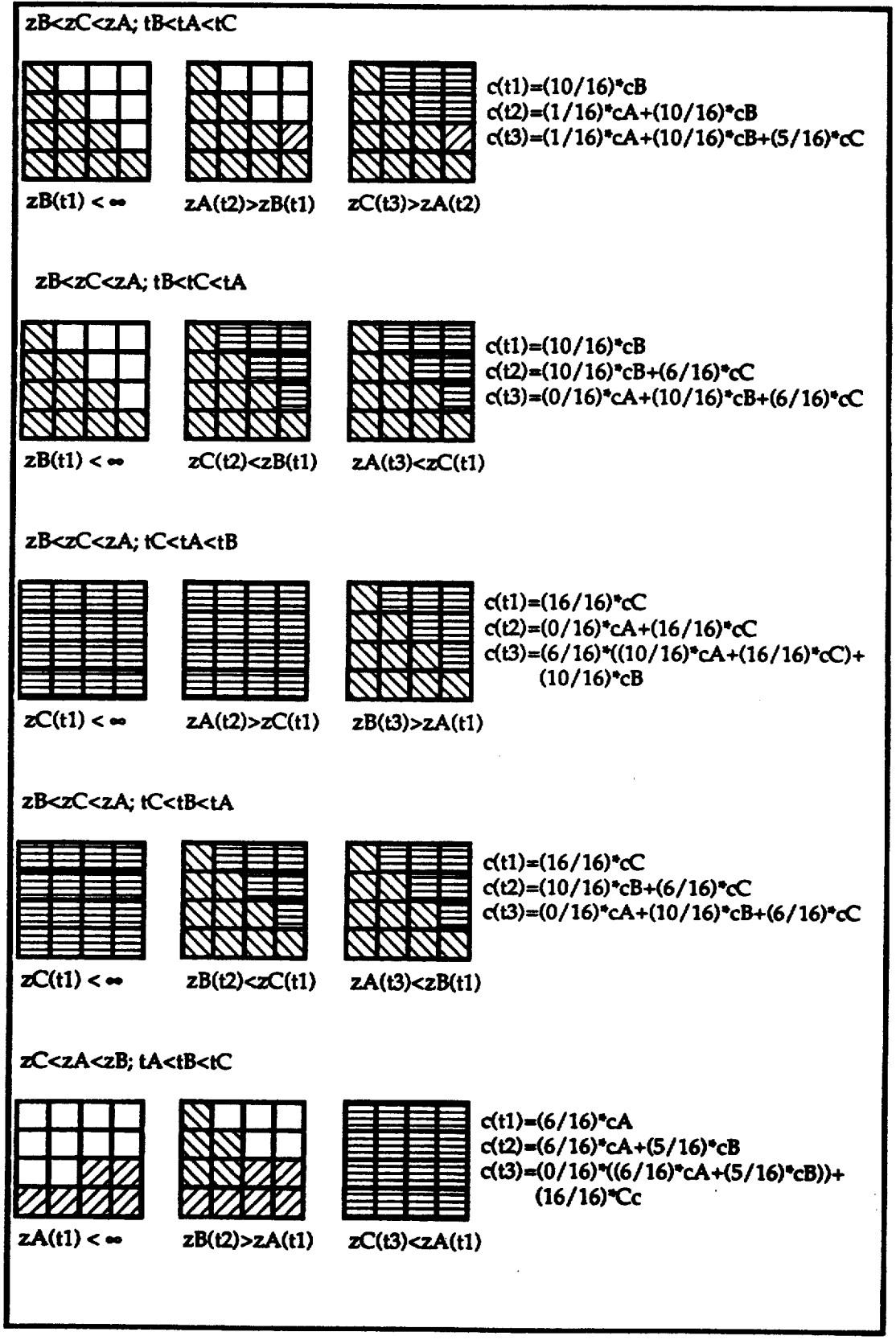
Figure 16G:
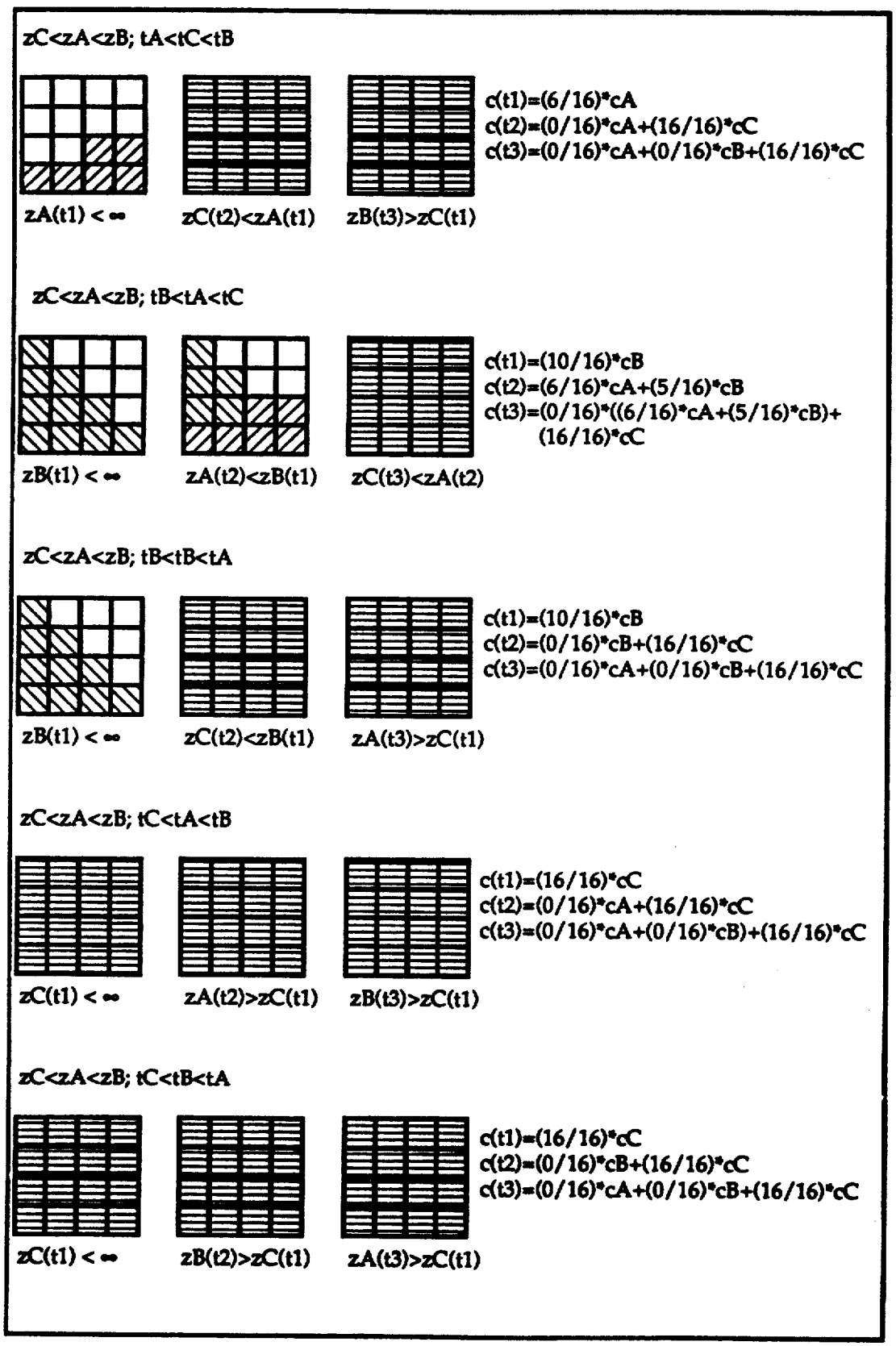
Figure 16H:
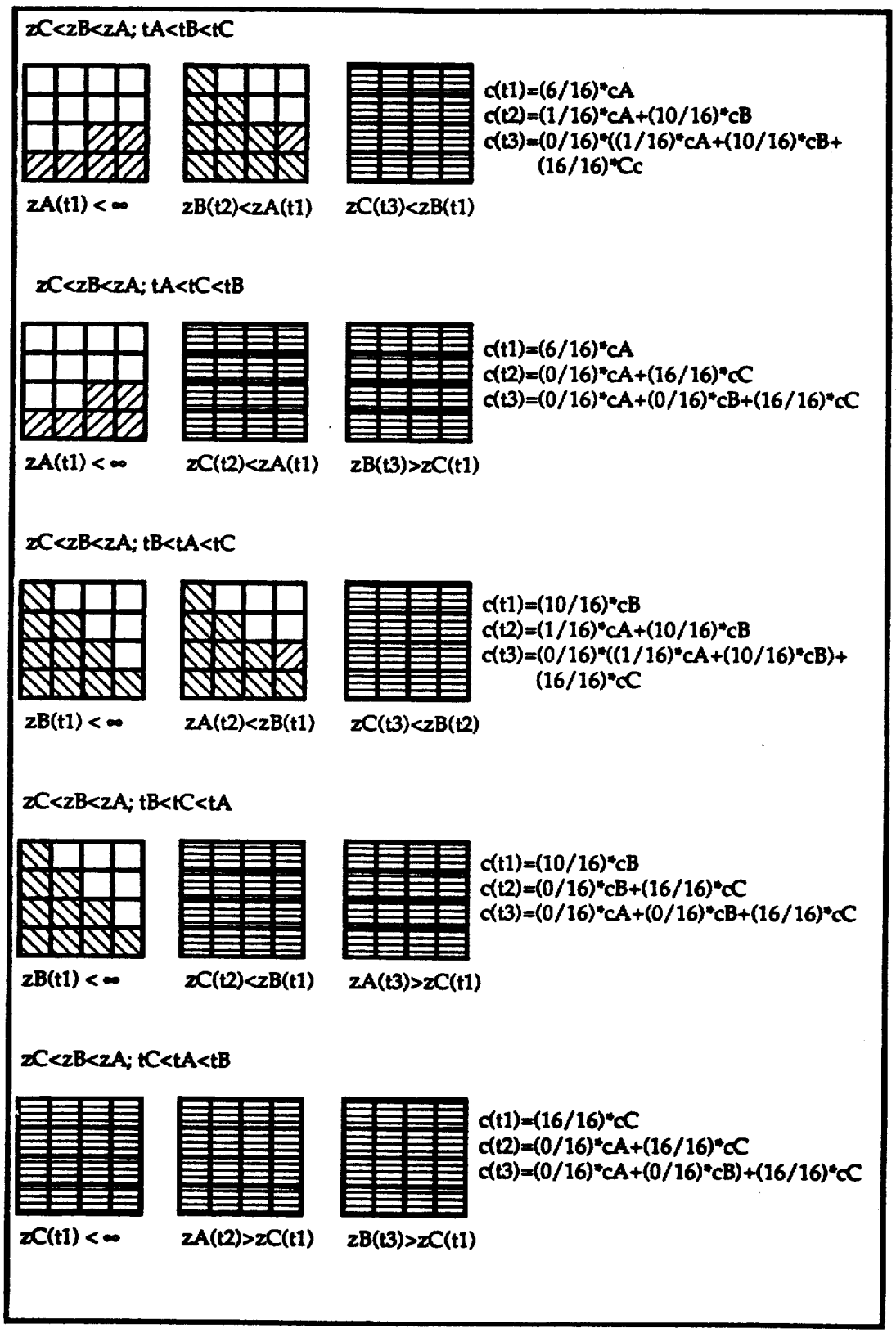
Figure 16I:
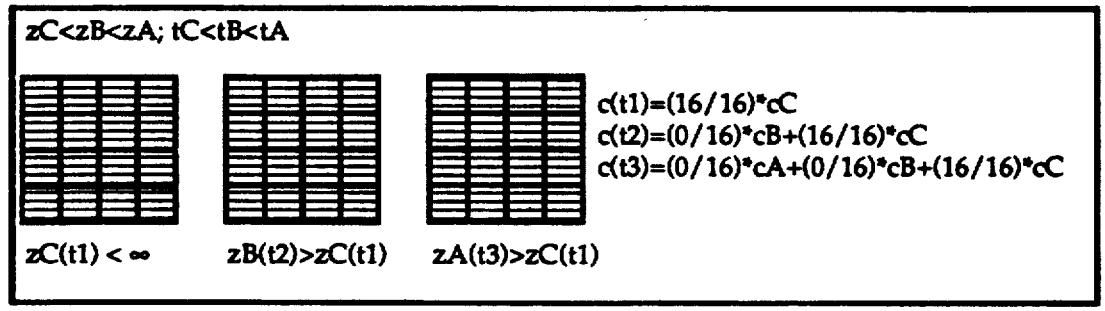

In this illustration, three facets of polygons at a particular pixel are used (see FIG. 16a). The final color of the pixel output to the display device is dependent upon both the depth order (e.g. zA<zB<zC) and time order of rendering (e.g. tA<tB<tC). FIGS. 16b, 16c, 16d, 16e, 16f, 16g, 16h, and 16i illustrate the resulting color for different combinations of depth orders and time orders of rendering. The value zA, zB and zC respectively represent the z or depth value for facets A, B and C. Similarly, tA, tB and tC respectively represent the time order of rendering facet A, facet B and facet C.

The tables depicted in FIGS. 17a, 17b and 17c further illustrate the effectiveness of the system of the present invention in minimizing the depth ordered dependence error while maintaining a fast single pass system. The table of FIG. 17a illustrates the ideal color values to be rendered given an infinite amount of time to render the polygons properly, preferably through a multiple pass system. FIG. 17b illustrates the color values rendered using the system of the present invention. FIG. 17c provides the error analysis between the ideal color values and the color values rendered according to the system of the present invention. As can be observed from FIG. 17c, the error margin, on the whole, is minimal and is far outweighed by the time saved rendering anti-aliased polygons in a single pass system.

While the invention has been described in conjunction with the preferred embodiment, it is evident that numerous alternatives modifications, variations and uses will be apparent to those skilled in the art in light of the foregoing description.

What is claimed is:

1. In a computer system comprising a central processing unit (CPU), memory and a graphic display, a process for rendering anti-aliased polygons on the graphic display, said polygons represented by a color, a set of coordinates which indicate the vertices of the polygon and a depth value indicative of the depth of the polygon, said process comprising the steps of:

providing a frame buffer located in memory in which pixels representative of a graphic image are stored for output to the graphics display, each pixel in the frame buffer being identified by a color value, a z buffer value and a representation indicative of coverage, said z buffer value representative of the depth of the pixel and the coverage representation representative of the extent of coverage within a pixel, said pixels in the frame buffer being identified as the background pixels;

identifying the pixels which comprise the polygon, said step comprising the steps of;

computing the pixel locations of the edges which form the polygon according to the vertices of the polygon;

forming a coverage representation for each edge pixel by determining the area within the pixel the polygon covers;

computing the depth value of each edge pixel, said depth value being equal to the depth value of the polygon at the pixel;

computing the pixel locations of the pixels interior to the polygon, said pixel locations being between edge pixels;

forming a coverage representation for each interior pixel indicative of full coverage; and computing the depth value of each interior pixel, said depth value being equal to the depth value of the polygon at the pixel;

compositing each edge and interior pixel of the polygon with a corresponding background pixel at the location in the frame buffer the pixel is to be composited to, thereby forming a composited pixel which is a new background pixel and is stored in the frame buffer, the step of compositing comprising the steps of;

if the depth value of the polygon pixel is less than the depth value of the corresponding background pixel;

setting the color of the composited pixel to be equal to a first proportionate blend of the color of the polygon pixel and the color of the background pixel, said proportionate blend dependent upon the extend of coverage of the polygon pixel;

setting the depth value of the composited pixel to be equal to the depth value of the polygon pixel; and setting the coverage representation of the composited pixel to be equal to a first proportionate blend of the coverage representation of the polygon pixel and the coverage representation of the background pixel;

if the depth value of the polygon pixel is greater than the depth value of the corresponding background pixel;

setting the color of the composited pixel to be equal to a second proportionate blend of the color of the polygon pixel and the color of the background pixel, said proportionate blend dependent upon the extent of coverage of the background pixel;

setting the coverage representation of the composited pixel to be equal to a second proportionate blend of the coverage representation of the polygon pixel and the coverage representation of the background pixel; and setting the depth value of the composited pixel to be equal to the depth value of the background pixel;

if the depth value of the polygon pixel is equal to the depth value of the corresponding background pixel and the combination of the coverage representations of the polygon pixel and the background pixel represents full coverage;

setting the color of the composited pixel to be equal to the color of the polygon pixel;

setting the coverage representation of the composited pixel to represent full coverage; and setting the depth value of the composited pixel to be equal to the depth value of the background pixel and polygon pixel;

if the depth value of the polygon pixel is equal to the depth value of the corresponding background pixel and the combination of the coverage representations of the polygon pixel and the background pixel does not indicate full coverage;

setting the color of the composited pixel to be equal to the first proportionate blend of the color of the polygon pixel and the color of the background pixel, said proportionate blend dependent upon the extent of coverage; and setting the depth value of the composited pixel to be equal to the depth value of the polygon pixel; and setting the coverage representation of the composited pixel to be equal to the first proportionate blend of the coverage representation of the polygon pixel and the coverage representation of the background pixel;

storing in the frame buffer the composited pixel at the location of the corresponding background pixel thereby replacing the background pixel with the composited pixel to form a new background pixel;

retrieving the pixels stored in the frame buffer and actuating the pixels on the graphic display at a color indicated by the color value and intensity indicated by coverage representation, to generate the graphic image on the graphic display;

wherein each of the pixels individually retain a depth value, a color value and a coverage representation and are individually composited with corresponding background pixels, each background pixel individually retaining a depth value, a color value and a coverage representation, to render high quality, anti-aliased polygons.

2. The process as described in claim 1, wherein the step of computing the pixel locations of the edges which form the polygon comprises the step of computing the pixel locations using Bresenham's line algorithm.

3. The process as described in claim 1, wherein the step of computing the pixel locations of the edges which form the polygon comprises the step of computing the pixel locations using Pitteway and Watkinson line algorithm and the step of forming the coverage representation for each pixel comprises setting the coverage representation equal to $(mx+y)+(1-m)$, where m is the slope of the edge and x,y are respectively the x and y coordinates of a location a pixel is determined to be closest to.

4. The process as described in claim 1, wherein the coverage representation for each pixel in the frame buffer comprises a sub-pixel mask and the step for forming a coverage representation for each edge pixel comprises the step of forming a sub-pixel mask for each edge pixel by determining the sub-pixels the edge of the polygon crosses and setting those sub-pixels the edge of the polygon crosses and the sub-pixels inclusive to the polygon.

5. The method according to claim 4, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point to the edge into the pixel and the sub-pixel exit point of the edge from the pixel;

determining the entry sub-pixel and the exit sub-pixel the edge of the polygon crosses; and retrieving from memory a sub-pixel mask indexed according to entry sub-pixel and exit sub-pixel.

6. The method according to claim 4, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point of the edge into the pixel and the slope of the edge;

determining the entry sub-pixel and the slope of the edge; and retrieving from memory from a sub-pixel mask indexed according to entry sub-pixel and slope of the edge.

7. The method according to claim 4, wherein the step for forming a sub-pixel mask for each edge pixel comprises:

storing in a table in memory a plurality of sub-pixel masks which represent the sub-pixel masks for different combinations of sub-pixels indexed according to the perpendicular distance from the edge to the center of the pixel and the slope of the edge;

determining the perpendicular distance from the edge to the center of the pixel and the slope of the edge; and retrieving from memory a sub-pixel mask indexed according to the perpendicular distance from the edge to the center of the pixel and the slope of the edge.

8. The method according to claim 4, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point of the edge into the pixel and a sub-pixel sample on the edge within the pixel, said sample being the polygon vertex when the edge terminates within the pixel;

determining the entry sub-pixel and the sample sub-pixel of the edge; and retrieving from memory a sub-pixel mask indexed according to entry sub-pixel and sample sub-pixel.

9. The process as described in claim 1, wherein the step for forming a coverage representation for each edge pixel comprises the step of forming a sub-pixel mask for each edge pixel by determining the sub-pixels the edge of the polygon crosses, setting those sub-pixels the edge of the polygon crosses and the sub-pixels inclusive to the polygon and generating a cover value equal to the number of sub-pixels set.

10. The method according to claim 5, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point of the edge into the pixel and the sub-pixel exit point of the edge from the pixel;

determining the entry sub-pixel and the exit sub-pixel edge the polygon crosses; and retrieving from memory a sub-pixel mask indexed according to entry sub-pixel and exit sub-pixel.

11. The method according to claim 5, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point of the edge into the pixel and the slope of the edge;

determining the entry sub-pixel and the slope of the edge; and retrieving from memory a sub-pixel mask indexed according to entry sub-pixel and slope of the edge.

12. The method according to claim 5, wherein the step for forming a sub-pixel mask for each edge pixel comprises:

storing in a table in memory a plurality of sub-pixel masks which represent the sub-pixel masks for different combinations of sub-pixels indexed according to the perpendicular distance from the edge to the center of the pixel and the slope of the edge;

determining the perpendicular distance from the edge to the center of the pixel and the slope of the edge; and retrieving from memory a sub-pixel mask indexed according to the perpendicular distance from the edge to the center of the pixel and the slope of the edge.

13. The method according to claim 5, wherein the step for forming a sub-pixel mask for each edge pixel comprises:

storing in a table in memory a plurality of sub-pixel masks which represent the sub-pixel masks for different combinations of sub-pixels indexed according to the sub-pixel entry point of the edge into the pixel and a sub-pixel sample on the edge within the pixel, said sample being the polygon vertex when the edge terminates within the pixel;

determining the entry sub-pixel and the sample sub-pixel of the edge; and retrieving from memory a sub-pixel mask indexed according to entry sub-pixel and sample sub-pixel.

14. The method as described in claim 1, wherein pixels are sequentially composited for each scan line and the step of identifying the pixels which comprise the polygon further comprises the steps of:

providing a scan line buffer to store a scan line of pixels;

temporarily storing each pixel of the polygon in the scan line buffer until all pixels of the polygon for the scan line are identified; and once all pixels of the polygon for the scan line are identified, writing the pixels stored in the scan line buffer to the corresponding scan line of the frame buffer.

15. The method as described in claim 14, wherein if more than one edge pixel crosses a pixel and a first edge pixel identified is stored in the scan line buffer, said step of identifying the pixels which comprises the polygon further comprises compositing the first edge pixel identified with a second edge pixel identified, said compositing comprising the steps of:

retrieving the pixel coverage representation of the edge pixel identified from the scan line buffer;

blending the coverage representation of the edge pixel retrieved from the scan line buffer with the coverage representation of the second edge pixel; and storing the blended coverage representation in the scan line buffer.

16. The method according to claim 15, wherein, the step for forming a coverage representation for each edge pixel comprises the step of forming a sub-pixel mask for each edge pixel by determining the sub-pixels the edge of the polygon crosses, setting those sub-pixels the edge of the polygon crosses and the sub-pixels inclusive to the polygon and generating a coverage value equal to the number of sub-pixels set; and the coverage values are blended according to the equation $\alpha 1 + \alpha 2 - 1$, where $\alpha 1$ and $\alpha 2$ represent the coverage values for the edge pixels.

17. The method according to claim 15, wherein a coverage representation comprises a sub-pixel mask and the coverage representations are blended according to the equation, $M_A$ AND $M_B$, where $M_A$ and $M_B$ represent the sub-pixel masks for the edge pixels and "AND" represents the logic AND operation.

18. The method according to claim 1 wherein:

said coverage representation is a single coverage value representative of the area of coverage of the polygon within a pixel;

said first proportionate blend of the color of the polygon pixel and the color of background pixel being;

$$Cb := Ca + (1-\alpha a)^* Cb;$$

where Cb represents the color of the background pixel, Ca represents the color of the polygon pixel and Ca:=$\alpha a^*$Ca, $\alpha a$ represents the coverage value of the polygon pixel, and := represents a replacement function;

said first proportionate blend of the coverage value of the polygon pixel and the coverage value of the background pixel being;

$$\alpha b := \alpha a + (1-\alpha a)^* \alpha b;$$

where $\alpha b$ represents the coverage value for the background pixel;

said second proportionate blend of the color of the polygon pixel and the color of background pixel being;

$$Cb := (1-\alpha b)^* Ca + Cb;$$

said second proportionate blend of the coverage value of the polygon pixel and the coverage value of the background pixel being;

$$\alpha b := (1-\alpha b)^* \alpha a + \alpha b.$$

19. The method according to claim 1 wherein:

said coverage representation is a sub-pixel mask representative of the area of coverage of the polygon within a pixel;

said first proportionate blend of the color of the polygon pixel and the color of background pixel being;

$$Cb := Ca + (1-\alpha a)^* Cb;$$

where $\alpha a$:=count (Ma)/MASK_SIZE, Cb represents the color of the background pixel, Ca represents the color of the polygon pixel and Ca:=$\alpha a^*$Ca, Ma represents the sub-pixel mask for the polygon pixel, count represents a function which counts the number bits set to a value indicative of coverage, MASK_SIZE represents the total number of sub-pixels of the sub-pixel masks, and:=represents a replacement function;

said first proportionate blend of the coverage representation of the polygon pixel and the coverage representation of the background pixel being;

$$Mb := Ma | Mb;$$

where Mb represents the sub-pixel mask of the background pixel, and "|" represents the logical OR function; and said second proportionate blend of the color of the polygon pixel and the color of background pixel being, $$Cb := (1-ab)*Ca + Cb,$$

where, ab: = count (Mb)/MASK_SIZE,
Ma: = Ma & ~Mb,
aa: = Count (Mb)/MASK_SIZE, and
Ca: = aa*Ca where "&" represents the logical AND function and "~" represents the logical negation function, said second proportionate blend of the coverage representation of the polygon pixel and the coverage representation of the background pixel being, $$Mb := Ma | Mb.$$

20. In a computer system comprising a central processing unit (CPU), memory and a graphic display, a process for rendering anti-aliased polygons on the graphic display, said polygons represented by a color, a set of coordinates which indicate the vertices of the polygon and a depth value indicative of the depth of the polygon, said process comprising the steps of:

providing a frame buffer located in memory in which each pixel in the frame buffer is identified by a color value, a z buffer value and sub-pixel mask, said z buffer value representative of the depth of the pixel and the sub-pixel mask representative of the sub-pixels of the pixel which are set and which indicates the amount of coverage of a pixel, said pixels in the frame buffer being identified as the background pixels;

identifying the pixels which comprise the polygon, said step comprising the steps of;

computing the pixel locations of the edges which form the polygon according to the vertices of the polygon;

forming a sub-pixel mask for each edge pixel by determining the sub-pixels the edge of the polygon crosses and setting those sub-pixels the edge of the polygon crosses and the sub-pixels inclusive to the polygon;

computing the depth value of each edge pixel, said depth value being equal to the depth value of the polygon at the pixel;

computing the pixel locations of the pixels interior to the polygon, said pixel locations being between edge pixels;

forming a sub-pixel mask for each interior pixel by setting all sub-pixels of each sub-pixel mask;

computing the depth value of each interior pixel, said depth value being equal to the depth value of the polygon at the pixel;

compositing each edge and interior pixel of the polygon with a corresponding background pixel at the location in the frame buffer the pixel is to be composited to, thereby forming a new background pixel, the step of compositing comprising the steps of;

if the depth value of the polygon pixel is less than the depth value for the corresponding background pixel, setting the color of the composited pixel to be equal to, $$Cb := Ca + (1-aa)*Cb,$$

where Ca: = aa*Ca, aa represents the color of the polygon pixel, aa: = count (Ma)/MASK_SIZE and represents the coverage representation of the polygon pixel, Cb represents the color of the background pixel, Ma represents the sub-pixel mask for the polygon pixel, count represents a function which counts the number sub-pixels set, MASK_SIZE represents the total number of sub-pixels in the sub-pixel mask and: = represents a replacement function;

setting the sub-pixel mask of the composited pixel to be equal to, $$Mb := Ma | Mb.$$

where Mb represents the sub-pixel mask of the background pixel, and "|" represents the logical OR function; and setting the depth value of the composited pixel to be equal to the depth value of the polygon pixel;

if the depth value of the polygon pixel is greater than the depth value for the corresponding background pixel and the sub-pixel mask for the background pixel is not equal to a full mask;

setting the color of the composited pixel to be equal to, $$Cb := (1-ab)*Ca + Cb,$$

where, ab: = count (Mb)/MASK_SIZE,
Ma: = Ma & ~Mb,
aa: = count (Ma)/MASK_SIZE,
Ca: = aa*Ca, ab is the coverage value representative of the amount of coverage of the background pixel, "&" represents the logical AND function and "~" represents the logical negation function, setting the sub-pixel mask of the composited pixel to be equal to, $$Mb := Ma | Mb,$$

setting the depth value to be equal to the depth value of the background pixel;

if the depth value of the polygon pixel is equal to the depth value for the corresponding background pixel;

setting the sub-pixel mask of the composited pixel to be equal to, $$Mb := Ma | Mb,$$

setting the color of the composited pixel to be, $$Cb := Ca(1-aa)*Cb,$$

and setting the depth value of the composited pixel to be equal to the depth value of the polygon pixel.

21. The process as described in claim 20, wherein the step of computing the pixel locations of the edges which form the polygon comprises the step of computing the pixel locations using Bresenham's line algorithm.

22. The method according to claim 20, wherein the step for forming a sub-pixel mask for each edge pixel comprises:
- storing in a table in memory a plurality of sub-pixel masks which represent the sub-pixel masks for different combinations of sub-pixels indexed according to the sub-pixel entry point of the edge into the pixel and the sub-pixel exit point of the edge from the pixel;
- determining the entry sub-pixel and the exit sub-pixel the edge of the polygon crosses; and
- retrieving from memory a sub-pixel mask indexed according to entry sub-pixel and exit sub-pixel.

23. The method according to claim 20, wherein the step for forming a sub-pixel mask for each edge pixel comprises:
- storing in a table in memory a plurality of sub-pixel masks which represent the sub-pixel masks for different combinations of sub-pixels indexed according to the sub-pixel entry point of the edge into the pixel and the slope of the edge;
- determining the entry sub-pixel and the slope the edge; and
- retrieving from memory a sub-pixel mask indexed according to entry sub-pixel and slope of the edge.

24. The method according to claim 20, wherein the step for forming a sub-pixel mask for each edge pixel comprises:
- storing in a table in memory a plurality of sub-pixel masks which represent the sub-pixel masks for different combinations of sub-pixels indexed according to the slope of the edge and the perpendicular distance from the edge to the center of the pixel;
- determining the slope of the edge and the perpendicular distance from the edge to the center of the pixel; and
- retrieving from memory a sub-pixel mask indexed according to slope of the edge and the perpendicular distance from the edge to the center of the pixel.

25. The method according to claim 20, wherein the step for forming a sub-pixel mask for each edge pixel comprises:
- storing in a table in memory a plurality of sub-pixel masks which represent the sub-pixel masks for different combinations of sub-pixels indexed according to the sub-pixel entry point of the edge into the pixel and a sub-pixel sample on the edge within the pixel, said sample being the polygon vertex when the edge terminates within the pixel;
- determining the entry sub-pixel and the sub-pixel sample on the edge; and
- retrieving from memory a sub-pixel mask indexed according to entry sub-pixel and sub-pixel sample on the edge.

26. The method as described in claim 20, wherein pixels are sequentially composited for each scan line and the step of identifying the pixels which comprise the polygon further comprises the steps of:
- providing a scan line buffer to store a scan line of pixels;
- temporarily storing each pixel of the polygon in the scan line buffer until all pixels of the polygon for the scan line are identified; and
- once all pixels of the polygon for the scan line are identified, writing the pixels stored in the scan line buffer to the corresponding scan line of the frame buffer.

27. The method as described in claim 26, wherein if more than one edge pixel crosses a pixel and a first edge pixel identified is stored in the scan line buffer, said step of identifying the pixels which comprises the polygon further comprises compositing the first edge pixel identified with a second edge pixel identified, said compositing comprising the steps of:
- retrieving the pixel coverage representation of the edge pixel identified from the scan line buffer;
- blending the coverage representation of the edge pixel retrieved from the scan line buffer with the coverage representation of the second edge pixel; and
- storing the blended coverage representation in the scan line buffer.

28. The method according to claim 27, wherein the sub-pixel masks are blended according to the equation, $M_A$ AND $M_B$, where $M_A$ and $M_B$ represent the sub-pixel masks for the edge pixels and "AND" represents the logical AND operation.

29. In a computer system comprising a central processing unit (CPU), memory and a graphic display, said memory including a frame buffer which stores a graphic image comprising pixels to be output to the graphic display, a process for rendering anti-aliased polygons on the graphic display, said polygons represented by a color, a set of coordinates which indicate the vertices of the polygon and a depth value indicative of the depth of the polygon, said process comprising the steps of:
- identifying each pixel in the frame buffer by a color value, a z buffer value and a representation indicative of coverage, said z buffer value representative of the depth of the pixel and the coverage representation representative of the extent of coverage within a pixel, said pixels in the frame buffer being identified as the background pixels;
- identifying the pixels which comprise the polygon, said step comprising the steps of;
- computing the pixel locations of the edges which form the polygon according to the vertices of the polygon; forming a coverage representation for each edge pixel by determining the area within the pixel the polygon covers;
- computing the depth value of each edge pixel, said depth value being equal to the depth value of the polygon for the pixel;
- computing the pixel locations of the pixels interior to the polygon, said pixel locations being between edge pixels;
- forming a coverage representation for each interior pixel indicative of full coverage;
- computing the depth value of each interior pixel, said depth value being equal to the depth value of the polygon for the pixel;
- compositing each edge and interior pixel of the polygon with a corresponding background pixel at the location in the frame buffer the pixel is to be composited to, thereby forming composited pixel which is a new background pixel and is stored in the frame buffer, the step of compositing comprising the steps of:
  - if the depth value of the polygon pixel is less than the depth value for the corresponding background pixel, setting the color of the composited pixel to be, $Cb := Ca(1-aa)*Cb,$ where Cb represents the color of the background pixel, Ca represents the color of the polygon pixel, $Ca := aa*Ca, aa$ represents the coverage representation of the polygon pixel and ":=" represents a replacement function, setting the coverage representation of the composited pixel to be equal to, $ab := aa + (1-aa)*ab,$ where ab represents the coverage representation of the background pixel and setting the depth value of the composited pixel to be equal to the depth value of the polygon pixel;

if the depth value of the polygon pixel is greater than the depth value for the corresponding background pixel and the coverage representation for the background pixel does not indicate full coverage;

setting the color of the composited pixel to be equal to, $Cb := (1-ab)*Ca + Cb,$ setting the coverage representation of the composited pixel to be equal to, $ab := (1-ab)*aa + ab,$ setting the depth value to be equal to the depth value of the background pixel;

if the depth value of the polygon pixel is equal to the depth value for the corresponding background pixel;

setting the coverage representation of the composited pixel to be, $ab := aa + (1-aa)*ab$ setting the color of the composited pixel to be, $Cb := Ca(1-aa)*Cb,$ and setting the depth value of the composited pixel to be equal to the depth value of the polygon pixel;

storing in the frame buffer the composited pixel at the location of the corresponding background pixel thereby replacing the background pixel with the composited pixel to form a new background pixel;

retrieving the pixels stored in the frame buffer and actuating the pixels on the graphic display at a color indicated by the color value and intensity indicated by coverage representation, to generate the graphic image on the graphic display.

30. The process as described in claim 29, wherein the step of computing the pixel locations of the edges which form the polygon comprises the step of computing the pixel locations using Bresenham's line algorithm.

31. The process as described in claim 30, wherein the step of computing the pixel locations of the edges which form the polygon comprises the step of computing the pixel locations using Pitteway and Watkinson line algorithm and the step of forming the coverage representation for each pixel comprises setting the coverage representation to a value equal to $(mx+y)+(1-m)$, where m is the slope of the edge and x,y are respectively the x and y coordinates of a location a pixel is determined to be closest to.

32. The process as described in claim 30, wherein the step for forming a coverage representation for each edge pixel comprises the step of forming a sub-pixel mask for each edge pixel by determining the sub-pixels the edge of the polygon crosses, setting those sub-pixels the edge of the polygon crosses and the sub-pixels inclusive to the polygon and generating a cover value equal to the number of sub-pixels set.

33. The method according to claim 32, wherein the step for forming a sub-pixel mask for each edge pixel comprises:
storing in a table in memory a plurality of sub-pixel masks which represent the sub-pixel masks for different combinations of sub-pixels indexed according to the sub-pixel entry point of the edge into the pixel and the sub-pixel exit point of the edge from the pixel;
determining the entry sub-pixel and the exit sub-pixel the edge of the polygon crosses; and
retrieving from memory a sub-pixel mask indexed according to entry sub-pixel and exit sub-pixel.

34. The method according to claim 32, wherein the step for forming a sub-pixel mask for each edge pixel comprises:
storing in a table in memory a plurality of sub-pixel masks which represent the sub-pixel masks for different combinations of sub-pixels indexed according to the sub-pixel entry point of the edge into the pixel and the slope of the edge;
determining the entry sub-pixel and slope of the edge; and
retrieving from memory a sub-pixel mask indexed according to entry sub-pixel and slope of the edge.

35. The method according to claim 32, wherein the step for forming a sub-pixel mask for each edge pixel comprises:
storing in a table in memory a plurality of sub-pixel masks which represent the sub-pixel masks for different combinations of sub-pixels indexed according to the slope of the edge and the perpendicular distance from the edge to the center of the pixel;
determining the slope of the edge and the distance from the edge to the center of the pixel; and
retrieving from memory a sub-pixel mask indexed according to the slope of the edge and distance from the edge to the center of the pixel.

36. The method according to claim 32, wherein the step for forming a sub-pixel mask for each edge pixel comprises:
storing in a table in memory a plurality of sub-pixel masks which represent the sub-pixel masks for different combinations of sub-pixels indexed according to the sub-pixel entry point of the edge into the pixel and the sub-pixel sample on the edge within the pixel;
determining the entry sub-pixel and the sub-pixel sample on the edge within the pixel; and
retrieving from memory a sub-pixel mask indexed according to entry sub-pixel and sub-pixel sample on the edge within the pixel.

37. The method as described in claim 29, wherein pixels are sequentially composited for each scan line and the step of identifying the pixels which comprise the polygon further comprises the steps of:

provided a scan line buffer to store a scan line of pixels;

temporarily storing each pixel of the polygon in the scan line buffer until all pixels of the polygon for the scan line are identified; and once all pixels of the polygon for the scan line are identified, writing the pixels stored in the scan line buffer to the corresponding scan line of the frame buffer.

38. The method as described in claim 37, wherein if more than one edge pixel crosses a pixel and a first edge pixel identified is stored in the scan line buffer, said step of identifying the pixels which comprises the polygon further comprises compositing the first edge pixel identified with a second edge pixel identified, said compositing comprising the steps of:

retrieving the pixel coverage representation of the edge pixel identified from the scan line buffer;

blending the coverage representation of the edge pixel retrieved from the scan line buffer with the coverage representation of the second edge pixel; and storing the blended coverage representation in the scan line buffer.

39. The method according to claim 38, wherein the coverage representations are blended according to the equation $\alpha1 + \alpha2 - 1$, where $\alpha1$ and $\alpha2$ represent the coverage representations for the edge pixels.

40. In a computer system comprising a central processing unit (CPU), memory and a graphic display, an apparatus for rendering anti-aliased polygons on the graphic display, said polygons represented by a color, a set of coordinates which indicate the vertices of the polygon and a depth value indicative of the depth of the polygon, said apparatus comprising:

a frame buffer located in memory in which pixels representative of a graphic image are stored for output to the graphic display, each pixel in the frame buffer being identified by a color value, a z buffer value and a coverage representation, said z buffer value representative of the depth of the pixel and the coverage representation representative of the extent of coverage within a pixel, said pixels in the frame buffer being identified as the background pixels;

means for identifying pixels which comprise the polygon, said means comprising:

means for computing the pixel locations of the edges which form the polygon according to the vertices of the polygon;

means for forming a coverage representation for each edge pixel by determining the are a within the pixel the polygon covers;

means for computing the depth value of each edge pixel, said depth value being equal to the depth value of the polygon at the pixel;

means for computing the pixel locations of the pixels interior to the polygon, said pixel locations being between edge pixels;

means for forming a coverage representation for each interior pixel indicative of full coverage;

means for computing the depth value of each interior pixel, said depth value being equal to the depth value of the polygon at the pixel;

means for compositing each edge and interior pixel of the polygon with a corresponding background pixel at the location in the frame buffer the pixel is to be composited to, thereby forming a composited pixel which is a new background pixel and is stored in the frame buffer, said means comprising;

means for setting the color for the composited pixel;

means for setting the coverage representation for the composited pixel;

means for setting the depth value for the composited pixel; and output means for storing in the frame buffer the composited pixel at the location of the corresponding background pixel thereby replacing the background pixel with the composited pixel to form a new background pixel;

means for controlling the means for compositing comprising:

means for comparing the depth value of the polygon pixel with the depth value of the corresponding background pixel;

means for combining the coverage representations of the polygon pixel and the background pixel;

means for comparing the combined coverage representation to a coverage representation representative of complete coverage;

if the depth value of the polygon pixel is less than the depth value of the corresponding background pixel, said means for controlling controls;

said means for setting the color to be the color of the composited pixel to be equal to a first proportionate blend of the color of the polygon pixel and the color of the background pixel, said proportionate blend dependent upon the extent of coverage of the polygon pixel;

said means for setting the depth value to set the depth value of the composited pixel to be equal to the depth value of the polygon pixel; and said means for setting the coverage representation to set the coverage representation of the composited pixel to be equal to a first proportionate blend of the coverage representation of the polygon pixel and the coverage representation of the background pixel;

if the depth value of the polygon pixel is greater than the depth value of the corresponding background pixel, said means for controlling controls;

said means for setting the color to set the color of the composited pixel to be equal to a second proportionate blend of the color of the polygon pixel and the color of the background pixel, said proportionate blend dependent upon the extent of coverage of the background pixel;

said means for setting the coverage representation to set the coverage representation of the composited pixel to be equal to a second proportionate blend of the coverage representation of the polygon pixel and the coverage representation of the background pixel; and said means for setting the depth value to set the depth value of the polygon pixel to be equal to the depth value of the background pixel;

if the depth value of the polygon pixel is equal to the depth value of the corresponding background pixel and the combination of the coverage values of the polygon pixel and the background pixel indicates complete coverage, said means for controlling controls;
    said means for setting the color to set the color of the composited pixel to be equal to the color of the polygon pixel;
    said means for setting the coverage representation to set the coverage representation of the composited pixel to indicate complete coverage; and
    said means for setting the depth to set the depth value of the polygon pixel to be equal to the depth value of the background pixel and polygon pixel;

if the depth value of the polygon pixel is equal to the depth value of the corresponding background pixel and the combination of the coverage values of the polygon pixel and the background pixel does not indicate complete coverage, said means for controlling controls;
    said means for setting the color to set the color of the composited pixel to be equal to the first proportionate blend of the color of the polygon pixel and the color of the background pixel, said proportionate blend dependent upon the extent of coverage of the polygon pixel;
    said means for setting the depth to set the depth value of the composited pixel to be equal to the depth value of the polygon pixel; and
    said means for setting the coverage representation to set coverage representation of the composited pixel to be equal to the first proportionate blend of the coverage representation of the polygon pixel and the coverage representation of the background pixel;
    frame buffer control means for retrieving the pixels stored in the frame buffer and actuating the pixels on the graphic display at a color indicated by the color value and intensity indicated by coverage representation, to generate the graphic image on the graphic display;

whereby the pixels individually retain a depth value, a color value and a coverage representation and are individually composited with corresponding background pixels, each background pixel individually retaining a depth value, a color value and a coverage representation to render high quality, anti-aliased polygons.

41. The apparatus as described in claim 40, wherein the means for computing the pixel locations of the edges which form the polygon utilizes Bresenham's line algorithm.

42. The apparatus as described in claim 40, wherein the means for computing the pixel locations of the edges which form the polygon determines the pixel locations using Pitteway and Watkinson line algorithm and the means for forming the coverage value for each pixel comprises means for setting the coverage representation to be (mx+y)+(1−m), where m is the slope of the edge and x,y are respectively the x and y coordinates of a location a pixel is determined to be closest to.

43. The apparatus as described in claim 40, wherein the coverage representation for each pixel in the frame buffer comprises a sub-pixel mask and the means for forming a coverage representation for each edge pixel comprises means for forming a sub-pixel mask for each edge pixel which determines the sub-pixels the edge of the polygon crosses and sets to a value indicative of coverage those sub-pixels the edge of the polygon crosses and the sub-pixels inclusive to the polygon.

44. The apparatus according to claim 43, wherein the means for forming a sub-pixel mask for each edge pixel comprises:
    a lookup table located in memory which stores a plurality of sub-pixel masks which represent the sub-pixel masks for different combinations of sub-pixels indexed according to the sub-pixel entry point of the edge into the pixel and the sub-pixel exit point of the edge from the pixel;
    means for determining the entry sub-pixel and the exit sub-pixel the edge of the polygon crosses; and
    means for retrieving from memory a sub-pixel mask indexed according to entry sub-pixel and exit sub-pixel.

45. The apparatus according to claim 43, wherein the means for forming a sub-pixel mask for each edge pixel comprises:
    a lookup table located in memory which stores a plurality of sub-pixel masks which represent the sub-pixel masks for different combinations of sub-pixels indexed according to the sub-pixel entry point of the edge into the pixel and the slope of the edge;
    means for determining the entry sub-pixel and the slope of the edge; and
    means for retrieving from memory a sub-pixel mask indexed according to entry sub-pixel and the slope of the edge.

46. The apparatus according to claim 43, wherein the means for forming a sub-pixel mask for each edge pixel comprises:
    a lookup table located in memory which stores a plurality of sub-pixel masks which represent the sub-pixel masks for different combinations of sub-pixels indexed according to the slope of the edge and the perpendicular distance from the edge to the center of the pixel;
    means for determining the slope of the edge and the perpendicular distance from the edge to the center of the pixel; and
    means for retrieving from memory a sub-pixel mask indexed according to the slope of the edge and perpendicular distance from the edge to the center of the polygon pixel.

47. The apparatus according to claim 43, wherein the means for forming a sub-pixel mask for each edge pixel comprises:
    a lookup table located in memory which stores a plurality of sub-pixel masks which represent the sub-pixel masks for different combinations of sub-pixels indexed according to the sub-pixel entry point of the edge into the pixel and a sub-pixel sample on the edge within the pixel, said sample being the polygon vertex when the edge terminates within the pixel;
    means for determining the entry sub-pixel and the sub-pixel sample on the edge within the pixel; and
    means for retrieving from memory a sub-pixel mask indexed according to entry sub-pixel and sub-pixel sample on the edge within the pixel.

48. The apparatus as described in claim 40, wherein the means for forming a coverage representation for each edge pixel comprises means for forming a sub-pixel mask for each edge pixel which determines the sub-pixels the edge of the polygon crosses, sets to a value indicative of coverage those sub-pixels the edge of the polygon crosses and the sub-pixels inclusive to the polygon and generates a coverage value equal to the number of sub-pixels set.

49. The apparatus according to claim 44, wherein the means for forming a sub-pixel mask for each edge pixel comprises:
- a lookup table located in memory which stores a plurality of sub-pixel masks which represent the sub-pixel masks for different combinations of sub-pixels indexed according to the sub-pixel entry point of the edge into the pixel and the sub-pixel exit point of the edge from the pixel;
- means for determining the entry sub-pixel and the exit sub-pixel the edge of the polygon crosses; and
- means for retrieving from memory a sub-pixel mask indexed according to entry sub-pixel and exit sub-pixel.

50. The apparatus according to claim 44, wherein the means for forming a sub-pixel mask for each edge pixel comprises:
- a lookup table located in memory which stores a plurality of sub-pixel masks which represent the sub-pixel masks for different combinations of sub-pixels indexed according to the sub-pixel entry point of the edge into the pixel and the slope of the edge;
- means for determining the entry sub-pixel and the slope of the edge; and
- means for retrieving from memory a sub-pixel mask indexed according to entry sub-pixel and slope of the edge.

51. The apparatus according to claim 44, wherein the means for forming a sub-pixel mask for each edge pixel comprises:
- a lookup table located in memory which stores a plurality of sub-pixel masks which represent the sub-pixel masks for different combinations of sub-pixels indexed according to the slope of the edge and the perpendicular distance from the edge to the center of the pixel;
- means for determining the slope of the edge and the perpendicular distance from the edge to the center of the pixel; and
- means for retrieving from memory a sub-pixel mask indexed according to the slope of the edge and the perpendicular distance from the edge to the center of the pixel.

52. The apparatus according to claim 44, wherein the means for forming a sub-pixel mask for each edge pixel comprises:
- a lookup table located in memory which stores a plurality of sub-pixel masks which represent the sub-pixel masks for different combinations of sub-pixels indexed according to the sub-pixel entry point of the edge into the pixel and a sub-pixel sample on the edge within the pixel, said sample being the polygon vertex when the edge terminates within the pixel;
- means for determining the entry sub-pixel and sub-pixel sample on the edge within the pixel; and
- means for retrieving from memory a sub-pixel mask indexed according to entry sub-pixel and sub-pixel sample on the edge within the pixel.

53. The apparatus as described in claim 40, wherein pixels are sequentially composited for each scan line, said apparatus further comprising:
- a scan line buffer to store a scan line of pixels; and
- means for temporarily storing each pixel of the polygon in the scan line buffer until all pixels of the polygon for the scan line are identified;
- means for transferring the pixels in the scan line buffer to the frame buffer when all pixels of the polygon for the scan line are identified.

54. The apparatus as described in claim 53, wherein if more than one edge pixel crosses a pixel and a first edge pixel identified is stored in the scan line buffer, said means for identifying pixels which comprise the polygon further comprises means for compositing the first edge pixel identified with a second edge pixel identified, said means for compositing comprising:
- means for retrieving the pixel coverage representation of the edge pixel identified from the scan line buffer;
- means for blending the coverage representation of the edge pixel retrieved from the scan line buffer with the coverage representation of the second edge pixel;
- means for storing the blended coverage representation in the scan line buffer; and
- once all pixels of the polygon for the scan line are identified, means for writing the pixels stored in the scan line buffer to the corresponding scan line of the frame buffer.

55. The apparatus according the claim 54, wherein the coverage representations are blended according to the equation $\alpha1 + \alpha2 - 1$, where $\alpha1$ and $\alpha2$ represent the coverage representations for the edge pixels.

56. The apparatus according to claim 54, wherein a coverage representation comprises a sub-pixel mask and the coverage representations are blended according to the equation, $M_A$ AND $M_B$, where $M_A$ and $M_B$ represent the sub-pixel masks for the edge pixels and "AND" represents the logical AND operation.

57. The apparatus according to claim 40 wherein:
- said coverage representation is a single value representative of the area of coverage of the polygon within a pixel;
- said first proportionate blend of the color of the polygon pixel and the color of background pixel being, $$Cb: = Ca + (1 - \alpha a)^* Cb,$$

where Cb represents the color of the background pixel, Ca represents the color of the polygon pixel and Ca: $=\alpha a^* Ca$, $\alpha a$ represents the coverage value of the polygon pixel, and := represents a replacement function;
- said first proportionate blend of the coverage value of the polygon pixel and the coverage value of the background pixel being, $$ab: = \alpha a + (1 - \alpha a)^* \alpha b,$$

where $\alpha b$ represents the coverage value for the background pixel;
- said second proportionate blend of the color of the polygon pixel and the color of background pixel being, $$Cb: = (1 - \alpha b)^* Ca + Cb;$$

- said second proportionate blend of the coverage value of the polygon pixel and the coverage value of the background pixel being, $ab := (1-ab)*aa + ab.$ 58. The apparatus according to claim 40 wherein:

said coverage representation is a sub-pixel mask representative of the area of coverage of the polygon within a pixel;

said first proportionate blend of the color of the polygon pixel and the color of background pixel being, $$Cb := Ca + (1-aa)*Cb,$$

where $aa := \text{count}(Ma)/\text{MASK\_SIZE}$, Cb represents the color of the background pixel, Ca represents the color of the polygon pixel, Ma represents the sub-pixel mask for the polygon pixel, count represents a function which counts the number sub-pixels set, MASK_SIZE represents the total number of sub-pixels in the sub-pixel mask, and ":=" represents a replacement function;

said first proportionate blend of the coverage representation of the polygon pixel and the coverage representation of the background pixel being, $$Mb := Ma | Mb.$$

where Mb represents the sub-pixel mask of the background pixel, and "|" represents the logical OR function; and said second proportionate blend of the color of the polygon pixel and the color of background pixel being, $$Cb := (1-ab)*Ca + Cb,$$

where,
$ab := \text{count}(Mb)/\text{MASK\_SIZE},$
$Ma := Ma \& \sim Mb,$
$aa := \text{count}(Ma)/\text{MASK\_SIZE},$
$Ca := aa*Ca,$ "&" represents the logical AND function and "~" represents the logical negation function, said second proportionate blend of the coverage representation of the polygon pixel and the coverage representation of the background pixel being, $$Mb := Ma | Mb.$$

59. In a computer system comprising a central processing unit (CPU), memory and a graphic display, an apparatus for rendering anti-aliased polygons on the graphic display, said polygons represented by a color, a set of coordinates which indicate the vertices of the polygon and a depth value indicative of the depth of the polygon, said apparatus comprising:

a frame buffer located in memory in which each pixel in the frame buffer is identified by a color value, a z buffer value and sub-pixel mask, said z buffer value representative of the depth of the pixel and the sub-pixel mask representative of the sub-pixels of the pixel which are set and which indicates the amount of coverage of a pixel, said pixels in the frame buffer being identified as the background pixels;

means for identifying the pixels which comprise the polygon, said means comprising:

means for computing the pixel locations of the edges which form the polygon according to the vertices of the polygon;

means for forming a sub-pixel mask for each edge pixel by determining the sub-pixels the edge of the polygon crosses and setting those sub-pixels the edge of the polygon crosses and the sub-pixels inclusive to the polygon;

means for computing the depth value of each edge pixel, said depth value being equal to the depth value of the polygon at the pixel;

means for computing the pixel locations of the pixels interior to the polygon, said pixel locations being between edge pixels;

means for forming a sub-pixel mask for each interior pixel by setting all sub-pixels of each sub-mask;

means for computing the depth value of each interior pixel, said depth value being equal to the depth value of the polygon;

means for compositing each edge and interior pixel of the polygon with a corresponding background pixel at the location in the frame buffer the pixel is to be composited to, thereby forming a composited pixel which is a new background pixel, said means comprising;

means for setting the color for the composited pixel;

means for setting the sub-pixel mask for the composited pixel;

means for setting the depth value for the composited pixel; means for controlling the means for compositing comprising:

means for comparing the depth value of the polygon pixel to the depth value of the corresponding background pixel, means for combining the sub-pixel masks of the polygon pixel and the background pixel;

means for comparing the combined sub-pixel mask to a sub-pixel mask representative of complete coverage;

if the depth value of the polygon pixel is less than the depth value for the corresponding background pixel, means for controlling, said means for setting the color to set the color of the composited pixel to be equal to, $$Cb := Ca + (1-aa)*Cb.$$

where aa represents the coverage representation of the polygon pixel and $aa := \text{count}(Ma)/\text{MASK\_SIZE}$, Cb represents the color of the background pixel, Ca represents the color of the polygon pixel, Ma represents the sub-pixel mask for the polygon pixel, count represents a function which counts the number bits set to a value indicative of coverage, MASK_SIZE represents the total number of sub-pixels in the sub-pixel mask, and ":=" represents a replacement function, said means for setting the sub-pixel mask to set the sub-pixel mask of the composited pixel to be equal to, $$Mb := Ma | Mb.$$

Where Mb represents the sub-pixel mask of the background pixel and "|" represents the logical OR function; and said means for setting the depth value to set the depth value of the composited pixel to be equal to the depth value of the polygon pixel;

if the depth value of the polygon pixel is greater than the depth value for the corresponding background pixel and the sub-pixel mask for the background pixel does not indicate complete coverage, means for controlling, said means for setting the color to set the color of the composited pixel to be equal to, $Cb := (1 - ab)*Ca + Cb$, where, $ab := \text{count}(Mb)/\text{MASK\_SIZE}$,
$Ma := Ma \& \sim Mb$,
$aa := \text{count}(Ma)/\text{MASK\_SIZE}$,
$Ca := aa*Ca$, "&" represents the logical AND function and "~" represents the logical negation function, said means for setting the sub-pixel mask to set the sub-pixel mask of the composited pixel to be equal to, $Mb := Ma | Mb$.

said means for setting the depth value to be equal to the depth value of the background pixel;

if the depth value of the polygon pixel is equal to the depth value for the corresponding background pixel, means for controlling, said means for setting the sub-pixel mask to set the sub-pixel mask of the composited pixel to be equal to, $Mb := Ma | Mb$.

said means for setting the color to set the color of the composited pixel to be, $Cb := Ca(1 - aa)*Cb$.

said means for setting the depth value to set the depth value of the composited pixel to be equal to the depth value of the polygon pixel;

frame buffer control means for retrieving the pixels stored in the frame buffer and actuating the pixels on the graphic display at a color indicated by the color value and intensity indicated by coverage representation, to generate the graphic image on the graphic display.

60. The apparatus as described in claim 59, wherein the means for computing the pixel locations of the edges which form the polygon utilizes Bresenham's line algorithm.

61. The apparatus as described in claim 59, wherein the means for computing the pixel locations of the edges which form the polygon determines the pixel locations using Pitteway and Watkinson line algorithm and the means for forming the coverage representation for each pixel comprises means for setting the coverage representation to a value equal to (mx+y)+(1−m), where m is the slope of the edge and x,y are respectively the x and y coordinates of a location a pixel is determined to be closest to.

62. The apparatus according to claim 59, wherein the means for forming a sub-pixel mask for each edge pixel comprises:

a lookup table located in memory which stores a plurality of sub-pixel masks which represent the sub-pixel masks for different combinations of sub-pixels indexed according to the sub-pixel entry point of the edge into the pixel and the sub-pixel exit point of the edge from the pixel;

means for determining the entry sub-pixel and the exit sub-pixel the edge of the polygon crosses; and means for retrieving from memory a sub-pixel mask indexed according to entry sub-pixel and exit sub-pixel.

63. The apparatus as described in claim 59, wherein pixels are sequentially composited for each scan line, said apparatus further comprising:

a scan line buffer to store a scan line of pixels; and means for temporarily storing each pixel of the polygon in the scan line buffer until all pixels of the polygon for the scan line are identified;

means for transferring the pixels in the scan line buffer to the frame buffer when all pixels of the polygon for the scan line are identified.

64. The apparatus as described in claim 63, wherein if more than one edge pixel crosses a pixel and a first edge pixel identified is stored in the scan line buffer, said means for identifying pixels which comprise the polygon further comprises means for compositing the first edge pixel identified with a second edge pixel identified, said means for compositing comprising:

means for retrieving the sub-pixel mask of the edge pixel identified from the scan line buffer;

means for blending the sub-pixel mask of the edge pixel retrieved from the scan line buffer with the sub-pixel mask of the second edge pixel;

means for storing the blended sub-pixel mask in the scan line buffer; and means for writing the pixels stored in the scan line buffer to the corresponding scan line of the frame buffer once all pixels of the polygon for the scan line are identified.

65. The apparatus according to claim 64, wherein the sub-pixel masks are blended according to the equation, $M_A$ AND $M_B$, where $M_A$ and $M_B$ represent the sub-pixel masks for the edge pixels and "AND" represents the logical AND operation.

66. In a computer system comprising a central processing unit (CPU), memory and a graphic display, an apparatus for rendering anti-aliased polygons on the graphic display, said polygons represented by a color, a set of coordinates which indicate the vertices of the polygon and a depth value indicative of the depth of the polygon, said apparatus comprising:

a frame buffer located in memory in which pixels representative of a graphic image are stored for output to the graphic display, each pixel in the frame buffer being identified by a color value, a z buffer value and a coverage representation, said z buffer value representative of the depth of the pixel and the coverage representation representative of the extent of coverage within a pixel, said pixels in the frame buffer being identified as the background pixels;

means for identifying pixels which comprise the polygon, said means comprising:

means for computing the pixel locations of the edges which form the polygon according to the vertices of the polygon;

means for forming a coverage representation for each edge pixel by determining the area within the pixel the polygon covers;

means for computing the depth value of each edge pixel, said depth value being equal to the depth value of the polygon at the pixel;

means for computing the pixel locations of the pixels interior to the polygon, said pixel locations being between edge pixels;

means for forming a coverage representation for each interior pixel indicative of complete coverage;

means for computing the depth value of each interior pixel, said depth value being equal to the depth value of the polygon at the pixel;

means for compositing each edge and interior pixel of the polygon with a corresponding background pixel at the location in the frame buffer the pixel is to be composited to, thereby forming a composited pixel which is a new background pixel and is stored in the frame buffer, said means comprising:

means for setting the color for the composited pixel;

means for setting the coverage representation for the composited pixel; and means for setting the depth value for the composited pixel;

means for controlling the means for compositing comprising;

means for comparing the depth value of the polygon pixel with the depth value of the corresponding background pixel, means for combining the coverage representations of the polygon pixel and the background pixel, means for comparing the combined coverage representation to a coverage representation representative of complete coverage, if the depth value of the polygon pixel is less than the depth value for the corresponding background pixel, said means for controlling controls, said means for setting the color to set the color of the composited pixel to be equal to, $Cb := Ca(1-aa)^*Cb,$ where Cb represents the color of the background pixel, Ca represents the color of the polygon pixel, $Ca := aa^*Ca$, aa represents the coverage representation of the polygon pixel and ":=" represents a replacement function, said means for setting the coverage representation to set the coverage representation of the composited pixel to be equal to, $ab := aa + (1-aa)^*ab,$ where ab represents the coverage representation of the background pixel, and said means for setting the depth value to set the depth value of the composited pixel to be equal to the depth value of the polygon pixel;

if the depth value of the polygon pixel is greater than the depth value for the corresponding background pixel and the coverage representation for the background pixel is not equal to a full coverage, said means for controlling controls, said means for setting the color to set the color of the composited pixel to be equal to, $Cb := (1-ab)^*Ca + Cb,$ said means for setting the coverage representation to set the coverage representation of the composited pixel to be equal to, $ab := (1-ab)^*aa + ab,$ and said means for setting the depth value to set the depth value to be equal to the depth value of the background pixel;

if the depth value of the polygon pixel is equal to the depth value for the corresponding background pixel, said means for controlling controls, said means for setting the coverage representation to set the coverage representation of the composited pixel to be $ab := aa + (1-aa)^*ab$ said means for setting the color to set the color of the composited pixel to be, $Cb := Ca + (1-aa)^*Cb.$ and said means for setting the depth value to set the depth value of the composited pixel to be equal to the depth value of the polygon pixel;

output means for storing in the frame buffer the composited pixel at the location of the corresponding background pixel thereby replacing the background pixel with the composited pixel to form a new background pixel;

frame buffer control means for retrieving the pixels stored in the frame buffer and actuating the pixels on the graphic display at a color indicated by the color value and intensity indicated by coverage representation, to generate the graphic image on the graphic display.

67. The apparatus as described in claim 66, wherein the means for computing the pixel locations of the edges which form the polygon utilizes Bresenham's line algorithm.

68. The apparatus as described in claim 67, wherein pixels are sequentially composited for each scan line, said apparatus further comprising:

a scan line buffer to store a scan line of pixels; and means for temporarily storing each pixel of the polygon in the scan line buffer until all pixels of the polygon for the scan line are identified;

means for transferring the pixels in the scan line buffer to the frame buffer when all pixels of the polygon for the scan line are identified.

69. The apparatus as described in claim 68, wherein if more than one edge pixel crosses a pixel and a first edge pixel identified is stored in the scan line buffer, said means for identifying pixels which comprise the polygon further comprises means for compositing the first edge pixel identified with a second edge pixel identified, said means for compositing comprising:

means for retrieving the pixel coverage representation of the edge pixel identified from the scan line buffer;

means for blending the coverage representation of the edge pixel retrieved from the scan line buffer with the coverage representation of the second edge pixel;

means for storing the blended coverage representation in the scan line buffer; and means for writing the pixels stored in the scan line buffer to the corresponding scan line of the frame buffer once all pixels of the polygon for the scan line are identified.

70. The apparatus according to claim 69, wherein the coverage representations are blended according to the equation $\alpha 1 + \alpha 2 - 1$, where $\alpha 1$ and $\alpha 2$ represent the coverage representations for the edge pixels.

71. The apparatus as described in claim 66, wherein the means for computing the pixel locations of the edges which form the polygon determines the pixel locations using Pitteway and Watkinson line algorithm and the means for forming the coverage representation for each pixel comprises means for setting the coverage representation to be a value equal to $(mx+y)+(1-m)$, where m is the slope of the edge and x,y are respectively the x and y coordinates of a location a pixel is determined to be closest to.

72. The apparatus as described in claim 66, wherein the means for forming a coverage representation for each edge pixel comprises means for forming a sub-pixel mask for each edge pixel which determines the sub-pixels the edge of the polygon crosses, sets to a value indicative of coverage those sub-pixels the edge of the polygon crosses and the sub-pixels inclusive to the polygon and generates a cover value equal to the number of sub-pixels set.

73. The apparatus according to claim 72, wherein the means for forming a sub-pixel mask for each edge pixel comprises:

a lookup table located in memory which stores a plurality of sub-pixel masks which represents the sub-pixel masks for different combinations of sub-pixels indexed according to the sub-pixel entry point of the edge into the pixel and the sub-pixel exit point of the edge from the pixel;

means for determining the entry sub-pixel and the exit sub-pixel the edge of the polygon crosses; and means for retrieving from memory a sub-pixel mask indexed according to entry sub-pixel and exit sub-pixel.

74. A scanned conversion process for rendering on a graphics display device a visual display of a polygon comprising the steps of:

determining the pixels and the pixel attributes which comprise the polygon, said attributes comprising the color of a pixel and the extent of coverage within a pixel;

defining a depth for each pixel;

compositing each pixel of the polygon with the background pixel to generate a composite pixel comprising the steps of;

comparing the depth of the polygon pixel to the depth of the background pixel;

if the background pixel is in front of the polygon pixel;

forming the color attribute of the composited pixel to be the color of the background pixel combined with the color of the polygon pixel proportionately reduced by the extent of coverage of the background pixel;

determining the extent of coverage for the composite pixel to be the combination of the extent of coverage of the background pixel and the extent of coverage of the polygon pixel proportionately reduced by the extent of coverage of the background pixel; and identifying the depth of the composite pixel is to be that of the background pixel; if the background pixel is behind the polygon pixel;

forming the color attribute of composite pixel to be the color of the polygon pixel combined with the color of the background pixel proportionately reduced by the extent of coverage of the polygon pixel;

determining the extent of coverage of the composite pixel to be the combination of the extent of coverage of the polygon pixel and the extent of coverage of the background pixel proportionately reduced by the extent of coverage of the polygon pixel; and identifying the depth of the composite pixel to be the depth of the polygon pixel;

if the depth of the polygon pixel equals the depth of the background pixel and the extent of coverage of the background pixel completely covers the pixel;

forming the color attribute of the composite pixel to be the color of the polygon pixel;

determining the coverage of the composite pixel to complete coverage; and identifying the depth of the composite pixel to be the depth of the polygon pixel; and if the depth of the polygon pixel equals the depth of the background pixel and the background pixel partially covers the pixel;

forming the color of the composite pixel to be the color of the polygon pixel combined with the color of the background pixel proportionately reduced by the extent of coverage of the polygon pixel;

determining the extent of coverage of the composite pixel to be the combination of the extent of coverage of the polygon pixel and the extent of coverage of the background pixel proportionately reduced by the extent of coverage of the polygon pixel; and identifying the depth of the composite pixel to be the depth of the polygon pixel;

storing the composite pixels in a frame buffer memory;

reading the pixel data from the frame buffer; and generating a pixel on the graphic display device at a color defined by the color attribute and intensity defined by the extent of coverage of the composite pixel determined to provide a visual depiction of the anti-aliased polygon image on the graphic display device.

75. In a computer graphics system comprising a CPU, input/output devices and memory, an apparatus for rendering anti-aliased polygons comprising:

pixel generating means for generating pixels composing the polygon according to a definition of a polygon to be rendered, said pixels comprising: color, depth and coverage attributes said color defining the color of a pixel to be generated, said depth identifying the visual depth of the image, said coverage attribute representing the extent of coverage within a pixel;

pixel compositing means for compositing each of the pixels of the polygon with pixels of a background image comprising;

comparison means for comparing the depth of the polygon pixel to the depth of the background pixel;

means responsive to the comparison means for selecting the means for compositing according to specific compositing techniques such that;

if the polygon pixel is in front of the background pixel, the color of the composited pixel is determined according to the color of the polygon pixel combined with the color of the background pixel proportionately decreased by the extent of coverage of the polygon pixel, the extent of coverage of the composited pixel is determined according to the extent of coverage of the polygon pixel combined with the extent of coverage of the background pixel decreased proportionately by the extent of coverage of the polygon pixel, and the depth is identified to be the depth of the polygon pixel;

if the polygon pixel is behind the background pixel, the color of the composite pixel is determined to be the color of the background pixel combined with the color of the polygon pixel proportionately decreased by the extent of coverage of the background pixel, the coverage of the composite pixel is determined to be the extent of coverage of the background pixel combined with the extent of coverage of the polygon pixel proportionately decreased by the extent of coverage of the background pixel, and the depth of the pixel is identified to be the depth of the background pixel;

if the depth of the polygon pixel equals the depth of the background pixel and the background pixel completely covers the pixel, the color of the composite pixel is set to be the color of the polygon pixel, the extent of coverage of the composite pixel is set to indicate complete coverage, and the depth value of the composite pixel is set to be the depth of the polygon pixel;

if the depth of the polygon pixel is the same as the depth of the background pixel and the background pixel partially covers the pixel, the color of the composite pixel is determined to be the color of the polygon pixel combined with the color of the background pixel proportionately decreased by the extent of coverage of the polygon pixel, the extent of coverage of the composite pixel is determined to be the extent of coverage of the polygon pixel combined with the extent of coverage of the background pixel proportionately decreased by the extent of coverage of the polygon pixel, and the depth of the composite pixel set to the depth of the polygon pixel;

a frame buffer in the memory means for storing the composite pixels in the frame buffer; and a graphic display control means for retrieving the pixels stored in the frame buffer and actuating the pixels on the graphic display at a color indicated by the color attribute and intensity indicated by the extent of coverage, to generate the graphic image on the graphic display.

* * * * *

UNITED STATES PATENT AND TRADEMARK OFFICE
CERTIFICATE OF CORRECTION

PATENT NO. : 5,123,085
DATED : June 16, 1992
INVENTOR(S) : Wells, et al

It is certified that error appears in the above-identified patent and that said Letters Patent is hereby corrected as shown below:

On the title page, Item

[75] Inventors: delete "Stuart C. Wells, Santa Clara; James V. Loo, Los Altos; Dawn M. Wallner, San Jose, all of Calif." and insert --Stuart C. Wells, Santa Clara; James Van Loo, Los Altos; Dawn M. Wallner, San Jose, all of Calif.--

Signed and Sealed this

Twenty-second Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,123,085
DATED : June 16, 1992
INVENTOR(S) : Well et al.

It is certified that error appears in the above-identified patent and that said Letters Patent is hereby corrected as shown below:

In column 19, claim 5 at line 59, please delete " to " (2nd occurrence) and insert --of--.

In column 29, claim 40 at line 54, please delete " are a " and insert -- area --.

Signed and Sealed this

Ninth Day of September, 1997

Attest:

BRUCE LEHMAN

Attesting Officer

Commissioner of Patents and Trademarks